US012782180B2

(12) United States Patent
Nakano et al.

(10) Patent No.: US 12,782,180 B2
(45) Date of Patent: Nov. 3, 2026

(54) VIBRATION PROPAGATION MEMBER, VIBRATION TRANSCEIVER USING THE SAME, FLOWMETER, VELOCITY METER, CONCENTRATION METER, AND MANUFACTURING METHOD

(71) Applicant: Panasonic Intellectual Property Management Co., Ltd., Osaka (JP)

(72) Inventors: Makoto Nakano, Kyoto (JP); Masahiko Hashimoto, Osaka (JP); Masato Satou, Nara (JP); Tomoki Masuda, Osaka (JP); Yuuji Nakabayashi, Nara (JP); Hidetomo Nagahara, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 323 days.

(21) Appl. No.: 18/681,949

(22) PCT Filed: Sep. 22, 2022

(86) PCT No.: PCT/JP2022/035345

§ 371 (c)(1),
(2) Date: Feb. 7, 2024

(87) PCT Pub. No.: WO2023/054162

PCT Pub. Date: Apr. 6, 2023

(65) Prior Publication Data

US 2024/0353246 A1 Oct. 24, 2024

(30) Foreign Application Priority Data

Oct. 1, 2021 (JP) ................................ 2021-162465

(51) Int. Cl.
*G01F 1/66* (2022.01)
*G01F 1/667* (2022.01)

(52) U.S. Cl.
CPC .............. *G01F 1/667* (2013.01); *G01F 1/662* (2013.01)

(58) Field of Classification Search
CPC ................................ G01F 1/667; G01F 1/662
(Continued)

(56) References Cited

U.S. PATENT DOCUMENTS 4,586,512 A * 5/1986 Do-huu ................ B06B 1/0625 600/447
4,662,212 A * 5/1987 Noguchi ............. G01N 29/024 73/24.01
(Continued)

FOREIGN PATENT DOCUMENTS

EP 1662840 A1 * 5/2006 ............. H04R 17/00
JP 57-25795 2/1982
(Continued)

OTHER PUBLICATIONS

Extended European Search Report issued Dec. 6, 2024 in related European Patent Application No. 22876028.6.
(Continued)

*Primary Examiner* — Peter J Macchiarolo
*Assistant Examiner* — Rodney T Frank
(74) *Attorney, Agent, or Firm* — Wenderoth, Lind & Ponack, L.L.P.

(57) ABSTRACT

A vibration propagation member is configured to be bonded to a surface of a vibrator. The vibration propagation member includes: a top plate; a sidewall; and at least one vertical partition which is perpendicular to the top plate. The vibra-
(Continued)

tion propagation member has a plurality of membrane structures defined by the top plate and the at least one vertical partition.

25 Claims, 31 Drawing Sheets

(58) Field of Classification Search
USPC .......................................................... 73/861.18
See application file for complete search history.

(56) References Cited

U.S. PATENT DOCUMENTS

| | | | | |
|---|---|---|---|---|
| 5,245,130 | A * | 9/1993 | Wheaton | G10H 1/0066 84/742 |
| 5,302,976 | A * | 4/1994 | Sugahara | B41J 2/14209 347/69 |
| 7,389,569 | B2 * | 6/2008 | Shiraishi | G10K 11/02 29/25.35 |
| 2005/0099097 | A1 * | 5/2005 | Baumgartner | H10N 30/057 310/334 |
| 2013/0200755 | A1 * | 8/2013 | Kim | H10N 30/87 29/25.35 |
| 2020/0376520 | A1 | 12/2020 | Chen et al. | |
| 2024/0353246 | A1 * | 10/2024 | Nakano | B06B 1/067 |

FOREIGN PATENT DOCUMENTS

| | | | | |
|---|---|---|---|---|
| JP | 9-65489 | | 3/1997 | |
| JP | 2003-78996 | | 3/2003 | |
| JP | 2003-302387 | | 10/2003 | |
| JP | 2004-125804 | | 4/2004 | |
| JP | 2004-343263 | | 12/2004 | |
| JP | 2004343263 | A * | 12/2004 | |
| JP | 2006-239119 | | 9/2006 | |
| JP | 4079075 | | 4/2008 | |
| JP | 2008-175706 | | 7/2008 | |
| JP | 2009-105709 | | 5/2009 | |
| JP | 2011-226844 | | 11/2011 | |
| JP | 2011257435 | A * | 12/2011 | |
| JP | 2016-213666 | | 12/2016 | |
| JP | 2019213139 | A * | 12/2019 | H04R 17/00 |
| WO | 2019/234969 | | 12/2019 | |

OTHER PUBLICATIONS

Extended European Search Report issued Jan. 8, 2025 in corresponding European Patent Application No. 22876029.4.
International Search Report issued Nov. 29, 2022 in corresponding International Application No. PCT/JP2022/035345.
International Search Report issued Nov. 29, 2022 in International Application No. PCT/JP2022/035344.

* cited by examiner

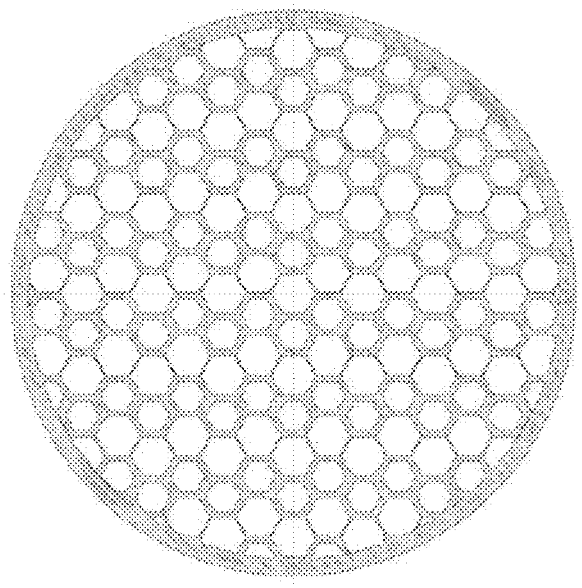
FIG. 3C
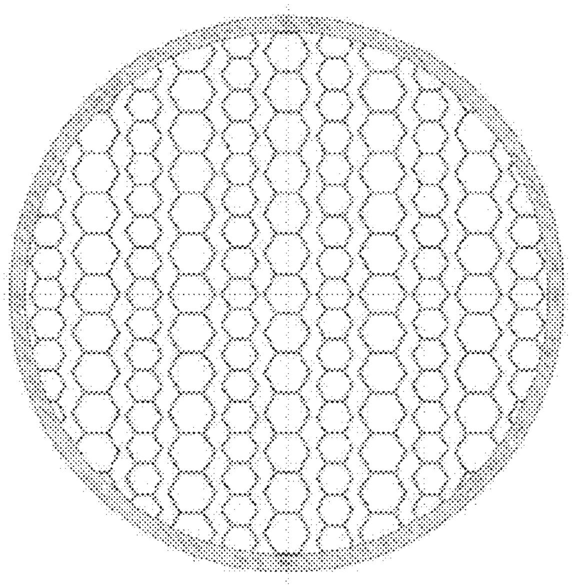
FIG. 3B
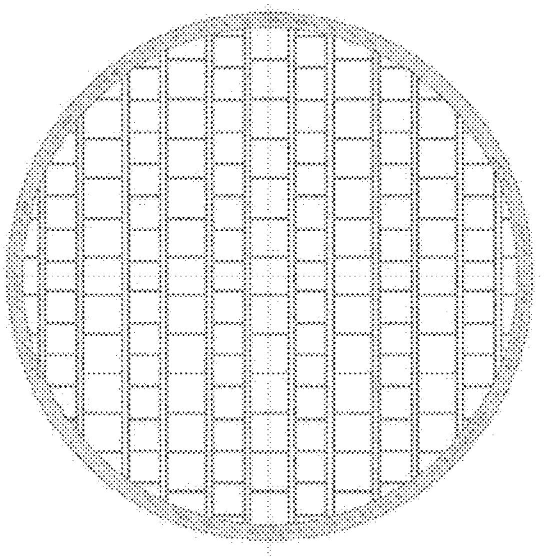
FIG. 3A
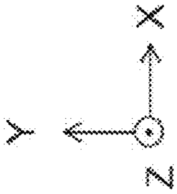

FIG. 19B
FIG. 19A
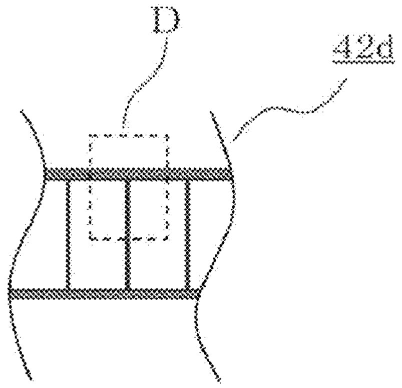
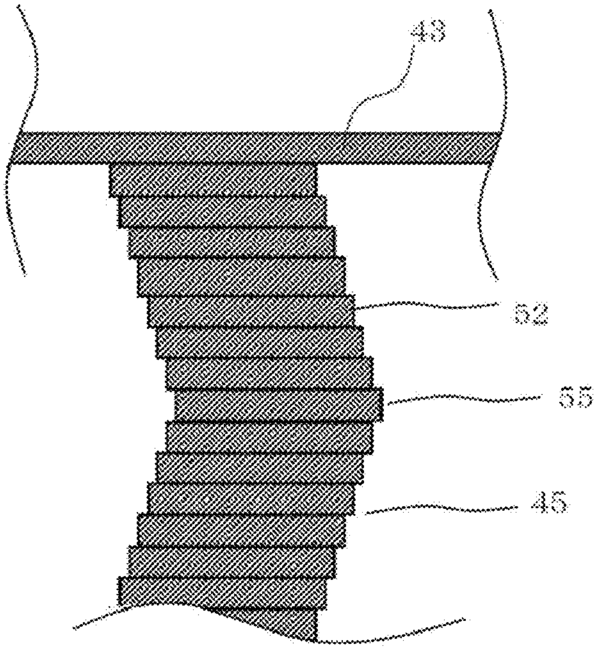

FIG. 21 A
FIG. 21 B
FIG. 21 C
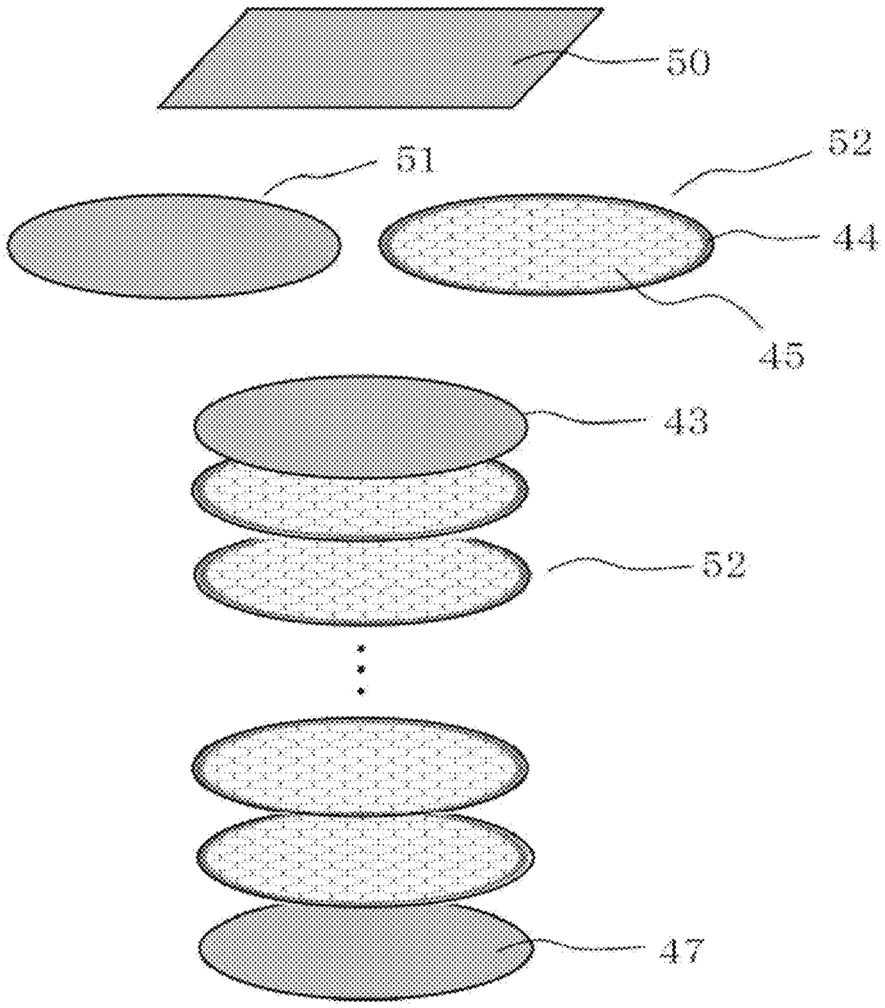
FIG. 21 D
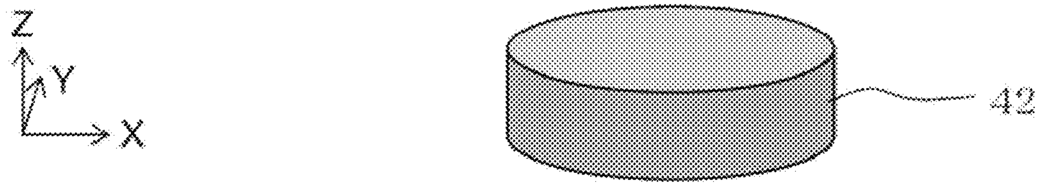

VIBRATION PROPAGATION MEMBER, VIBRATION TRANSCEIVER USING THE SAME, FLOWMETER, VELOCITY METER, CONCENTRATION METER, AND MANUFACTURING METHOD

CROSS-REFERENCE TO RELATED APPLICATIONS

The present application is the U.S. National Phase under 35 U.S.C. § 371 of International Application No. PCT/JP2022/035345, filed on Sep. 22, 2022, which claims the benefit of priority of Japanese Patent Application No. 2021-162465, filed on Oct. 1, 2021, the entire contents of which are incorporated herein by reference.

TECHNICAL FIELD

The present disclosure generally relates to a vibration propagation member, a vibration transceiver using the same, a flowmeter, a velocity meter, a concentration meter, and a manufacturing method. More particularly, the present disclosure relates to a vibration propagation member configured to operate by being bonded to a vibration means, a vibration transceiver using the same, a measuring instrument such as a flowmeter, a velocity meter, and a concentration meter, and a manufacturing method.

BACKGROUND ART

A known vibration propagation member of this type has been used as a disklike member configured as a mixture of an epoxy resin and a microsphere of glass. The disklike member is bonded onto one surface of a piezoelectric member and used as a vibration transceiver or an ultrasonic measuring instrument using vibration in an ultrasonic range (see, for example, JP 2004-125804 A).

However, when the fluid under measurement is a corrosive fluid and/or when the measurement needs to be made in a high-temperature, high-humidity environment or in an ultrahigh temperature environment, it is difficult for a vibration transceiver using the known vibration propagation member to operate with good stability.

Besides, the design of the vibration propagation member allows only a low degree of freedom. That is to say, the design of the vibration propagation member may be modified only in terms of its thickness and external dimensions, for example. In addition, the frequency design thereof also allows a low degree of freedom. These are problems with the known vibration propagation member.

Furthermore, in the known art, the vibration means and the vibration propagation member configured to operate by being bonded to one surface of the vibration means have their materials selected, and are designed in terms of external dimensions such as the thickness and outside diameter of the vibration propagation member, according to the medium that propagates the vibration with the density of the vibration propagation member, the sonic velocity, and other factors taken into account. In addition, the known vibration propagation member is generally made of a single material, and therefore, it is difficult to control the partial characteristics of the vibration propagation member.

SUMMARY OF INVENTION

In view of these problems with the related art, it is therefore an object of the present disclosure to provide a vibration propagation member that may operate with good stability even when the fluid under measurement is a corrosive fluid or even when measurement needs to be made in a high-temperature, high-humidity environment and that allows a high degree of freedom of design.

BRIEF DESCRIPTION OF DRAWINGS

FIGS. 3A-3C are cross-sectional views of the vibration propagation member according to the first embodiment as taken in a direction perpendicular to the thickness direction thereof;

FIG. 19A is a cross-sectional view of another vibration propagation member according to the second embodiment;

FIG. 19B is an enlarged view of part D shown in FIG. 19A;

FIGS. 21A-21D are perspective views illustrating the procedure of manufacturing the vibration propagation member according to the second embodiment;

Figure 1:
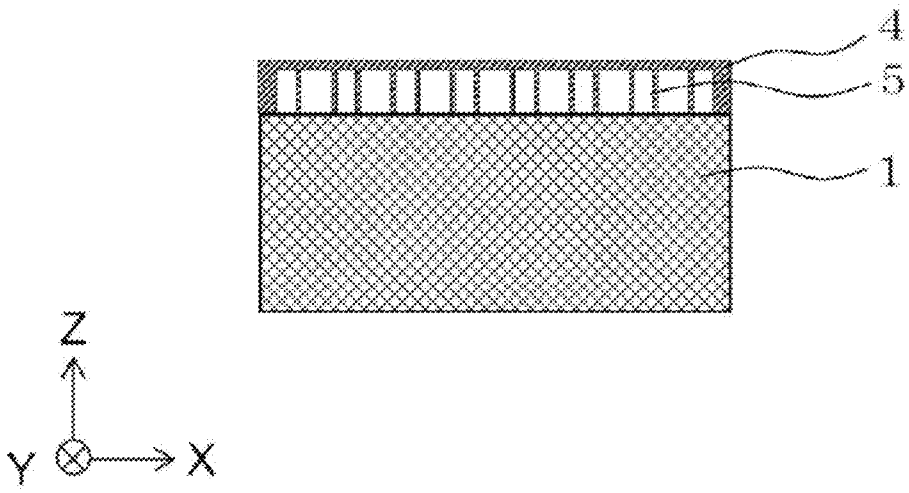
FIG. 1 is a cross-sectional view of a vibration propagation member according to a first embodiment which is provided on one surface of a vibration means.

DESCRIPTION OF EMBODIMENTS (Basic Idea that Forms the Basis of the Present Disclosure)

In those days when the present inventors conceived the concept of the present disclosure, the physical properties of a vibration propagation medium interposed between a fluid under measurement and a piezoelectric member for use as a vibration means needed to be controlled because vibration such as an ultrasonic wave should be propagated efficiently through the fluid under measurement to measure the flow velocity, flow rate, and/or concentration of a combustible gas or dried air such as the air as the fluid under measurement. Following is a physical interpretation of the vibration propagation member;

First of all, the product of density and sonic velocity that defines an acoustic impedance indicates the momentum of a substance that forms a micro unit element of the substance. Specifically, if the momentum of the substance that forms the micro unit element is ΔP, its mass is ΔM, and its velocity is V, then $$\Delta P(\text{momentum}) = \Delta M \times V(\text{acoustic impedance}) \tag{1}$$

is satisfied according to the definition of momentum. Thus, it can be seen that the acoustic impedance is the momentum of the substance that forms the micro unit element.

Therefore, it can be seen that to efficiently propagate energy from a certain substance (as the source of generation of an ultrasonic wave) to an adjacent substance, their acoustic impedances are preferably as close as possible.

A phenomenon that occurs in an acoustic matching layer will be described based on these physical interpretations.

In general, the sonic velocity of a substance is given by $$Va = (\kappa/\rho)^{1/2} \tag{2}$$

where κ is a bulk modulus and p is density. That is to say, the sonic velocity of a substance is determined uniquely by the bulk modulus and the density. Thus, it can be seen that it is difficult to control the sonic velocity intentionally.

That is why it is effective to reduce the density to decrease the acoustic impedance. In the known art, a vibration propagation member of this type has been designed by modifying either its thickness or its shape and dimensions such as an outside diameter based on the sonic velocity in the propagation direction with the density reduced. In addition, most of the constituent materials for use in the vibration propagation member are either a single material or a substantially uniform composite material. That is why it has been difficult to partially control the characteristics of the vibration propagation member.

Furthermore, in the known art, supposing the vibration propagation medium is a high-temperature, high-humidity gas, moisture enters a hole or a through hole of the vibration propagation member to increase the apparent density of the vibration propagation member and thereby cause an increase in the acoustic impedance of the acoustic matching member. This causes a decline in the propagation efficiency of vibration into the vibration propagation medium. Consequently, this causes a decline in the performance of a measuring instrument such as a flowmeter or a concentration meter that uses the vibration propagation medium. In a worst-case scenario, this may prevent the measuring instrument from making measurements properly. These are problems with the related art.

The present inventors spotted these problems with the related art and conceived the subject-matter of the present disclosure to overcome the problems.

The present disclosure provides a vibration propagation member that allows a high degree of freedom of design and that may propagate given vibration with good stability and high accuracy for a long term, even when the vibration propagation medium is a high-temperature, high-humidity fluid. In addition, the present disclosure also provides a vibration transceiver formed by bonding such a vibration propagation member onto one surface of a vibration means. The present disclosure further provides a measuring instrument such as a flowmeter, a velocity meter, or a concentration meter, each including the vibration transceiver.

Embodiments of the present disclosure will now be described in detail with reference to the accompanying drawings as needed. Note that unnecessarily detailed description will be omitted. For example, detailed description of already well-known matters and redundant description of substantially the same configuration will be omitted. This is done to avoid making the following description overly redundant and thereby help one of ordinary skill in the art understand the present disclosure easily.

It should also be noted that the accompanying drawings and the following description of embodiments are provided by the applicant to help one of ordinary skill in the art understand the present disclosure fully and only to give some examples of the present disclosure, and should not be construed as limiting the scope of the present disclosure, which is defined by the appended claims.

In the following description of embodiments, the three axes, namely, X-, Y-, and Z-axes, are shown for the sake of convenience on the drawings illustrating the shapes of constituent elements of the present disclosure and those embodiments will be described with reference to the X-, Y-, and Z-axes as needed. Also, in the following description of embodiments, when an ultrasonic transceiver is disposed to have the orientation shown in FIG. 1, the direction pointing from the left to the right on the paper on which FIG. 1 is drawn is supposed to be a positive X-axis direction, the direction pointing from the bottom to the top on the paper on which FIG. 1 is drawn is supposed to be a positive Z-axis direction, and the direction pointing from the recto to the verso of the paper on which FIG. 1 is drawn is supposed to be a positive Y-axis direction just for convenience sake. In addition, a dimension, measured parallel to the Z-axis, of each constituent element will be hereinafter referred to as its "thickness," the positive Z-axis direction will be hereinafter referred to as either "up" or "upward," and the negative Z-axis direction will be hereinafter referred to as either "down" or "downward." Note that such description using the X-, Y-, and Z-axes and upward and downward directions is made only for the sake of convenience to help one of ordinary skill in the art understand the present disclosure easily. The upward and downward directions are relative ones and subject to change depending on the orientation of the ultrasonic transceiver of the present disclosure disposed. Thus, the following description of embodiments with reference to these directions should not be construed as limiting the scope of the present disclosure.

First Embodiment

A vibration propagation member according to a first embodiment, a vibration transceiver using the vibration propagation member, and a flowmeter and concentration meter using the vibration transceiver will now be described with reference to FIGS. 1-12.

[1-1. Vibration Propagation Member]

[1-1. Configuration of Vibration Propagation Member]

Figure 2:
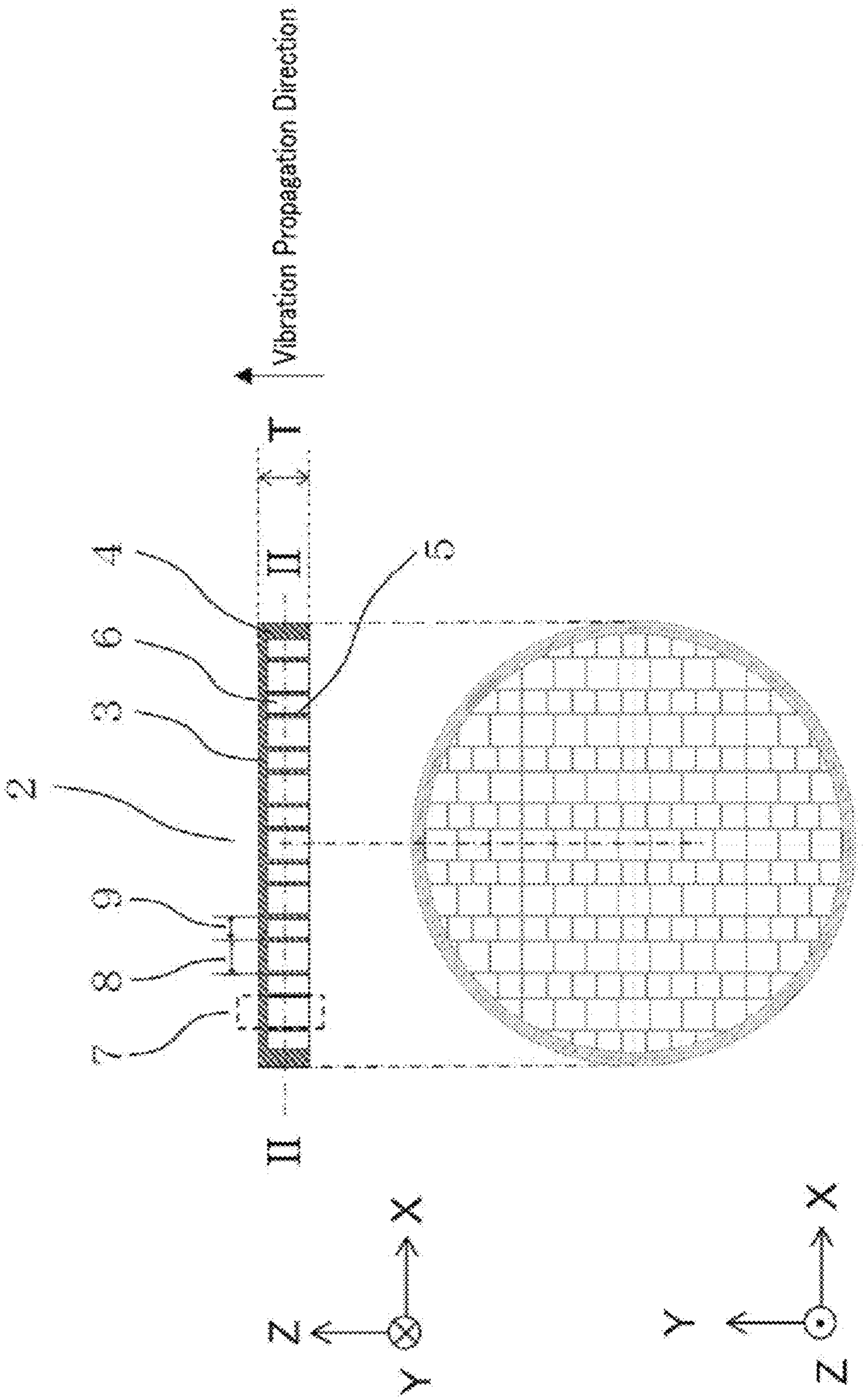
FIG. 2 illustrates a cross-sectional view of the vibration propagation member according to the first embodiment and a cross-sectional view of the vibration propagation member according to the first embodiment as taken along a line segment X.

FIG. 1 is a cross-sectional view schematically illustrating an exemplary configuration for a vibration propagation member 2 according to the first embodiment which is provided on one surface of a vibration means 1. FIG. 1 illustrates a cross section of the vibration propagation member 2 as taken in the thickness direction (parallel to the Z-axis), i.e., a cross section thereof taken along an X-Z plane. As shown in FIG. 1, the vibration propagation member 2 is bonded to one surface of the vibration means 1 and vibrates as the vibration means 1 vibrates. The vibration propagation member 2 includes a top plate 3, a sidewall 4, and vertical partitions 5 arranged perpendicularly to the top plate 3 as shown in FIG. 2. The spaces defined by the top plate 3, the vertical partitions 5, and the vibration means 1 may be hermetically sealed spaces 6. Depending on the intended use, the spaces may be hermetically sealed spaces. Alternatively, as the case may be, a through hole may be provided through the vertical partitions 5 to make the spaces continuous with the vibration propagation medium via the through hole. In other words, the spaces defined by the top plate 3, the vertical partitions 5, and the vibration means 1 may be spaces continuous with the vibration propagation medium via the through hole provided through the vertical partitions 5.

Next, the internal structure of the vibration propagation member 2 will be described with reference to FIG. 2. FIG. 2 is a cross-sectional view illustrating an exemplary configuration for the vibration propagation member 2 according to the first embodiment.

Note that the upper portion of FIG. 2 is a cross-sectional view of the vibration propagation member 2 taken in the thickness direction (parallel to the Z-axis), i.e., a cross-sectional view taken along an X-Z plane. On the other hand, the lower portion of FIG. 2 is a cross-sectional view of the vibration propagation member 2 as taken along the plane II-II shown in the upper portion of FIG. 2, i.e., a cross-sectional view of the vibration propagation member 2 as taken in a direction perpendicular to the thickness direction (parallel to an X-Y plane), or a cross-sectional view thereof taken along the X-Y plane. In FIG. 2, the reference sign T is the thickness of the vibration propagation member 2 as indicated by the double-headed arrow (which is parallel to the Z-axis). Note that the cross section of the vibration propagation member 2 as taken in the direction perpendicular to the thickness direction may include vertical partitions 5 which are arranged in a grid pattern, for example, as shown in the lower portion of FIG. 2. The membrane structures 7 defined by the top plate 3 and the vertical partitions 5 each have a characteristic vibration depending on the thickness of the top plate 3 and the gap distance between the vertical partitions 5 facing each other. One membrane structure 8 and the other membrane structure 9, each belonging to those membrane structures 7, have different gap distances between the vertical partitions 5 facing each other.

Other types of vibration propagation members 2, in each of which there are multiple different gap distances between the vertical partitions 5 facing each other, are imaginable. As an example, three cross-sectional shapes of such vibration propagation members are shown in FIGS. 3A-3C, respectively.

FIGS. 3A-3C are cross-sectional views of the vibration propagation members 2 according to the first embodiment as taken in a direction perpendicular to the thickness direction thereof (i.e., parallel to an X-Y plane), in each of which there are multiple different gap distances between the vertical partitions 5 facing each other. Each of these cross-sectional views of FIGS. 3A-3C shows a structure including membrane structures defined by multiple different gap distances between the vertical partitions.

[1-1-2. Procedure of Manufacturing Vibration Propagation Member]

Next, a procedure of manufacturing the vibration propagation member 2 will be described with reference to FIGS. 4A-4D.

FIGS. 4A-4D are perspective views illustrating the procedure of manufacturing the vibration propagation member 2 according to the first embodiment. The manufacturing process of the vibration propagation member 2 proceeds from the process step shown in FIG. 4A via the process steps shown in FIGS. 4B and 4C to the process step shown in FIG. 4D.

Figure 4A:
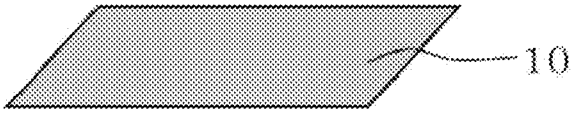
FIGS. 4A-4D are perspective views illustrating the procedure of manufacturing the vibration propagation member according to the first embodiment.
Figure 4B:
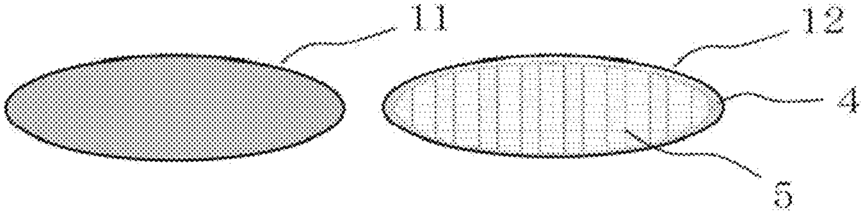

First, as shown in FIG. 4A, a plurality of metal plates 10, each of which is large enough to cut out a plurality of patterned structures therefrom, and a plurality of metal plates 10, each of which is large enough to cut out an individual patterned structure therefrom, are provided. FIG. 4A shows only one of those metal plates 10. Next, FIG. 4B shows a metal plate 11 which has been patterned into a circular shape to use the metal plate 10 as the top plate 3 and also shows a metal plate 12 on which the sidewall 4 and vertical partitions 5 of the vibration propagation member 2 have been formed by patterning. These metal plates 11, 12 may be formed either on an individual basis or simultaneously. The metal plate 10 may be patterned by, for example, punching the metal plate 10 by pressing, etching the metal plate 10 by photolithography, subjecting the metal plate 10 to laser cutting, or subjecting the metal plate 10 to electrical discharge machining using a discharge wire.

In this embodiment, the metal plate 11 patterned into a circular shape to use the metal plate 11 as the top plate 3 and the metal plate 12 on which those elements have been formed by patterning (hereinafter referred to as "patterned elements") are supposed to have been formed into a circular (disklike) external shape in top view (i.e., when viewed parallel to the Z-axis). However, this is only an example and should not be construed as limiting. Rather, the top plate 3 and the metal plate 12 having those patterned elements formed thereon according to the present disclosure do not have to have the circular (disklike) shape but may have an elliptical or polygonal shape as well.

Figure 4C:
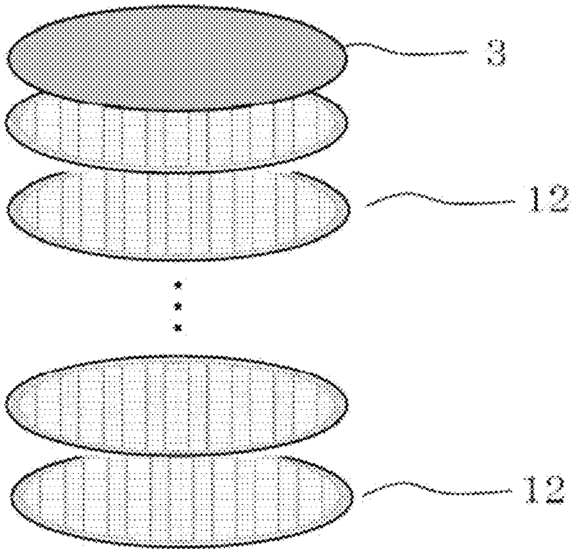

Next, as shown in FIG. 4C, the plurality of metal plates 12, on each of which those patterned elements have been formed, and the top plate 3 are sequentially stacked one on top of another while being aligned with each other. Specifically, first, a predetermined number of metal plates 12, each having those patterned elements formed thereon, are stacked one on top of another. Next, the top plate 3 is laid on top of the uppermost surface of the plurality of metal plates 12, each having those patterned elements formed thereon (i.e., on the surface, facing the positive Z-axis direction, of the metal plate 12 disposed at the top in the positive Z-axis direction and having those patterned elements formed thereon). Subsequently, those patterned metal plates are joined together, by diffusion joining, which is an exemplary direct joining technique, in a vacuum environment under heat and pressure to form an integral material. In the case of stainless steel, for example, the heating temperature during the diffusion joining process is about 1,000° C. while stainless steel has a melting point of about 1500° C. Thus, when made of stainless steel, those metal plates 12 that are stacked one on top of another and the top plate 3 may be joined together by heating the metal plates 12 and the top plate 3 to this temperature in a vacuum under pressure with atoms on the junction interface allowed to diffuse and with the base metal not allowed to melt.

Note that the diffusion joining requires some degree of planarity. Thus, depending on the process step shown in FIG. 4C, a posterior process step of removing bur and deformation from the metal plate 11 that has been patterned into the circular shape and the metal plates 12, each having those patterned elements formed thereon, may need to be performed after the process step shown in FIG. 4B has been performed. Alternatively, a melt welding process for partially melting the base metal may also be used as another direct joining technique. In the case of stainless steel, the melt welding technique allows a plurality of metal plates to be joined together by heating the metal plates to around 1500° C. Still alternatively, according to another method for joining the metal plates, an epoxy resin or cyanoacrylate adhesive may also be used as a bonding material between the metal plates. Yet alternatively, if an inorganic material is selected as the bonding material, then brazing may also be used.

Figure 4D:
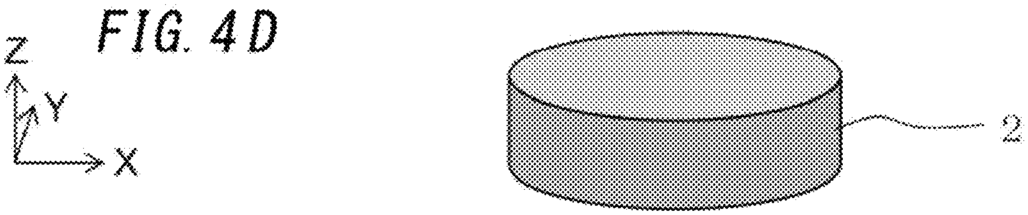

Performing this manufacturing procedure allows a vibration propagation member 2 according to the first embodiment, in which the respective patterned metal plates have been joined together by the joining method according to this embodiment, to be completed as shown in FIG. 4D. In this embodiment, the vibration propagation member is eventually formed to have a circular columnar external shape. However, this is only an example and should not be construed as limiting. Rather, the vibration propagation member according to the present disclosure does not have to have the circular columnar shape but may have an elliptic cylindrical shape or a polygonal prism shape as well.

[1-2. Vibration Transceiver]

[2-1. Configuration for Vibration Transceiver]

Figure 5:
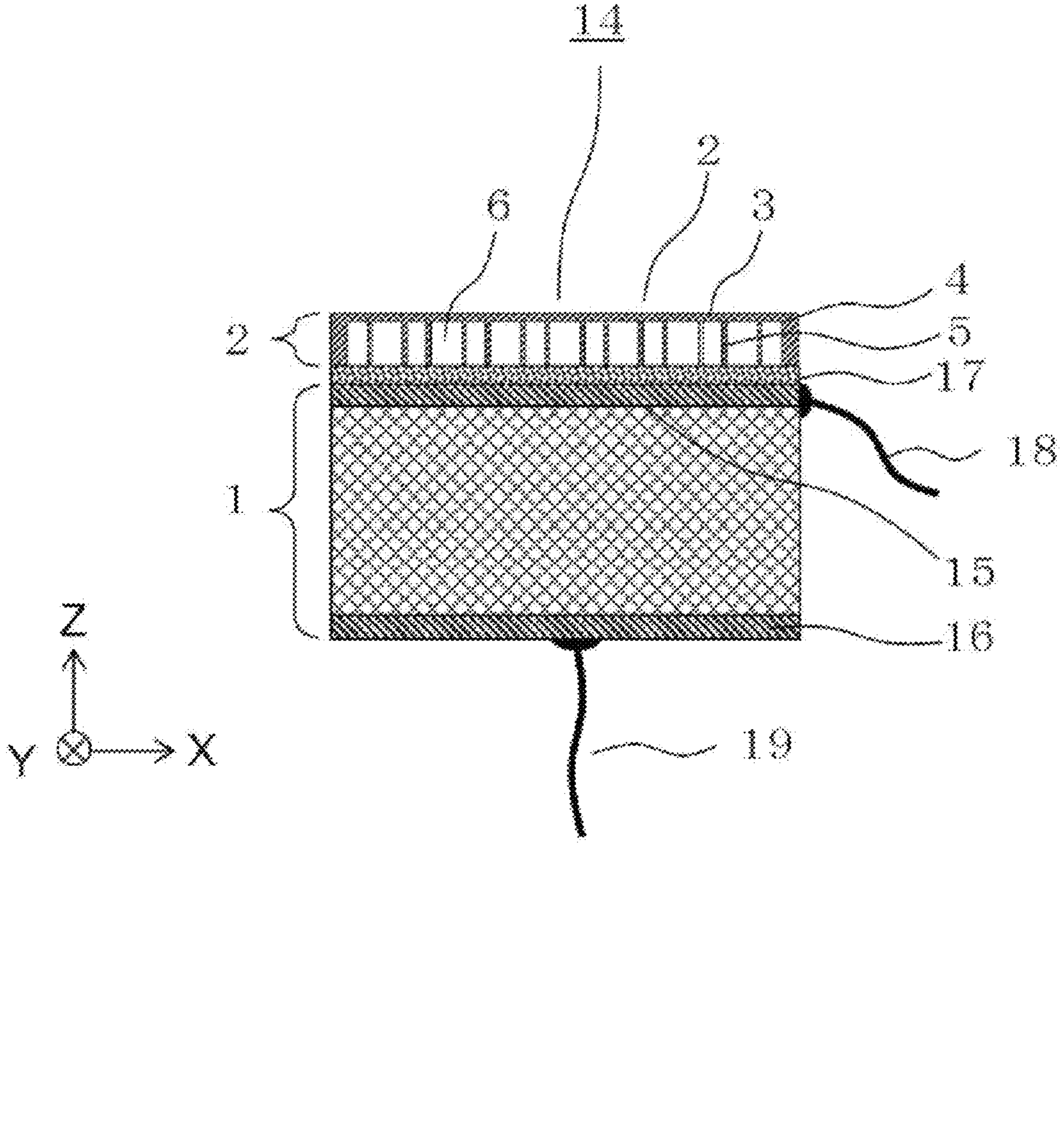
FIG. 5 is a cross-sectional view of a vibration transceiver according to the first embodiment.

FIG. 5 is a cross-sectional view schematically illustrating an exemplary configuration for a vibration transceiver 14 according to the first embodiment. FIG. 5 illustrates a cross section of the vibration transceiver 14 as taken in the thickness direction (parallel to the Z-axis), i.e., a cross-sectional view taken along an X-Z plane.

As shown in FIG. 5, the vibration transceiver 14 includes: a vibration means 1 having one electrode 15 and the other electrode 16; the vibration propagation member 2 bonded to one surface of the vibration means 1; and lead wires 18, 19 respectively electrically connected to the electrodes 15, 16 of the vibration means 1.

[1-2-2. Procedure of Manufacturing Vibration Transceiver]

Next, a procedure of manufacturing the vibration transceiver 14 will be described with reference to FIG. 6.

Figure 6:
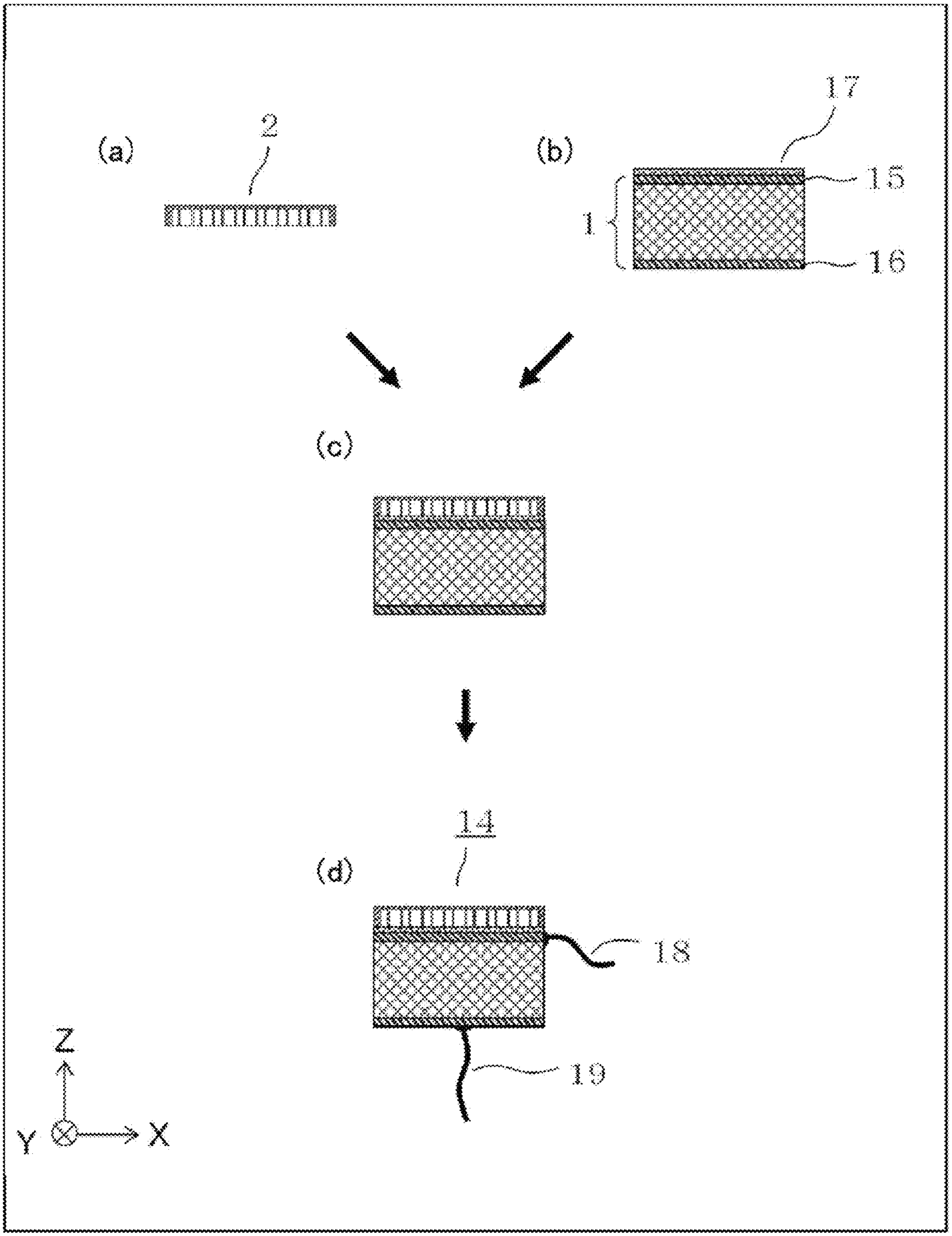
FIG. 6 is a set of cross-sectional views illustrating the procedure of manufacturing the vibration transceiver according to the first embodiment.

FIG. 6 shows a set of cross-sectional views illustrating the procedure of manufacturing the vibration transceiver 14 according to the first embodiment. The manufacturing process of the vibration transceiver 14 proceeds from the process step shown in portion (a) of FIG. 6 via the process steps shown in portions (b) and (c) of FIG. 6 to the process step shown in portion (d) of FIG. 6.

Portion (a) of FIG. 6 is a cross-sectional view of the vibration propagation member 2 that has been described for the first embodiment. Portion (b) of FIG. 6 shows a cross section of the vibration means 1 which includes the one electrode 15 and the other electrode 16 and in which a bonding material 17 is applied onto the surface of the one electrode 15. The bonding material 17 may be a general adhesive such as an epoxy adhesive, a phenol adhesive, or a cyanoacrylate adhesive. The bonding material 20 may be a thermosetting adhesive, for example. The thermosetting adhesive may be any thermosetting resin without limitation. Examples of the thermosetting resin include epoxy resins, phenol resins, polyester resins, and melamine resins. As the case may be, even a thermoplastic resin may also be used as long as the glass transition temperature thereof is equal to or lower than 70° C., which is the upper limit of the operating temperature.

Portion (c) of FIG. 6 illustrates a state where the vibration means 1 and the vibration propagation member 2 are bonded together by causing a chemical reaction to any of these bonding materials 17. Portion (d) of FIG. 6 illustrates a state where the vibration transceiver 14 according to the first embodiment is completed by electrically bonding, by soldering, the lead wires 18, 19 to the one electrode 15 and the other electrode 16, respectively, provided for the vibration means 1.

[1-2-3. Operation and Advantages of Vibration Transceiver]

Next, the operation and advantages of the vibration transceiver 14 will be described. In the following description, a piezoelectric vibrator is supposed to be used as an exemplary vibration means 1.

To the vibration transceiver 14, an electric pulse having either a sinusoidal wave or a square wave with a predetermined frequency is applied via the one lead wire 18 and the other lead wire 19 of the piezoelectric vibrator for use as the vibration means 1. This electric pulse causes the piezoelectric vibrator as the vibration means 1 to produce vibration. This vibration is transmitted to the top plate 3 via the vertical partitions 5 of the vibration propagation member 2. In this case, the vibration transmitted to the vibration propagation member 2 causes the vibration propagation member 2 to produce significant resonance by adjusting the shape of the vibration propagation member 2, the respective shapes of the top plate 3 of the vibration propagation member 2 and the vertical partitions 5 provided in the internal space of the sidewall 4, the thickness of the vertical partitions 5, the gap distance between the vertical partitions, the thickness of the sidewall 4, and the thickness T of the vibration propagation member 2. Consequently, the vibration may be transmitted efficiently to the vibration propagation medium such as a gas or a liquid to which the vibration should be transmitted. Thus, it can be seen that the characteristics of the vibration transceiver 14 may be controlled by adjusting a lot of design parameters (including the shape of the vibration propagation member 2, the shape of the vertical partitions 5, the thickness of the vertical partitions 5, the gap distance between the vertical partitions 5, the thickness of the sidewall 4, and the thickness T of the vibration propagation member 2), and therefore, the vibration propagation member 2 allows a high degree of freedom of design.

[1-2-4. Correlation Between Structure of Vibration Propagation Member and Characteristics of Vibration Transceiver]

Next, the correlation between the membrane structures of the vibration propagation member 2 and the characteristics of the vibration transceiver 14 will be described with reference to FIGS. 7A-9.

Figure 7A:
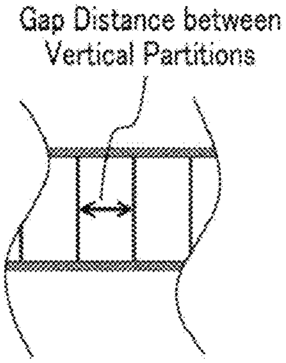
FIG. 7A is a partially enlarged view of the vibration propagation member according to the first embodiment of the present disclosure.
Figure 7B:
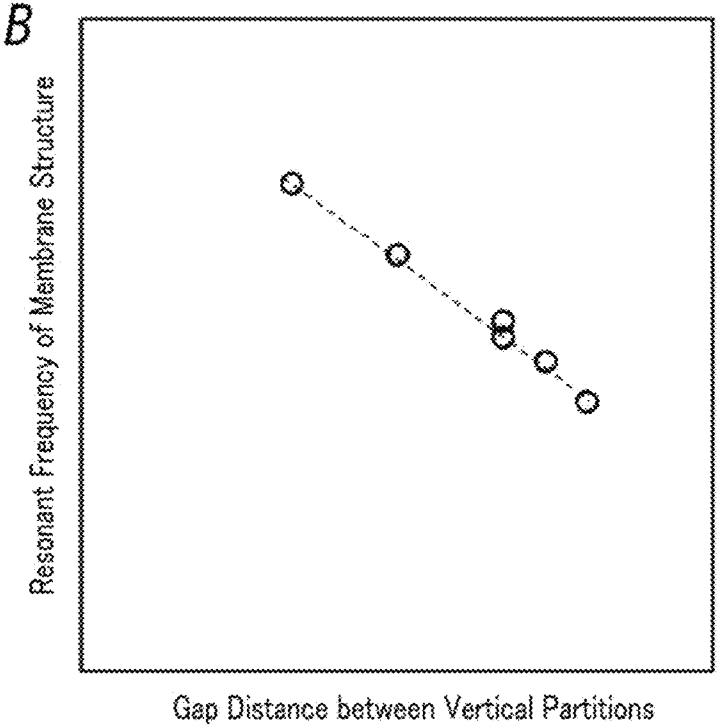
FIG. 7B shows how the resonant frequency of a membrane structure of the vibration propagation member according to the first embodiment of the present disclosure is correlated with the gap distance between vertical partitions of the vibration propagation member.

FIG. 7B shows how the gap distance between the vertical partitions of the vibration propagation member 2 (refer to FIG. 7A) is corrected with the resonant frequency of the vibration propagation member 2 when the vibration transceiver 14 according to the first embodiment of the present disclosure is adopted. As shown in FIG. 7B, the resonant frequency of the membrane structures may be controlled by changing the gap distance between the vertical partitions.

Figure 8A:
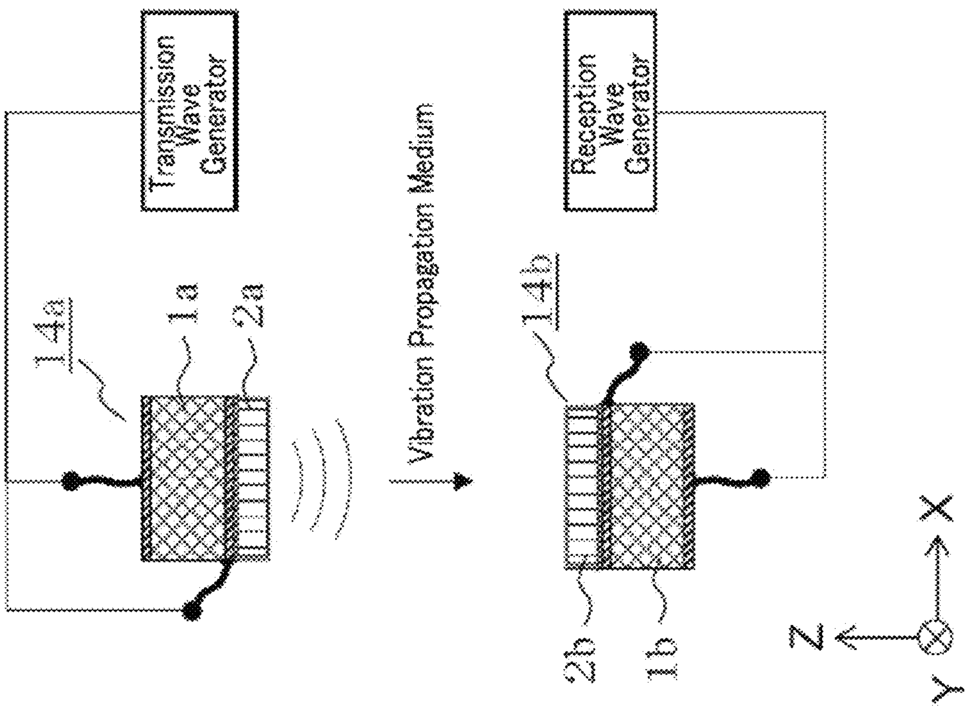
FIG. 8A is a schematic cross-sectional view for use to describe a method for measuring a vibration propagation waveform.
Figure 8B:
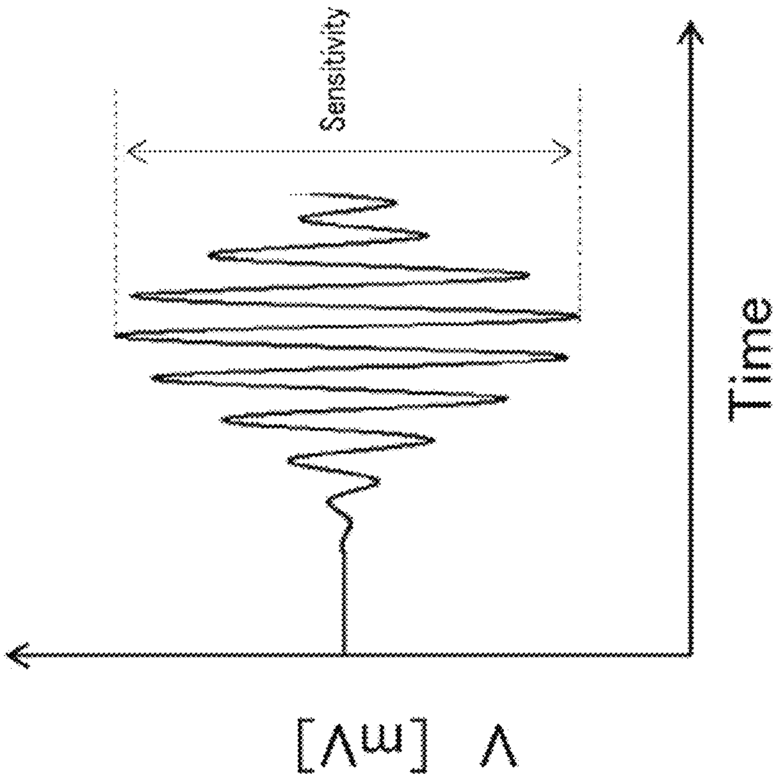
FIG. 8B shows a reception waveform of a vibration transceiver according to the first embodiment.

FIG. 8 is a cross-sectional view showing a method for measuring a vibration propagation waveform. When a transmission wave generator transmits a transmission pulse wave to a vibration transceiver 14*a*, a vibration means 1*a* of the vibration transceiver 14*a* produces a vibration at a frequency corresponding to the transmission pulse. This vibration causes a vibration propagation member 2*a* to produce resonance. As a result, amplified vibration propagates through the vibration propagation medium. When the vibration propagating reaches a vibration transceiver 14*b* located at a certain distance, a vibration propagation member 2*b* of the vibration transceiver 14*b* produces resonance. This vibration causes a vibration means 1*b* to produce vibration. Then, the vibration is transformed by the vibration means 1*b* into an electrical signal. As a result, the vibration may be measured by a reception wave measuring instrument. FIG. 8B shows the reception waveform measured by the configuration shown in FIG. 8A. The amplitude between the maximum and minimum values of the waveform shown in FIG. 8B will be hereinafter referred to as "sensitivity."

Figure 9:
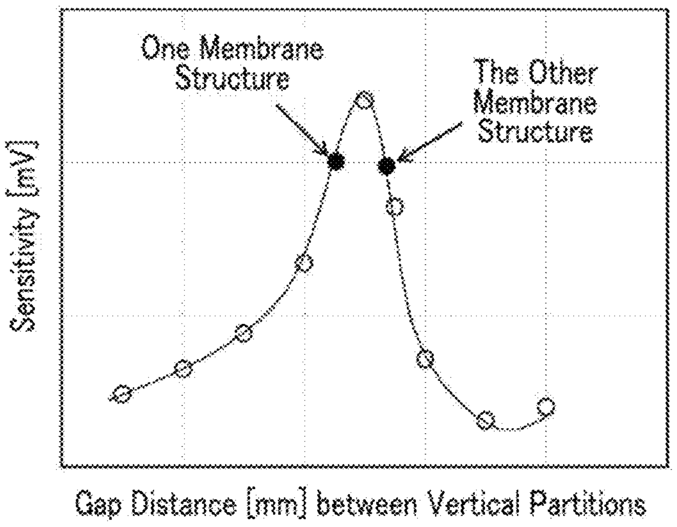
FIG. 9 is a graph showing how the sensitivity of the vibration transceiver according to the first embodiment is correlated with the gap distance between the vertical partitions.

FIG. 9 shows the correlation between the sensitivity of the vibration transceiver 14 according to the first embodiment and the gap distance between the vertical partitions.

As for the sensitivity, the vibration propagation efficiency thereof reaches a local maximum value depending on the gap distance between the vertical partitions. This is probably because the characteristic vibration, induced by the membrane structure 7 defined by the gap distance between the vertical partitions and the thickness of the top plate 3 with respect to, for example, the vibration frequency of the piezoelectric member for use as the vibration means would have caused the membrane structure 7 to produce significant resonance, due to the varying gap distances between the vertical partitions, while the vibration means 1 produced vibration, thus causing the sensitivity to reach the local maximum value. That is to say, as for this sympathetic vibration, the resonant frequency thereof may be controlled by adjusting the parameters of the membrane structures 7 each defined by the vertical partitions 5 and the top plate 3 such as the gap distance between the vertical partitions, the thickness of the top plate, and the thickness of the vertical partitions.

The vibration propagation member according to this embodiment is a structure for transmitting the vibration produced by the plurality of membrane structures defined by the top plate 3 and the vertical partitions 5. That is to say, the vibration propagation member according to this embodiment is a structure that uses the vibration produced by the plurality of membrane structures defined by the top plate 3 and the vertical partitions 5. A high-sensitivity vibration transceiver 14 may be provided by controlling the gap distances between the vertical partitions such that the plurality of membrane structures includes one membrane structure and the other membrane structure as shown in FIG. 9.

Figure 10B:
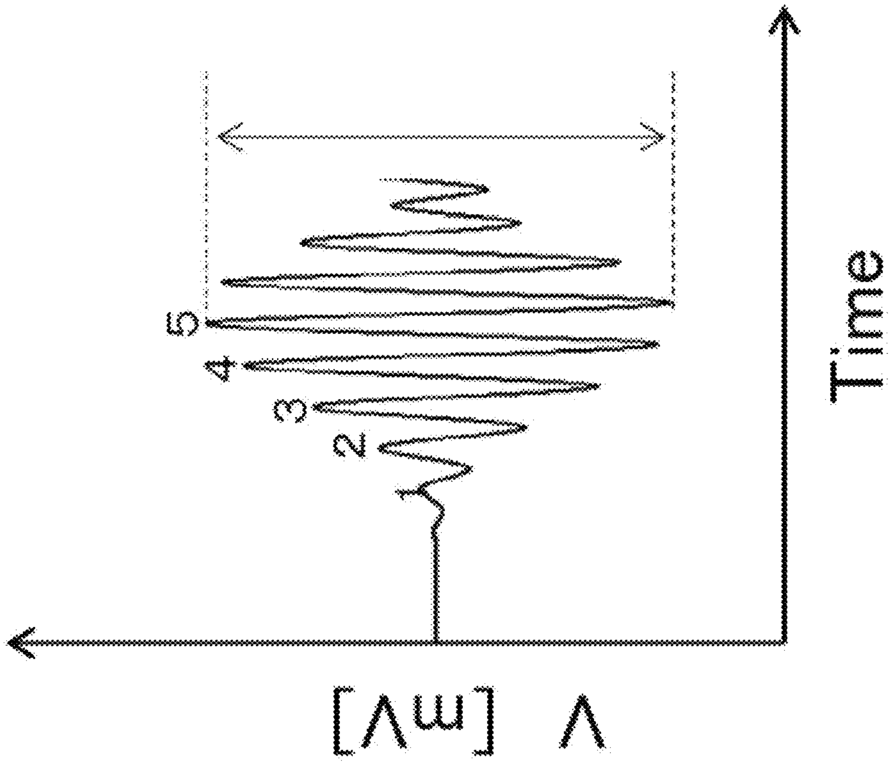
FIGS. 10A and 10B show a relationship between one membrane vibrating resonant frequency $f_1$, the other membrane vibrating resonant frequency $f_2$, and reception waveform according to the first embodiment.
Figure 10A:
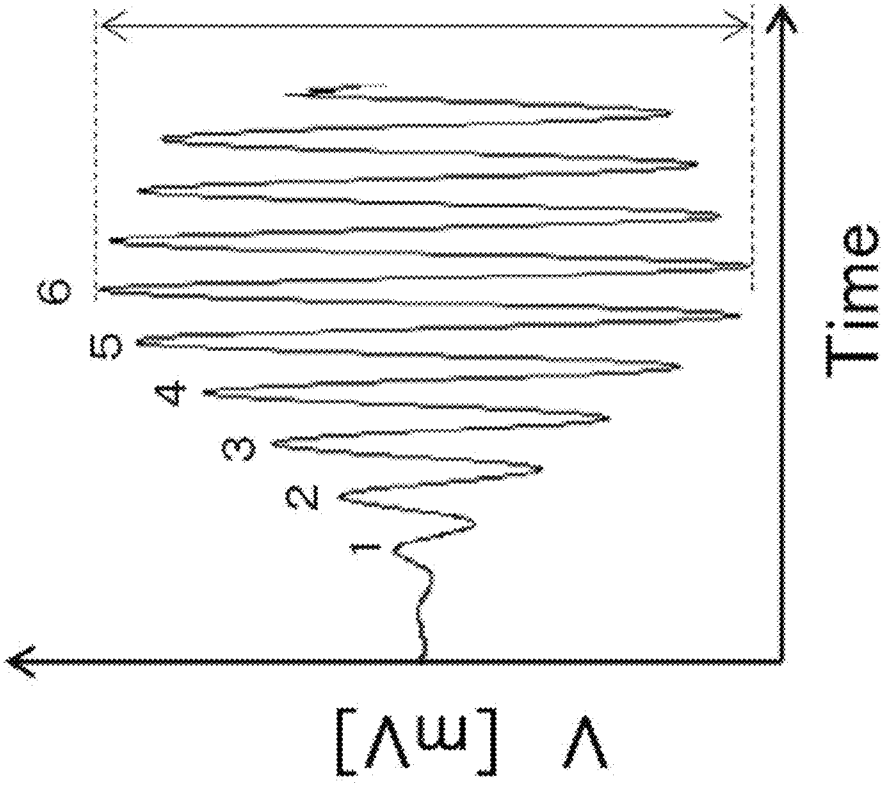

FIG. 10A shows a reception waveform obtained by the method for measuring the oscillatory waveform shown in FIG. 8A. Specifically, FIG. 10A shows the reception waveform when the difference ($f_2-f_1$) in resonant frequency is 30 kHz, where the resonant frequency (hereinafter referred to as "one membrane vibrating resonant frequency $f_1$") of the vibration induced by the one membrane structure 8 of the vibration propagation member 2 according to the present disclosure is 485 kHz and the resonant frequency (hereinafter referred to as "the other membrane vibrating resonant frequency $f_2$") of the vibration induced by the other membrane structure 9 thereof is 515 kHz. FIG. 10B shows a reception waveform when the difference in resonant frequency is 50 kHz, where the resonant frequency of the vibration induced by the one membrane structure 8 is 475 kHz and the resonant frequency of the vibration induced by the other membrane structure 9 thereof is 525 kHz.

If the amplitude of the waveform (i.e., sensitivity) needs to be as large as possible, the measuring system adopted from various measuring systems may be designed to have the reception waveform shown in FIG. 10A. On the other hand, if the number of waves needs to be as small as possible, then the measuring system adopted from various measuring systems may be designed to have the reception waveform shown in FIG. 10B. Determining a supposed reception waveform and changing the structure of the vibration propagation member 2 according to the type of the system required makes the vibration propagation member 2 compatible with any of various types of measuring systems. Using the vibration propagation member according to this embodiment makes the one membrane vibrating resonant frequency $f_1$ and the other membrane vibrating resonant frequency $f_2$ controllable independently of each other. Thus, the vibration propagation waveform may also be designed with a relatively high degree of freedom by using the vibration propagation member 2 according to this embodiment.

[1-2-5. Advantages]

As can be seen from the foregoing description, the vibration transceiver 14 according to this embodiment includes the vibration means 1 and the vibration propagation member 2 configured to operate by being bonded to one surface of the vibration means 1. The vibration propagation member 2 includes the top plate 3, the sidewall 4, and the vertical partitions 5 arranged perpendicularly to the top plate 3. Thus, vibration transceiver 14 may control the vibration induced by a membrane structure 7 defined by the thickness of the vertical partitions, the gap distance between the vertical partitions, the thickness of the top plate, and other parameters. The vibration transceiver 14 which includes a plurality of such membrane structures 7 and in which the vibration propagation member 2 is bonded to the vibration means 1 may freely control the frequency of the vibration to transmit and receive. Consequently, a vibration propagation member 2 that allows a high degree of freedom of design may be provided.

In addition, making the spaces defined by the top plate 3, the vertical partitions 5, and the vibration means 1 hermetically sealed spaces 6 allows the vibration transceiver 14 to operate with good stability even when the vibration transceiver 14 is exposed to either a corrosive environment or a high-temperature, high-humidity environment. Furthermore, the vibration propagation member 2 does not use the vibration in the thickness direction, and therefore, may have its thickness reduced.

[1-3. Velocity Meter or Flowmeter]

[3-1. Configuration for Velocity Meter or Flowmeter]

Next, a flowmeter according to this embodiment will be described with reference to FIG. 10. Note that although the following description will be focused on the flowmeter 23, almost the same statement is applicable to a velocity meter 24 as well. In that case, the same statement applies by replacing the "flow rate" in the following description with "flow velocity." Alternatively, the measuring instrument shown in FIG. 11 may be a measuring instrument with the ability to measure both flow rate and flow velocity as well.

Figure 11:
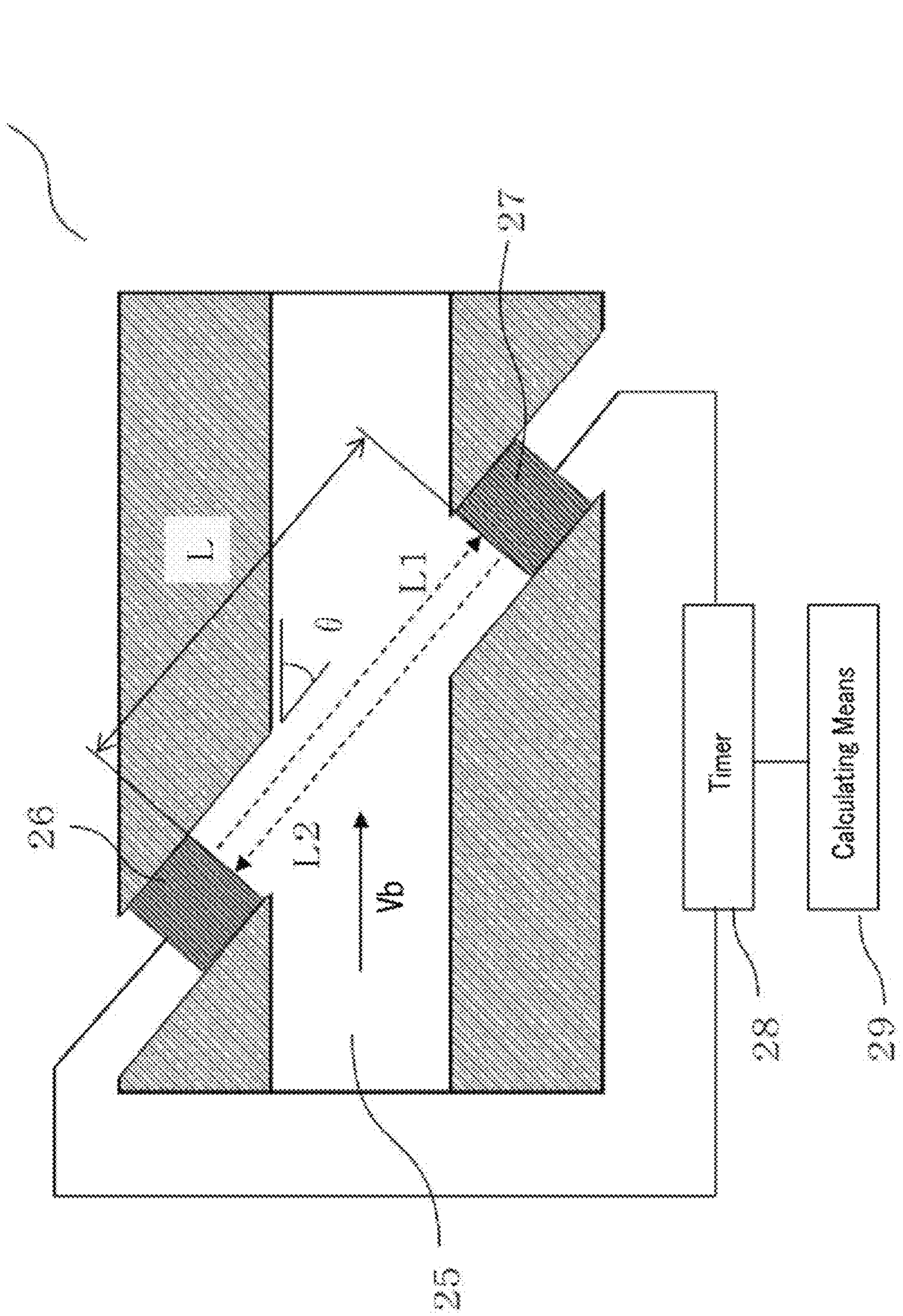
FIG. 11 is a schematic representation of a flowmeter/velocity meter according to the first embodiment.

FIG. 11 is a block diagram schematically illustrating an exemplary configuration for the flowmeter 23 according to the first embodiment.

In the flowmeter 23 according to the first embodiment, an oscillatory frequency range in which the vibration is transmitted and received is supposed to be an ultrasonic range, for example, the vibration transceiver is supposed to be an ultrasonic transceiver for transmitting and receiving an ultrasonic wave, and the flowmeter will be hereinafter referred to as an "ultrasonic flowmeter."

As shown in FIG. 11, the flowmeter 23 according to this embodiment has a configuration in which a pair of ultrasonic transceivers 26, 27, each having the configuration of the vibration transceiver 14 according to the first embodiment described above, are arranged to face each other and respectively provided at an upstream point and a downstream point of a flow channel 25, through which a fluid flows. In the flow channel 25, the direction in which the fluid flows is indicated by the arrow. On the paper on which FIG. 11 is drawn, the left-hand side indicates an upstream part of the flow channel 25 and the right-hand side indicates a downstream part of the flow channel 25. The reference sign L1 indicated by the dotted arrow in FIG. 11 indicates the propagation path of the vibration that propagates from the ultrasonic transceiver 26 disposed at the upstream point toward the ultrasonic transceiver 27. The reference sign L2 indicated by the dotted arrow in FIG. 11 indicates the propagation path of the vibration that propagates from the ultrasonic transceiver 27 disposed at the downstream point toward the ultrasonic transceiver 26. The flowmeter 23 according to this embodiment further includes: a timer 28, to which the ultrasonic transceivers 26, 27 are connected and which measures the time of appearance of the vibration from one of the ultrasonic transceivers 26, 27 to the other of the ultrasonic transceivers 26, 27; and a calculating means 29, to which the timer 28 is connected and which calculates the flow rate of the fluid flowing through the flow channel 25 based on the time of appearance of the ultrasonic wave that has been measured by the timer 28.

Note that if the measuring instrument shown in FIG. 11 is implemented as a velocity meter 24, then the velocity meter 24 may have the same configuration as the flowmeter 23 but the calculating means 29 calculates, based on the time of appearance of the ultrasonic wave that has been measured by the timer 28, the flow velocity of the fluid flowing through the flow channel 25. Alternatively, the calculating means 29 may also be configured to calculate both the flow velocity and flow rate of the fluid flowing through the flow channel 25.

[1-3-2. Measuring Operation Performed by Velocity Meter or Flowmeter]

Suppose the flow velocity of the fluid flowing through the flow channel 25 is Vb, the velocity of the ultrasonic wave in the fluid is C (not shown), and the angle formed between the direction in which the fluid flows and the direction in which the vibration propagates is θ. In that case, the propagation time t1 it takes for vibration emitted from the ultrasonic transceiver 26 to reach the ultrasonic transceiver 27 in a situation where the ultrasonic transceiver 26 is used as an ultrasonic transmitter and the ultrasonic transceiver 27 is used as an ultrasonic receiver is given by the following Equation (3):

$$t1 = L/(C + Vb\cdot\cos\theta). \quad (3)$$

On the other hand, the propagation time t2 it takes for a vibration pulse emitted from the ultrasonic transceiver 27 to reach the ultrasonic transceiver 26 is given by the following Equation (4):

$$t2 = L/(C - Vb \cdot \cos\theta). \quad (4)$$

The following Equation (5) is obtained by eliminating the sonic velocity C of the fluid from both of these Equations (3) and (4):

$$Vb = L/2\cos\theta\left(1/t1 - 1/t2\right). \quad (5)$$

If L and θ are known, then the flow velocity Vb may be determined by making the timer 28 measure t1 and t2. In addition, the flow rate Q may be determined by making the calculating means 29 multiply the flow velocity Vb by a cross-sectional area S and a coefficient of correction K. The calculating means 29 in the flowmeter 23 calculates the flow rate Q by the equation Q=K·S·Vb.

[1-3-3 Advantages of Velocity Meter or Flowmeter]

As can be seen from the foregoing description, the vibration transceiver 14 according to this embodiment includes the vibration means 1 and the vibration propagation member 2 configured to operate by being bonded to one surface of the vibration means. The vibration propagation member 2 includes the top plate 3, the sidewall 4, and the vertical partitions 5 arranged perpendicularly to the top plate 3. Thus, vibration transceiver 14 may control, on an individual basis, the vibration induced by a membrane structure 7 defined by the thickness of the vertical partitions, the gap distance between the vertical partitions, the thickness of the top plate, and other parameters. The vibration transceiver 14 which includes a plurality of such membrane structures and in which the vibration propagation member 2 is bonded to the vibration means 1 may freely control the frequency of the vibration to transmit and receive. Consequently, a vibration propagation member 2 that allows a high degree of freedom of design may be provided. This allows a vibration transceiver suitable for use as a velocity meter or a flowmeter to be provided easily, thus enabling measuring the flow velocity and flow rate with both high accuracy and good stability.

In addition, making the spaces defined by the top plate 3, the vertical partitions 5, and the vibration means 1 hermetically sealed spaces 6 allows the flow velocity and flow rate to be measured directly even when the fluid under measurement is either a corrosive fluid or a high-temperature, high-humidity fluid. Furthermore, the vibration propagation member 2 does not use the vibration in the thickness direction, and therefore, may have its thickness reduced, and the vibration transceiver 14 may also be downsized. Consequently, this allows the velocity meter and the flowmeter to be downsized.

[1-4. Concentration Meter]

[4-1. Configuration and Measuring Principle of Concentration Meter]

Next, it will be described with reference to FIG. 12 how a concentration meter operates to measure the concentration of a gas using an ultrasonic wave.

Figure 12:
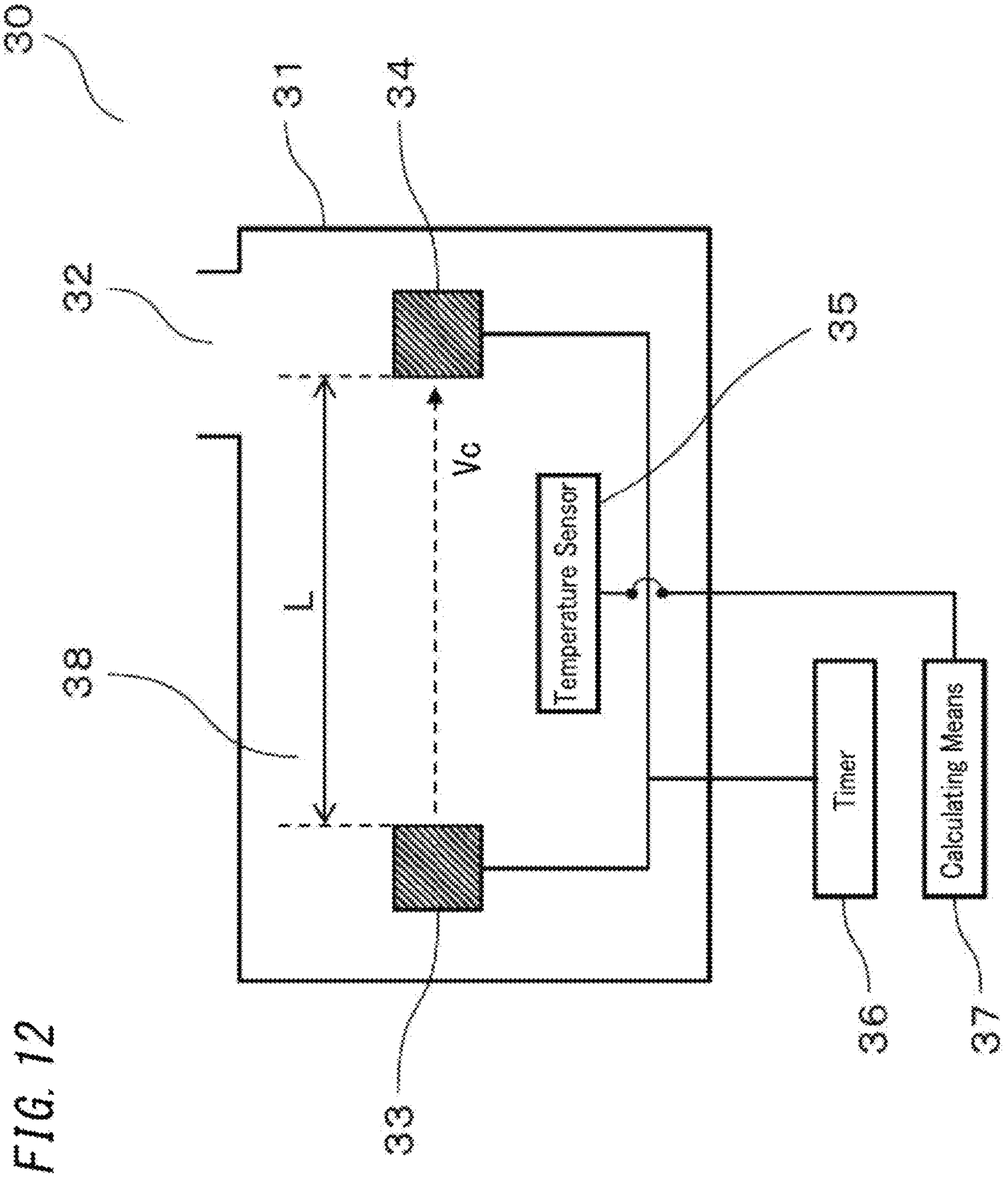
FIG. 12 is a schematic representation of a concentration meter according to the first embodiment.

FIG. 12 is a schematic cross-sectional view of a concentration meter according to an embodiment of the present disclosure. In the concentration meter 30 according to the first embodiment, an oscillatory frequency range where the vibration is transmitted and received is supposed to be an ultrasonic range, for example, the vibration transceiver 14 is supposed to be used as each of ultrasonic transceivers 33, 34 for transmitting and receiving an ultrasonic wave, and the concentration meter will be hereinafter referred to as an "ultrasonic concentration meter."

The concentration meter according to the present disclosure has a housing 31 having a space where the concentration of a gas is measured. The housing 31 has a vent hole 32 through which a fluid under measurement is allowed to pass. A concentration measuring space in the housing 31 is supposed to have, for example, a rectangular parallelepiped shape or a circular cylindrical shape. The concentration measuring space does not have to be entirely surrounded with the walls of the housing 31 in all directions but has only to be a space in which an ultrasonic wave may be transmitted and received. For example, the housing 31 may be partially cut out and the concentration measuring space may be opened to the external environment through the cutout portion.

In the concentration meter, a pair of ultrasonic transceivers 33, 34 are arranged inside the housing 31 to face each other, and a temperature sensor 35 is also housed inside the housing 31. The concentration meter is connected to a timer 36 and a calculating means 37. When used as an ultrasonic transmitter, the ultrasonic transceiver 33 transmits the ultrasonic wave in accordance with the operation of the timer 36. In that case, the ultrasonic transceiver 34 serves as an ultrasonic receiver. The ultrasonic wave transmitted from the ultrasonic transceiver 33 propagates through the fluid under measurement that fills the inside of the housing 31. The ultrasonic transceiver 34 for use as an ultrasonic receiver receives the ultrasonic wave. The timer 36 determines the propagation velocity Vc of the ultrasonic wave based on the propagation time it takes for the ultrasonic wave transmitted to be received and a predetermined propagation distance L of the ultrasonic wave.

The propagation velocity Vc of the ultrasonic wave propagating through a mixed gas as the fluid under measurement is determined by the average molecular weight M, heat capacity ratio γ, gas constant R, and absolute temperature T (K) of the mixed gas as expressed by the following Equation (6). The average molecular weight may be determined by measuring the sonic velocity and the temperature.

$$V = \gamma \cdot R \cdot T/M. \quad (6)$$

If the gas component in the mixed gas is known, then the average molecular weight M may be determined by measuring the gas temperature T and the propagation velocity Vc and the gas concentration may be calculated based on the average molecular weight M. In the case of an ideal gas as a two-species mixture (i.e., a mixture of gas (a) and gas (b)), the concentration may be calculated by the following Equation (7):

$$\text{Concentration (\%) of gas } (a) = M - mb/ma - mb \times 100 \quad (7)$$

where ma and mb are respective molecular weights of gas (a) and gas (b).

[1-4-2. Advantages of Concentration Meter]

As can be seen from the foregoing description, the vibration transceiver 14 according to this embodiment includes the vibration means 1 and the vibration propagation member 2 configured to operate by being bonded to one surface of the vibration means. The vibration propagation member 2 includes the top plate 3, the sidewall 4, and the vertical partitions 5 arranged perpendicularly to the top plate 3. Thus, vibration transceiver 14 may control the vibration induced by the membrane structure 7 defined by the respective thicknesses of the vertical partitions and top plate as constituent elements of the vibration propagation member, the gap distance between the vertical partitions, and other parameters. The vibration transceiver 14 which includes a plurality of such membrane structures and in which the vibration propagation member 2 is bonded to the vibration means may freely control the frequency of the vibration to transmit and receive. Consequently, a vibration propagation member 2 that allows a high degree of freedom of design may be provided. This allows a vibration transceiver suitable for use as a concentration meter to be provided easily, thus enabling measuring the flow velocity and flow rate with both high accuracy and good stability.

In addition, making the spaces defined by the top plate 3, the vertical partitions 5, and the vibration means 1 hermetically sealed spaces 6 allows the concentration to be measured directly even when the fluid under measurement is either a corrosive fluid or a high-temperature, high-humidity fluid. Furthermore, the vibration propagation member 2 does not use the vibration in the thickness direction, and therefore, may have its thickness reduced, and the vibration transceiver 14 may also be downsized. Consequently, this allows the velocity meter and the flowmeter to be downsized as well.

Second Embodiment

A vibration propagation member according to a second embodiment and a vibration transceiver that uses the vibration propagation member will now be described with reference to FIGS. 13-21.

[2-1. Vibration Propagation Member]

[1-1. Configuration of Vibration Propagation Member]

Figure 13:
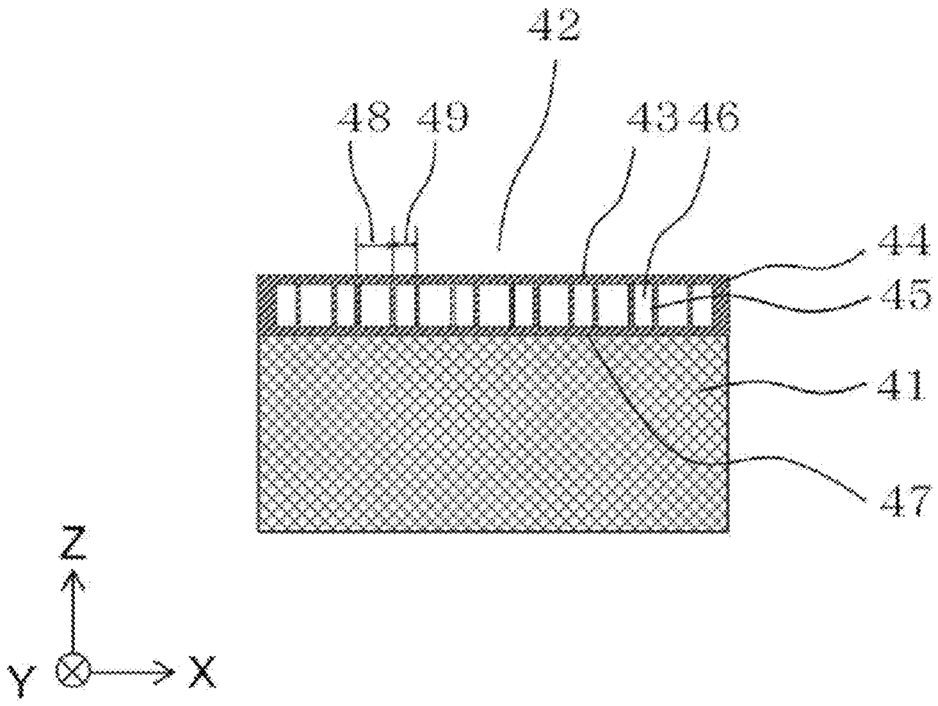
FIG. 13 is a cross-sectional view of a vibration propagation member according to a second embodiment which is provided on one surface of a vibration means.

FIG. 13 is a cross-sectional view schematically illustrating an exemplary configuration in which a vibration propagation member 42 according to the second embodiment is provided on one surface of a vibration means 41. FIG. 13 illustrates a cross section of the vibration propagation member 42 as taken in the thickness direction (parallel to the Z-axis), i.e., a cross section thereof taken along an X-Z plane. As shown in FIG. 13, the vibration propagation member 42 is bonded to one surface of the vibration means 41 and produces resonance as the vibration means 41 vibrates. The vibration propagation member 42 includes a top plate 43, a bottom plate 47, a sidewall 44, and vertical partitions 45 arranged perpendicularly to the top plate 43 and the bottom plate 47. The spaces defined by the top plate 43, the vertical partitions 45, and the bottom plate 47 may be hermetically sealed spaces 46. Depending on the intended use, the spaces may be hermetically sealed spaces 46. Alternatively, as the case may be, a through hole may be provided to make the spaces continuous with the vibration propagation medium via the through hole. In other words, the spaces defined by the top plate 43, the vertical partitions 45, and the bottom plate 47 may be spaces continuous with the vibration propagation medium via the through hole provided through the vertical partitions 45. The membrane structures 48, 49 defined by the top plate 43 and the vertical partitions 45 each have a characteristic vibration depending on the thickness of the top plate 43 and the gap distance between the vertical partitions 45 facing each other. One membrane structure 48 and the other membrane structure 49 have different gap distances between the vertical partitions 45 facing each other.

Figure 14:
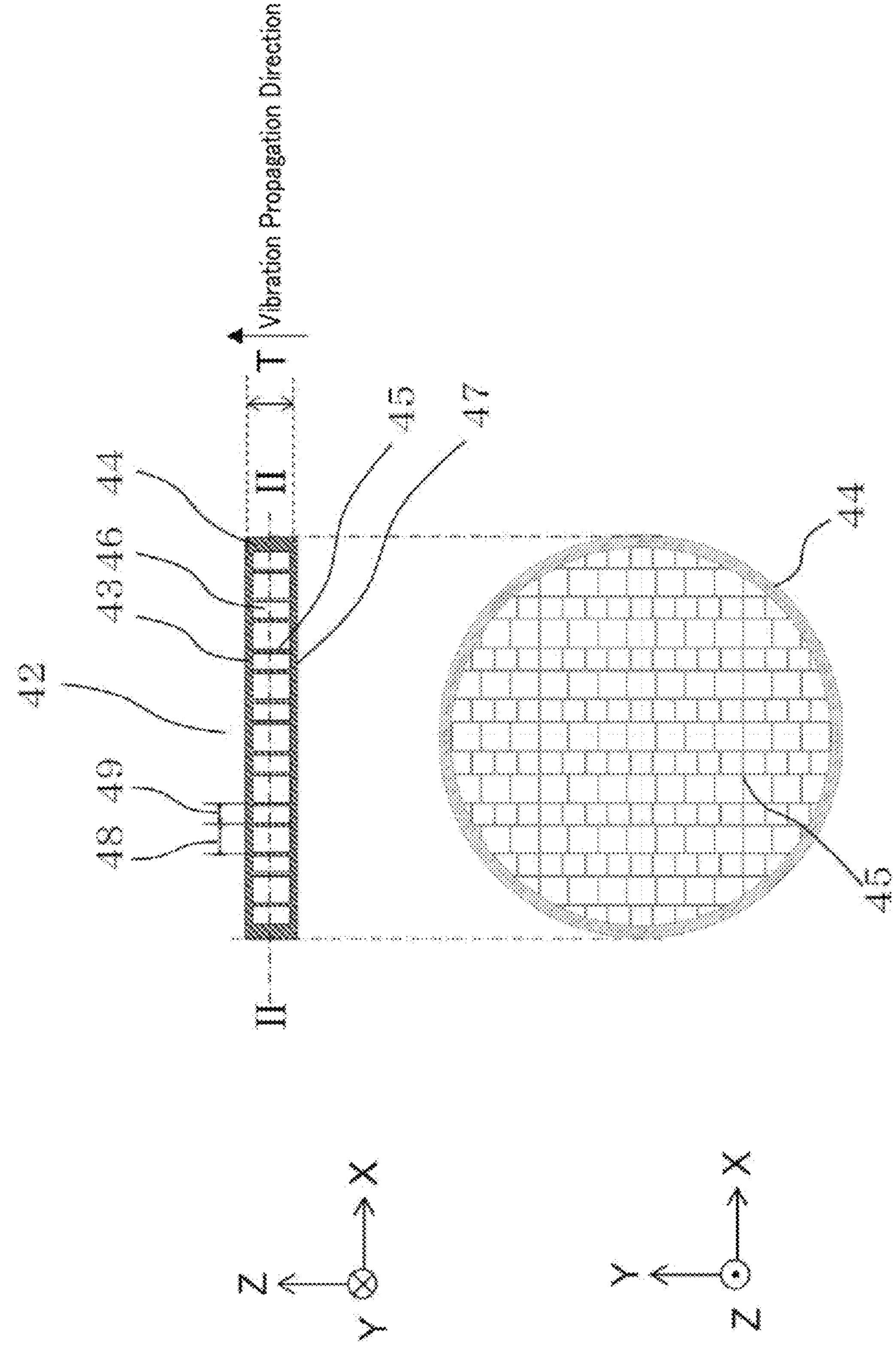
FIG. 14 illustrates a cross-sectional view of the vibration propagation member according to the second embodiment and a cross-sectional view of the vibration propagation member according to the second embodiment as taken along a line segment X.

Next, the internal structure of the vibration propagation member 42 will be described with reference to FIG. 14. FIG. 14 is a cross-sectional view illustrating an exemplary configuration for the vibration propagation member 42 according to the second embodiment.

Note that the upper portion of FIG. 14 is a cross-sectional view of the vibration propagation member 42 taken in the thickness direction (parallel to the Z-axis), i.e., a cross-sectional view taken along an X-Z plane. On the other hand, the lower portion of FIG. 14 is a cross-sectional view of the vibration propagation member 42 as taken along the plane II-II shown in the upper portion of FIG. 14, i.e., a cross-sectional view of the vibration propagation member 42 as taken in a direction perpendicular to the thickness direction (parallel to an X-Y plane), or a cross-sectional view thereof taken along the X-Y plane. In FIG. 14, the reference sign T is the thickness of the vibration propagation member 2 as indicated by the double-headed arrow (which is parallel to the Z-axis). Note that the cross section of the vibration propagation member 42 as taken in the direction perpendicular to the thickness direction may include vertical partitions 45 which are arranged in a grid pattern as shown in the lower portion of FIG. 14.

Next, the hermetically sealed spaces 46 defined by the top plate 43, the bottom plate 47, the sidewall 44, and the vertical partitions 45, arranged perpendicularly to the top plate 43, of the vibration propagation member 42 according to the second embodiment will be described with reference to FIGS. 15A-15D.

Figure 15A:
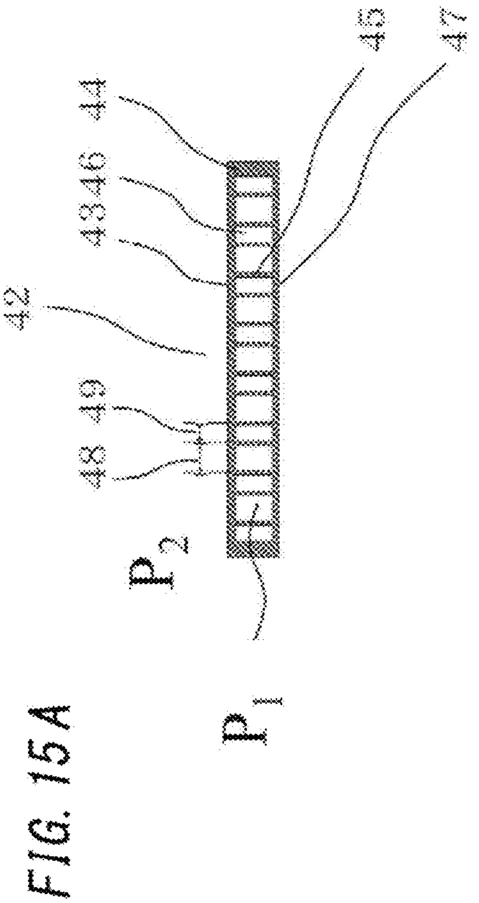
FIGS. 15A-15D are cross-sectional views showing definitions of an internal pressure P1 in a hermetically sealed space of the vibration propagation member according to the second embodiment and pressure P2 of a vibration propagation medium.
Figure 15B:
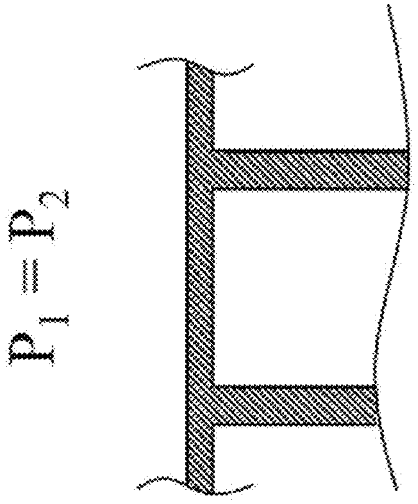
Figure 15C:
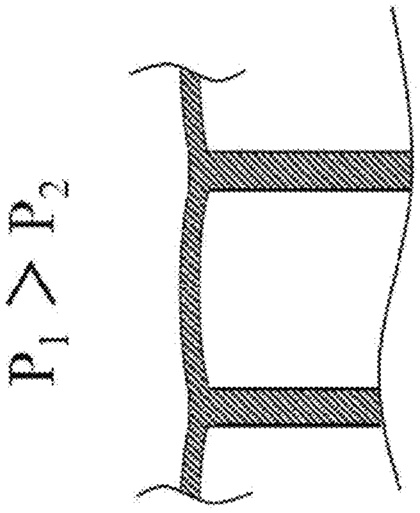
Figure 15D:
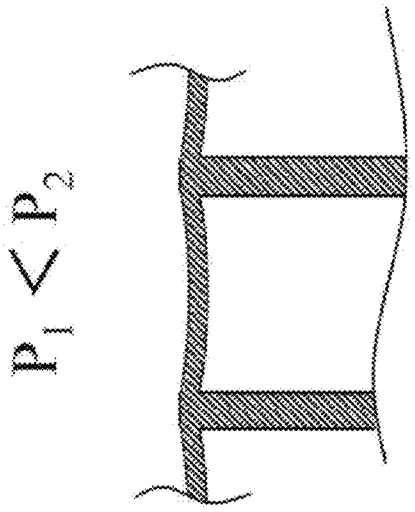

FIG. 15A is a cross-sectional view of the vibration propagation member 42 according to the second embodiment. FIG. 15B is a partially enlarged cross-sectional view of the vibration propagation member 2 in a situation where the internal pressure $P_1$ of a hermetically sealed space 46 of the vibration propagation member 42 is almost as high as the pressure $P_2$ of the vibration propagation medium. FIG. 15C is a partially enlarged cross-sectional view of the vibration propagation member 2 in a situation where the internal pressure $P_1$ of the hermetically sealed space 46 is higher than the pressure $P_2$ of the vibration propagation medium. FIG. 15D is a partially enlarged cross-sectional view of the vibration propagation member 2 in a situation where the internal pressure $P_1$ of the hermetically sealed space 46 is lower than the pressure $P_2$ of the vibration propagation medium.

If $P_1=P_2$ is satisfied as shown in FIG. 15B, then the vibration of the membrane structure 48 is not regulated by the pressure, thus making the sensitivity sufficiently high. For example, in a situation where a target parameter of the vibration propagation medium such as the pressure of the vibration propagation medium inside a high-pressure pipe is apparent, the efficiency of propagation of vibration into the vibration propagation medium may be improved and stabilized vibration propagation performance is ensured by setting the internal pressure of the hermetically sealed spaces 46 of the vibration propagation member 42 as high as the pressure of the propagation medium.

If $P_1>P_2$ is satisfied as shown in FIG. 15C, then the top plate has a raised shape. In that case, while measurement is made on a high-temperature, high-humidity fluid, liquid droplets are less likely to be collected on the vibrating surface of the top plate even with condensation formed due to high humidity. As a result, the efficiency of propagation of vibration into the vibration propagation medium may be improved with good stability and stabilized vibration propagation performance is ensured even in a high-humidity environment.

If $P_1<P_2$ is satisfied as shown in FIG. 15D, then the top plate has a recessed shape. In that case, the efficiency of propagation of vibration into the vibration propagation medium improves due to sound collection effect. Optionally, a vacuum may be created inside the vibration propagation member 42. Then, the flexure of the top plate may be reduced. In addition, the top plate 43 is regulated by the pressure, thus reducing the chances of causing reverberation, i.e., the chances of the vibration of the vibration propagation member 42 remaining unintentionally.

The inside of this hermetically sealed spaces 46 may be filled with an inert gas such as an argon gas (Ar), a nitrogen gas ($N_2$), or a helium gas (He). This may reduce the internal corrosion of the vibration propagation member 42.

Optionally, a high-viscosity liquid may be injected into some of the hermetically sealed spaces 46. In that case, damping effect that reduces the vibration at a predetermined frequency would be achieved by changing the viscosity of the liquid. This makes the vibration propagation efficiency improvable selectively only at a target oscillatory frequency.

Next, some specific implementations of vertical partitions 45 having mutually different cross-sectional shapes for the vibration propagation member 42 according to this second embodiment and the advantages achieved by them will be described.

Figure 16A:
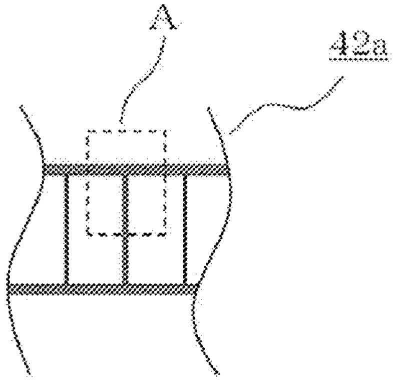
FIG. 16A is a cross-sectional view of a vibration propagation member according to the second embodiment.
Figure 16B:
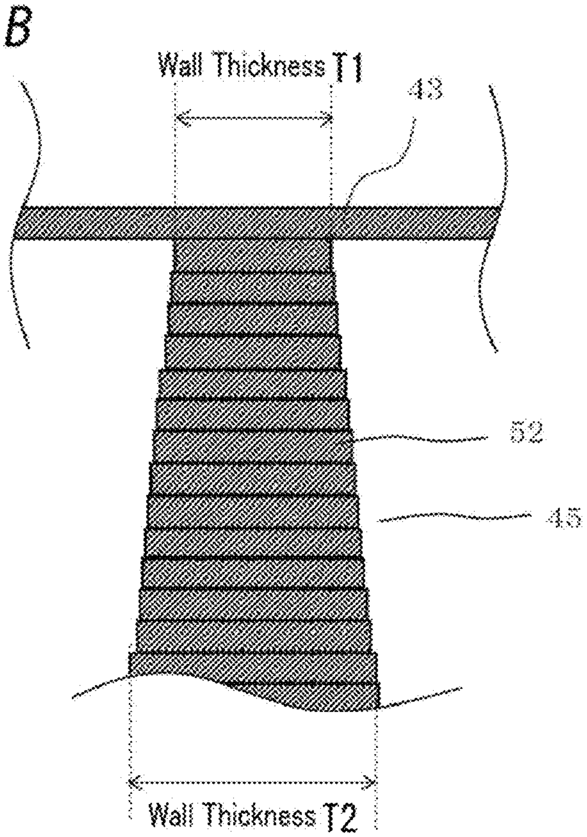
FIG. 16B is an enlarged view of part A shown in FIG. 16A.

FIG. 16B is a cross-sectional view illustrating, on a larger scale, part A of the vibration propagation member 42*a* shown in FIG. 16A as a first implementation of the second embodiment. In FIG. 16B, the vertical partition 45 has a structure in which patterned metal plates 52 are stacked one on top of another on the top plate 43 of the vibration propagation member 42*a*. In this structure, the wall thickness of the stack of these patterned metal plates 52 may vary from T1 through T2. This allows the internal structure of the vibration propagation member 42*a* to have parts with relatively high mechanical strength and parts with relatively low mechanical strength.

Setting the wall thickness of the vertical partition 45 of the vibration propagation member 42*a* at a relatively large value in the vicinity of the bottom plate 47 and at a relatively small value in the vicinity of the top plate 43 as shown in FIG. 16B allows the vibration of the vibration means 41 to propagate and be transmitted efficiently in the vicinity of the bottom plate 47 of the vibration propagation member 42*a*. In addition, setting the wall thickness of the vertical partition 45 at a relatively small value (at a wall thickness T1) in the vicinity of the top plate 43 and increasing the wall thickness of the vertical partition 45 toward the bottom surface (toward a wall thickness T2) allows the membrane structure 48 of the top plate 43 to vibrate efficiently, thus improving the efficiency of propagation of the vibration into the propagation medium. Furthermore, a broader vibration area may be ensured for the vibrating top plate 43 in each of the membrane structures 48, 49 defined by the top plate 43 and the vertical partitions 45.

Figure 17A:
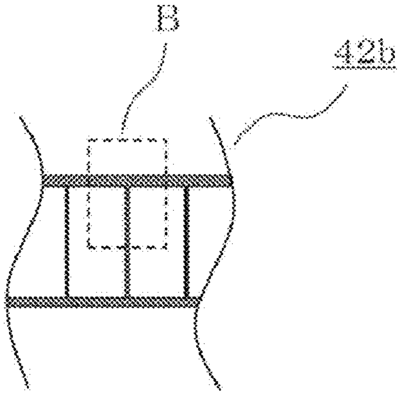
FIG. 17A is a cross-sectional view of another vibration propagation member according to the second embodiment.
Figure 17B:
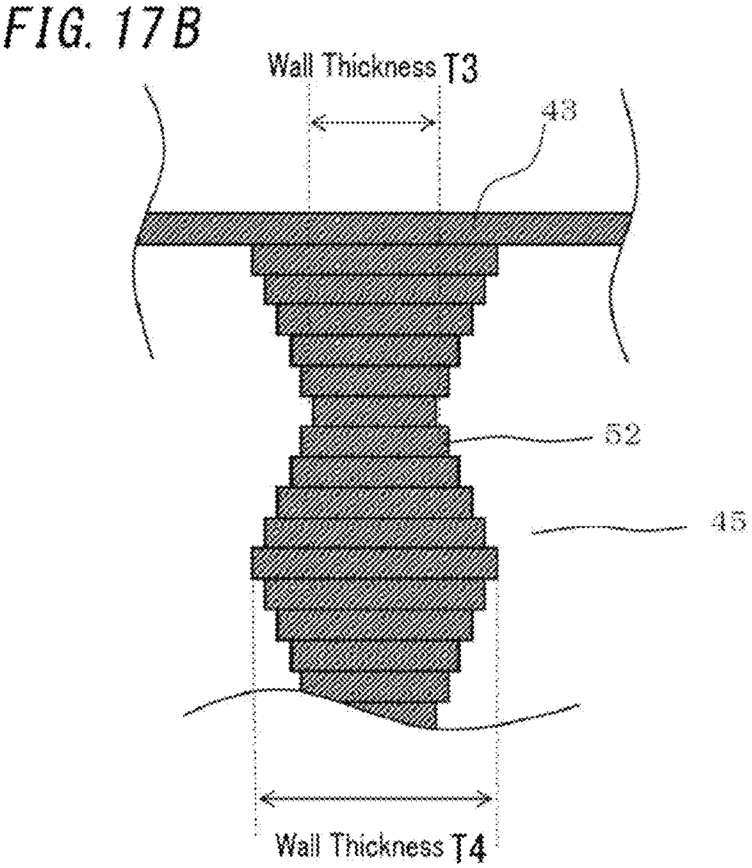
FIG. 17B is an enlarged view of part B shown in FIG. 17A.

FIG. 17B is a cross-sectional view illustrating, on a larger scale, part B of the vibration propagation member 42*b* shown in FIG. 17A as a second implementation of the second embodiment. As shown in FIG. 17B, the wall thickness of the vertical partition 45 may vary in the vibration propagation direction to change gradually and increase and decrease alternately and repeatedly.

Setting the wall thickness of a particular part of the vertical partition 45, corresponding to a peak of the vibration transmitted through the vertical partition 45 of the vibration propagation member 42, at a relatively large value allows only the vibration at a target frequency to be reduced selectively. In addition, the vertical partition 45 serves as a very important column for transmitting the vibration of the vibration propagation member 42*b*. Letting a particular part of the vibration propagation member 42*b* have a wall thickness with low mechanical strength (corresponding to a wall thickness T2) causes an increase in the vibration damping rate of the vibration propagation member 42*b*. This would achieve the advantage of letting the reverberation fade away quickly. In addition, this would also achieve the advantage of setting up the vibration promptly.

Figure 18B:
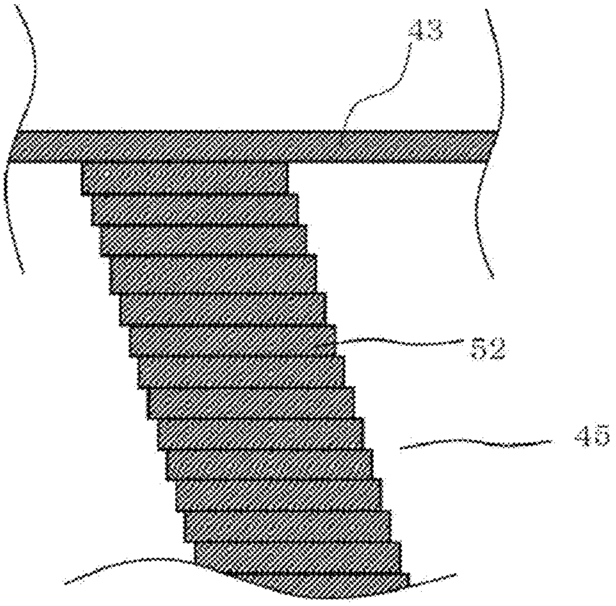
FIG. 18B is an enlarged view of part C shown in FIG. 18A.
Figure 18A:
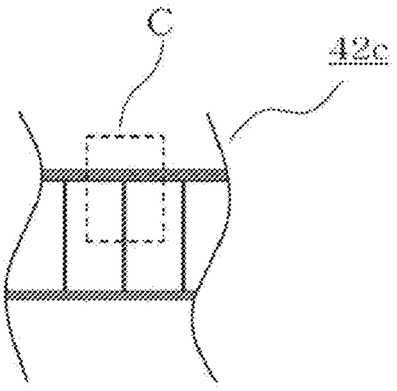
FIG. 18A is a cross-sectional view of another vibration propagation member according to the second embodiment.

FIG. 18B is a cross-sectional view illustrating, on a larger scale, part C of the vibration propagation member 42*c* shown in FIG. 18A as a third implementation of the second embodiment. As shown in FIG. 18B, a plurality of patterned metal plates 52 may be stacked one on top of another to slightly shift from each other and thereby form a vertical partition 45 with an inclined pattern. As a result, the vertical partition 45 may be formed obliquely. This may extend the propagation path of the vibration and delay the time of appearance of the vibration, thus enabling controlling the sonic velocity.

FIG. 19B is a cross-sectional view illustrating, on a larger scale, part D of the vibration propagation member 42*d* shown in FIG. 19A as a fourth implementation of the second embodiment. Forming a V-pattern with a bent portion 55 by slighting shifting a plurality of patterned metal plates 52 that are stacked one on top of another to form the vertical partition 45 imparts flexibility to the vibration propagation member 42*d* and causes an increase in the vibration damping rate of the vibration propagation member 42. This would achieve the advantage of letting the reverberation fade away quickly.

Figure 20A:
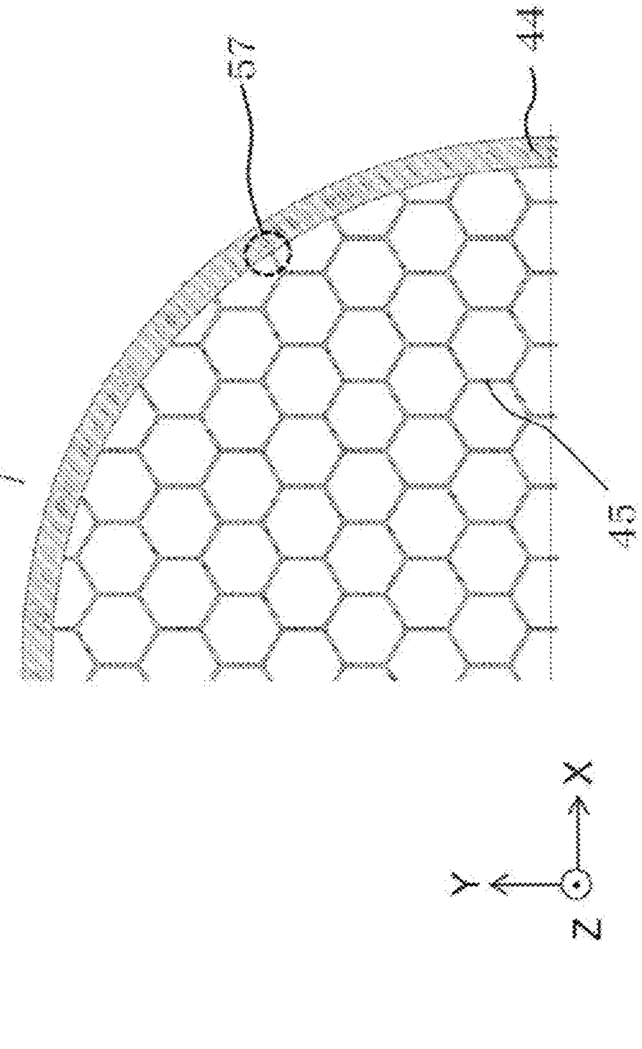
FIGS. 20A and 20B are partially enlarged cross-sectional views, covering a sidewall and vertical partitions, of the vibration propagation member according to the second embodiment.
Figure 20B:
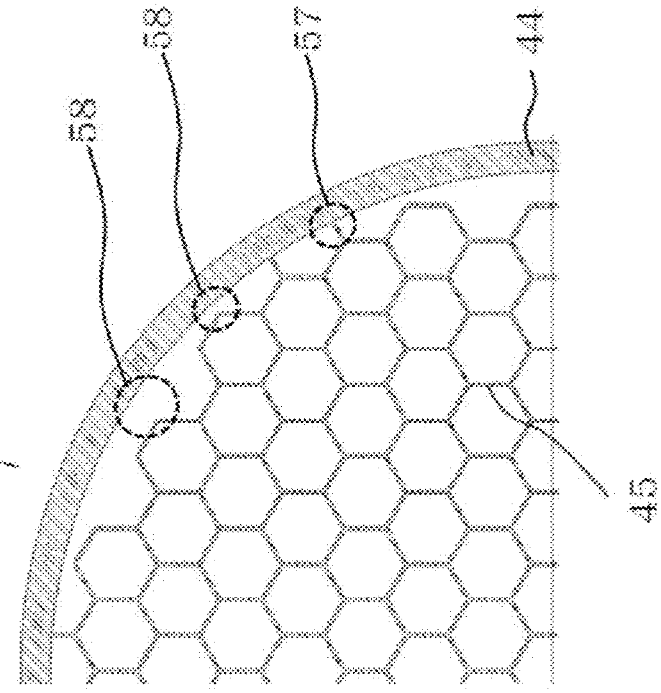

FIGS. 20A and 20B are cross-sectional views each illustrating, on a larger scale, a part covering a sidewall and vertical partitions of a vibration propagation member according to a fifth implementation of the second embodiment.

The vibration propagation member 42*e* shown in FIG. 20A includes only vertical partitions 57 in contact with the sidewall 44. On the other hand, the vibration propagation member 42*f* shown in FIG. 20B includes both vertical partitions 57 in contact with the sidewall 44 and vertical partitions 58 out of contact with the sidewall 44. Such a structure may reduce the number of vibration propagation paths formed by the vertical partitions 57 and the sidewall 44 to cause unnecessary vibrations perpendicularly to the vibration propagation direction, thus reducing such unnecessary vibrations. That is to say, the unnecessary vibrations may be reduced by adopting the structure shown in FIG. 20B.

[2-1-2. Procedure of Manufacturing Vibration Propagation Member]

Next, a procedure of manufacturing the vibration propagation member 42 will be described with reference to FIGS. 21A-21D. Note that although the vibration propagation members are designated in the foregoing description by the reference signs 42*a*-42*f* to be distinguished from each other by their difference in the shape of vertical partitions, the vibration propagation members will be collectively designated by the reference sign 42 because there is no need to distinguish the vibration propagation members from each other in the following description.

FIGS. 21A-21D are perspective views illustrating the procedure of manufacturing the vibration propagation member 42 according to the second embodiment. The manufacturing process of the vibration propagation member 42 proceeds from the process step shown in FIG. 21A via the process steps shown in FIGS. 21B and 21C to the process step shown in FIG. 21D.

First, as shown in FIG. 21A, a plurality of metal plates 50, each of which is large enough to cut out a plurality of patterned structures therefrom, and a plurality of metal plates 50, each of which is large enough to cut out an individual patterned structure therefrom, are provided. FIG. 21A shows only one of those metal plates 50. Next, FIG. 21B shows a metal plate 51 which has been patterned into a circular shape to use the metal plate 50 as the top plate 43 and also shows a metal plate 50 on which the sidewall 44 and vertical partitions 45 of the vibration propagation member 42 have been formed by patterning. These metal plates 51, 52 may be formed either on an individual basis or simultaneously. The metal plate 50 may be patterned by, for example, punching the metal plate 50 by pressing, etching the metal plate 50 by photolithography, subjecting the metal plate 50 to laser cutting, or subjecting the metal plate 50 to electrical discharge machining using a discharge wire. In this embodiment, the metal plate 51 patterned into a circular shape to use the metal plate 51 as the top plate 43 and the metal plate 52 on which those elements have been formed by patterning (hereinafter referred to as "patterned elements") are supposed to have been formed into a circular (disklike) shape in top view (i.e., when viewed parallel to the Z-axis). However, this is only an example and should not be construed as limiting. Rather, the top plate 43 and the metal plate 52 having those patterned elements formed thereon according to the present disclosure do not have to have the circular (disklike) external shape but may have an elliptical or polygonal shape as well.

Next, as shown in FIG. 21C, the plurality of the metal plates 52, on each of which those patterned elements have been formed, and the top plate 43 are sequentially stacked one on top of another while being aligned with each other. Specifically, first, a predetermined number of metal plates 52, each having those patterned elements formed thereon, are stacked one on top of another. Next, the top plate 43 is laid on top of the uppermost surface of the plurality of metal plates 12, each having those patterned elements formed thereon (i.e., on the surface, facing the positive Z-axis direction, of the metal plate 52 disposed at the top in the positive Z-axis direction and having those patterned elements formed thereon). Subsequently, those patterned metal plates are joined together, by diffusion joining, which is an exemplary direct joining technique, in a vacuum environment under heat and pressure to form an integral material. In the case of stainless steel, for example, the heating temperature during the diffusion joining process is about 1,000° C. while stainless steel has a melting point of about 1500° C. Thus, when made of stainless steel, those metal plates 52 that are stacked one on top of another and the top plate 43 may be joined together by heating the metal plates 52 and the top plate 43 to this temperature in a vacuum under pressure with atoms on the junction interface allowed to diffuse and with the base metal not allowed to melt. Note that the diffusion joining requires some degree of planarity. Thus, depending on the process step shown in FIG. 21C, a posterior process step of removing bur and deformation from the metal plate 51 that has been patterned into the circular shape and the metal plates 52, each having those patterned elements formed thereon, may need to be performed after the process step shown in FIG. 21B has been performed. Alternatively, a melt welding process for partially melting the base metal may also be used as another direct joining technique. In the case of stainless steel, the melt welding technique allows a plurality of metal plates to be joined together by heating the metal plates to around 1500° C. Still alternatively, according to another method for joining the metal plates, an epoxy resin or cyanoacrylate adhesive may also be used as a bonding material between the metal plates. Yet alternatively, if an inorganic material is selected as the bonding material, then brazing may also be used.

Performing this manufacturing procedure allows a vibration propagation member 2 according to the first embodiment, in which the respective patterned metal plates have been joined together by the joining method according to this embodiment, to be completed as shown in FIG. 21D. In this embodiment, the vibration propagation member is eventually formed to have a circular columnar external shape. However, this is only an example and should not be construed as limiting. Rather, the vibration propagation member according to this embodiment does not have to have the circular columnar shape but may have an elliptic cylindrical shape or a polygonal prism shape as well.

[2-1-3. Advantages of Vibration Propagation Member]

As can be seen from the foregoing description, the vibration propagation member 42 according to this embodiment is configured to operate by being bonded to one surface of the vibration means 1. The vibration propagation member 42 includes the top plate 43, the bottom plate 47, the sidewall 44, and the vertical partitions 45 arranged perpendicularly to the top plate 43 and the bottom plate 47. The vibration propagation member 42 is a structure for transmitting the vibration produced by the plurality of membrane structures including one membrane structure 48 and the other membrane structure 49, each being defined by the top plate 43 and the vertical partitions 45. That is to say, the vibration propagation member 42 uses the vibration produced by the plurality of membrane structures including the one membrane structure 48 and the other membrane structure 49, each being defined by the top plate 43 and the vertical partitions 45.

This enables controlling the vibration induced by the membrane structures 48, 49, defined by the respective thicknesses of the vertical partitions and the top plate 43, which are constituent elements of the vibration propagation member 42, the gap distance between the vertical partitions, and other parameters. In other words, the vibration propagation member 42 may control the vibration induced by the membrane structures 48, 49. In addition, the vibration transceiver in which the vibration propagation member 42 is bonded to the vibration means 41 may freely control the frequency of the vibration to transmit and receive. Consequently, a vibration propagation member 42 that allows a high degree of freedom of design may be provided.

Furthermore, making the spaces defined by the top plate 43, the vertical partitions 45, and the bottom plate 47 hermetically sealed spaces 46 (more specifically, making some or all of the spaces defined by the top plate 43, the vertical partitions 45, and the bottom plate 47 hermetically sealed spaces 46) allows the internal space of the vibration propagation member 42, which is surrounded with the top plate 43, the sidewall 44, and the bottom plate 80, to be divided by the vertical partitions 45 into a larger number of hermetically sealed spaces 46. Thus, even if any wall surface formed by the vibration propagation member 42 bonded to the one surface of the vibration means comes to have a through hole due to corrosion, for example, to have one space submerged, only some spaces are submerged for the vibration propagation member 42 as a whole, to cause the performance of the vibration propagation member 42 to change slowly. Consequently, a highly reliable vibration propagation member 42 may be provided.

Furthermore, the bottom plate 47 and the vibration means 41 may be bonded together more reliably with the bonding material. This allows a vibration transceiver including this vibration propagation member 42 to exhibit less variable and more stabilized characteristics.

Besides, if the internal pressure $P_1$ of the hermetically sealed spaces 46 of the vibration propagation member 42 is almost as high as the pressure $P_2$ of the vibration propagation medium, setting the internal pressure of the hermetically sealed spaces 46 of the vibration propagation member 42 at the same value as the pressure of the propagation medium improves the efficiency of propagation of the vibration into the vibration propagation medium and ensures stabilized vibration propagation performance.

Alternatively, if the internal pressure $P_1$ of the hermetically sealed spaces 46 of the vibration propagation member 42 is higher than the pressure $P_2$ of the vibration propagation medium, then the top plate has a raised shape. In that case, while measurement is made on a high-temperature, high-humidity fluid, liquid droplets are less likely to be collected on the vibrating surface of the top plate even with condensation formed due to high humidity. As a result, the efficiency of propagation of vibration into the vibration propagation medium may be improved with good stability and stabilized vibration propagation performance is ensured even in a high-humidity environment.

Still alternatively, if the internal pressure $P_1$ of the hermetically sealed spaces 46 of the vibration propagation member 42 is lower than the pressure $P_2$ of the vibration propagation medium, then the top plate has a recessed shape. In that case, the efficiency of propagation of vibration into the vibration propagation medium improves due to sound collection effect. Optionally, a vacuum may be created inside the vibration propagation member 42. Then, the flexure of the top plate may be reduced. In addition, the top plate is regulated by the pressure, thus reducing the chances of causing reverberation, i.e., the chances of the vibration of the vibration propagation member 42 remaining unintentionally.

The inside of the hermetically sealed spaces 46 may be filled with an inert gas such as an argon gas (Ar), a nitrogen gas ($N_2$), or a helium gas (He). This may reduce the internal corrosion of the vibration propagation member 42.

Optionally, a high-viscosity liquid may be injected into some of the hermetically sealed spaces 46. In that case, damping effect that reduces the vibration at a predetermined frequency would be achieved by changing the viscosity of the liquid. This makes the vibration propagation efficiency improvable selectively only at a target oscillatory frequency.

Furthermore, as exemplified for the vibration propagation member 42*a*, setting the wall thickness of the vertical partition 45 at a relatively large value in the vicinity of the bottom plate 47 and at a relatively small value in the vicinity of the top plate 43 allows the vibration of the vibration means 41 to propagate efficiently in the vicinity of the bottom plate 47 of the vibration propagation member 42*a*. In addition, setting the wall thickness of the vertical partition 45 at a relatively small value (at a wall thickness T1) in the vicinity of the top plate 43 and increasing the wall thickness of the vertical partition 45 toward the bottom surface (toward a wall thickness T2) allows the membrane structure 48 of the top plate 43 to vibrate efficiently, thus improving the efficiency of propagation of the vibration into the propagation medium.

Furthermore, as exemplified for the vibration propagation member 42*b*, the wall thickness of the vertical partition 45 may vary in the vibration propagation direction to change gradually and increase and decrease alternately and repeatedly. Thus, setting the wall thickness of a particular part of the vertical partition 45, corresponding to a peak of the vibration transmitted through the vertical partition 45 of the vibration propagation member 42*b*, at a relatively large value allows only the vibration at a target frequency to be reduced selectively. In addition, the vertical partition 45 serves as a very important column for transmitting the vibration of the vibration propagation member 42*b*. Letting a particular part of the vibration propagation member 42*b* have a wall thickness with low mechanical strength (corresponding to a wall thickness T3) causes an increase in the vibration damping rate of the vibration propagation member 42*b*. This would achieve the advantage of letting the reverberation fade away quickly. In addition, this would also achieve the advantage of setting up the vibration promptly.

Furthermore, as exemplified for the vibration propagation member 42*c*, a plurality of patterned metal plates 52 may be stacked one on top of another to slightly shift from each other and thereby form a vertical partition 45 with an inclined pattern. As a result, the vertical partition 45 may be formed obliquely. This may extend the propagation path of the vibration and delay the time of appearance of the vibration, thus enabling controlling the sonic velocity.

Furthermore, as exemplified for the vibration propagation member 42*d*, forming a vertical partition 45 in a V-pattern with a bent portion 55 by slighting shifting a plurality of patterned metal plates 52 that are stacked one on top of another imparts flexibility to the vibration propagation member 42 and causes an increase in the vibration damping rate of the vibration propagation member 42*d*. This would achieve the advantage of letting the reverberation fade away quickly.

Furthermore, as exemplified for the vibration propagation member 42*f*, adopting a structure including some vertical partitions 58 that are out of contact with the sidewall may reduce the number of vibration propagation paths formed by the vertical partitions 57 and the sidewall 44 and constituting a factor in generation of unnecessary vibrations, thereby reducing unnecessary vibrations. Furthermore, as exemplified for the vibration propagation member 42*c*, the vibration propagation member 42 does not use the vibration in the thickness direction, and therefore, may have its thickness reduced.

Third Embodiment

A vibration propagation member according to a third embodiment and a vibration transceiver that uses the vibration propagation member will now be described with reference to FIGS. 22-24D.

[3-1. Vibration Propagation Member]

[1-1. Configuration for Vibration Propagation Member]

Figure 22:
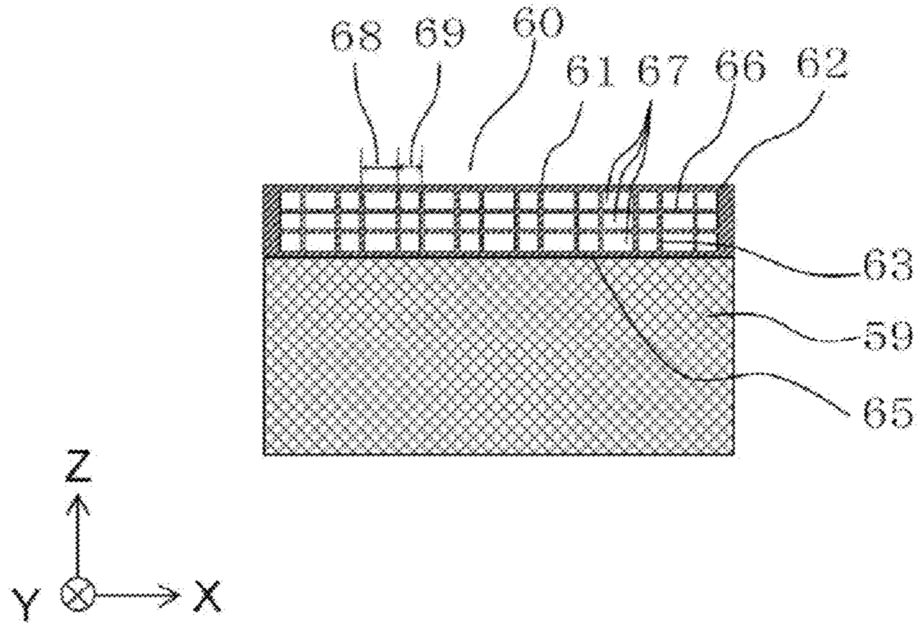
FIG. 22 is a cross-sectional view of a vibration propagation member according to a third embodiment which is provided on one surface of a vibration means.

FIG. 22 is a cross-sectional view schematically illustrating an exemplary configuration in which a vibration propagation member 60 according to the third embodiment is provided on one surface of a vibration means 59. FIG. 22 illustrates a cross section of the vibration propagation member 60 as taken in the thickness direction (parallel to the Z-axis), i.e., a cross section thereof taken along an X-Z plane. As shown in FIG. 22, the vibration propagation member 60 is bonded to one surface of the vibration means 59 and vibrates as the vibration means 59 vibrates. The vibration propagation member 60 includes a top plate 61, a bottom plate 65, a sidewall 62, vertical partitions 63 arranged perpendicularly to the top plate 61 and the bottom plate 65, and horizontal partitions 66 arranged parallel to the top plate 61 and the bottom plate 65. Some or all of the spaces defined by the top plate 61, the vertical partitions 63, and one of the horizontal partitions 66, the spaces defined by the horizontal partitions 66 facing each other and the vertical partitions 63 facing each other, and the spaces defined by one of the horizontal partitions 66, the vertical partitions 63, and the bottom plate 65 may be hermetically sealed space 67. Depending on the intended use, those spaces may be hermetically sealed spaces 67. Alternatively, as the case may be, a through hole may be provided to make those spaces continuous with the vibration propagation medium via the through hole. For example, the spaces defined by the top plate 61, the vertical partitions 63, and the horizontal partition 66 may be continuous with the vibration propagation medium via a through hole provided through at least one of the vertical partitions 63 or the horizontal partition 66. Also, the spaces defined by the horizontal partitions 66 facing each other and the vertical partitions 63 facing each other may be continuous with the vibration propagation medium via a through hole provided through at least one of the vertical partitions 63 or the horizontal partitions 66. Furthermore, the spaces defined by the horizontal partition 66, the vertical partitions 63, and the bottom plate 65 may be continuous with the vibration propagation medium via a through hole provided through at least one of the vertical partitions 63 or the horizontal partition 66. The membrane structures 68, 69 defined by the top plate 61 and the vertical partitions 63 have a characteristic vibration depending on the thickness of the top plate 61 and the gap distance between the vertical partitions 63 facing each other. One membrane structure 68 and the other membrane structure 69 have different gap distances between the vertical partitions 63 facing each other.

Figure 23:
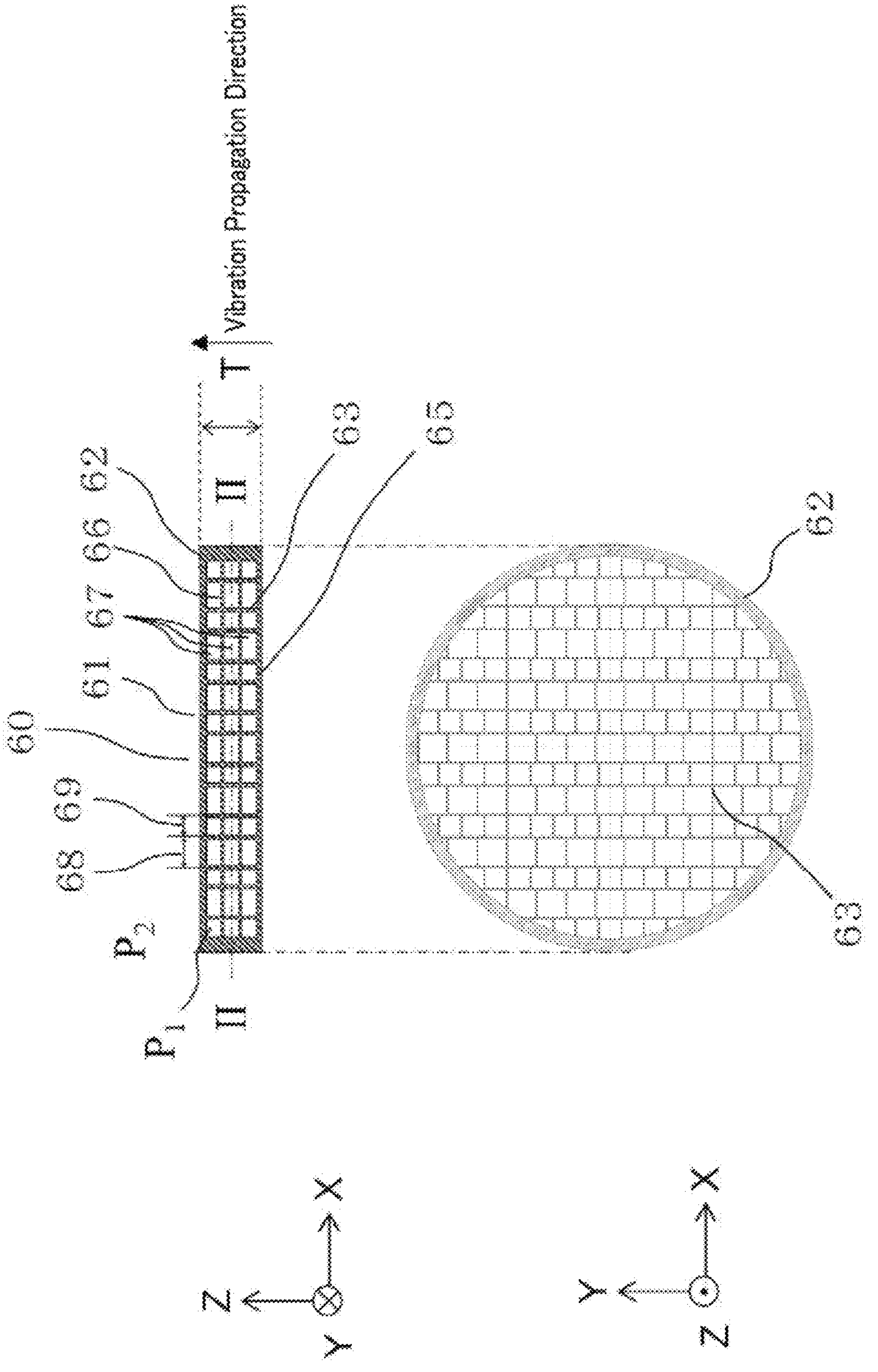
FIG. 23 illustrates a cross-sectional view of the vibration propagation member according to the third embodiment and a cross-sectional view of the vibration propagation member according to the third embodiment as taken along a line segment X.

Next, the internal structure of the vibration propagation member 60 will be described with reference to FIG. 23. FIG. 23 is a cross-sectional view illustrating an exemplary configuration for the vibration propagation member 60 according to the third embodiment.

Note that the upper portion of FIG. 23 is a cross-sectional view of the vibration propagation member 60 taken in the thickness direction (parallel to the Z-axis), i.e., a cross-sectional view taken along an X-Z plane. On the other hand, the lower portion of FIG. 23 is a cross-sectional view of the vibration propagation member 60 as taken along the plane II-II shown in the upper portion of FIG. 23, i.e., a cross-sectional view of the vibration propagation member 60 as taken in a direction perpendicular to the thickness direction (parallel to an X-Y plane), or a cross-sectional view thereof taken along the X-Y plane. In FIG. 23, the reference sign T is the thickness of the vibration propagation member 60 as indicated by the double-headed arrow (which is parallel to the Z-axis). Note that the cross section of the vibration propagation member 60 as taken in the direction perpendicular to the thickness direction may include vertical partitions 63 which are arranged in a grid pattern as shown in the lower portion of FIG. 23. The membrane structures 68, 69 defined by the top plate 61 and the vertical partitions 63 each have a characteristic vibration depending on the thickness of the top plate 61 and the gap distance between the vertical partitions 63 facing each other. One membrane structure 68 and the other membrane structure 69 have different gap distances between the vertical partitions 63 facing each other.

The advantages achieved by the structure shown in the upper portion of FIG. 23 according to the pressure $P_1$ inside the hermetically sealed spaces of the vibration propagation member 60 and the pressure $P_2$ of the vibration propagation medium are the same as the ones already described for the second embodiment and description thereof will be omitted herein.

[3-1-2. Procedure of Manufacturing Vibration Propagation Member]

Next, a procedure of manufacturing the vibration propagation member 60 will be described with reference to FIGS. 24A-24D.

FIGS. 24A-24D are perspective views illustrating the procedure of manufacturing the vibration propagation member 60 according to the third embodiment. The manufacturing process of the vibration propagation member 60 proceeds from the process step shown in FIG. 24A via the process steps shown in FIGS. 24B and 24C to the process step shown in FIG. 24D.

Figures 24A, 24B, 24C, 24D:
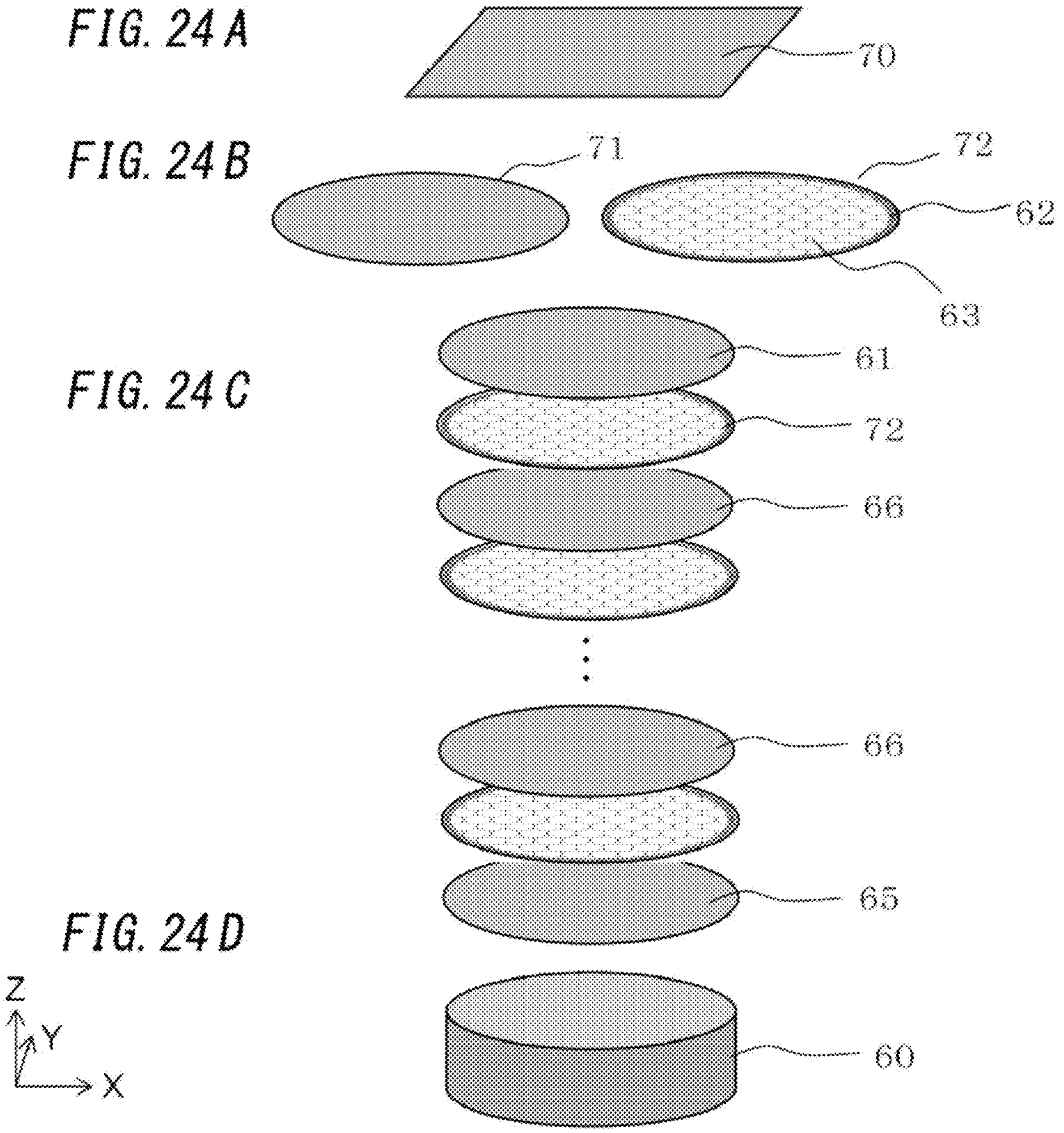
FIGS. 24A-24D are perspective views illustrating the procedure of manufacturing the vibration propagation member according to the third embodiment.

First, as shown in FIG. 24A, a plurality of metal plates 70, each of which is large enough to cut out a plurality of patterned structures therefrom, and a plurality of metal plates 70, each of which is large enough to cut out an individual patterned structure therefrom, are provided. FIG. 24A shows only one of these metal plates 70. Next, FIG. 24B shows a metal plate 71 which has been patterned into a circular shape to use the metal plate 70 as the top plate 61, the bottom plate 65, or the horizontal partition 66, and also shows a metal plate 72 on which the sidewall 62 and vertical partitions 63 of the vibration propagation member 60 have been formed by patterning. These metal plates 71, 72 may be formed either on an individual basis or simultaneously. The metal plate 70 may be patterned by, for example, punching the metal plate 70 by pressing, etching the metal plate 70 by photolithography, subjecting the metal plate 70 to laser cutting, or subjecting the metal plate 70 to electrical discharge machining using a discharge wire. In this embodiment, the metal plate 71 patterned into the circular shape and the metal plate 72 on which those elements have been formed by patterning (hereinafter referred to as "patterned elements") are supposed to have been formed into a circular (disklike) external shape in top view (i.e., when viewed parallel to the Z-axis). However, this is only an example and should not be construed as limiting. Rather, the metal plate 71 patterned into the circular shape and the metal plate 72 having those patterned elements formed thereon according to the present disclosure do not have to have the circular (disklike) external shape but may have an elliptical or polygonal shape as well.

Next, as shown in FIG. 24C, a plurality of the metal plates 71, which have been patterned into the circular shape to use them as the top plate 61, the bottom plate 65, and the horizontal partitions 66, and the metal plates 72, on each of which the vertical partitions 63 and the sidewall 62 have been formed as the patterned elements, are alternately stacked one on top of another while being aligned with each other. Specifically, a plurality of metal plates 71, which have been patterned into the circular shape to use them as the horizontal partitions 68, and a plurality of metal plates 72, each having the vertical partitions 63 and sidewall 62 formed as patterned elements thereon, are alternately stacked one on top of another. Next, the metal plate 71 that has been patterned into the circular shape is laid, as the top plate 61, on top of the uppermost surface of the alternate stack of the plurality of metal plates 71, each having been patterned into the circular shape, and the plurality of metal plates 72, each having those patterned elements formed thereon (i.e., on the surface, facing the positive Z-axis direction, of the metal plate 72 disposed at the top in the positive Z-axis direction and having those patterned elements formed thereon). Thereafter, the metal plate 71 that has been patterned into the circular shape is laid, as the bottom plate 65, on top of the lowermost surface of the alternate stack of the plurality of metal plates 71, 72 (i.e., on the surface, facing the negative Z-axis direction, of the metal plate 72 disposed at the bottom in the negative Z-axis direction and having those patterned elements formed thereon).

Subsequently, those patterned metal plates are joined together, by diffusion joining, which is an exemplary direct joining technique, in a vacuum environment under heat and pressure to form an integral material. In the case of stainless steel, for example, the heating temperature during the diffusion joining process is about 1,000° C. while stainless steel has a melting point of about 1500° C. Thus, when made of stainless steel, the alternate stack of the plurality of metal plates 71 patterned into the circular shape, the plurality of metal plates 72 having those patterned elements formed thereon, the top plate 61, and the bottom plate 65 may be joined together by heating the metal plates 71, 72, the top plate 61, and the bottom plate 65 to this temperature in a vacuum under pressure with atoms on the junction interface allowed to diffuse and with the base metal not allowed to melt. Note that the diffusion joining requires some degree of planarity. Thus, depending on the process step shown in FIG. 24C, a posterior process step of removing bur and deformation from the metal plates 71 that have been patterned into the circular shape and the metal plates 72, each having those patterned elements formed thereon, may need to be performed after the process step shown in FIG. 24B has been performed. Alternatively, a melt welding process for partially melting the base metal may also be used as another direct joining technique. In the case of stainless steel, the melt welding technique allows a plurality of metal plates to be joined together by heating the metal plates to around 1500° C. Still alternatively, according to another method for joining the metal plates, an epoxy resin or cyanoacrylate adhesive may also be used as a bonding material between the metal plates. Yet alternatively, if an inorganic material is selected as the bonding material, then brazing may also be used.

Performing this manufacturing procedure allows a vibration propagation member 60 according to the third embodiment, in which the respective patterned metal plates have been joined together by the joining method according to this embodiment, to be completed as shown in FIG. 24D. In this embodiment, the vibration propagation member 60 is eventually formed to have a circular columnar external shape. However, this is only an example and should not be construed as limiting. Rather, the vibration propagation member according to this embodiment does not have to have the circular columnar shape but may have an elliptic cylindrical shape or a polygonal prism shape as well.

[3-1-3. Advantages of Vibration Propagation Member]

As can be seen from the foregoing description, the vibration propagation member 60 according to this embodiment is configured to operate by being bonded to one surface of the vibration means 59. The vibration propagation member 60 includes the top plate 61, the bottom plate 65, the sidewall 62 of the vibration propagation member 60, the vertical partitions 63 arranged perpendicularly to the top plate 61 and the bottom plate 65, and the horizontal partitions 66 arranged horizontally to the top plate 61 and the bottom plate 65. The vibration propagation member is a structure for transmitting the vibration produced by the plurality of membrane structures including one membrane structure 68 and the other membrane structure 69, each being defined by the top plate 61 and the vertical partitions 63. That is to say, the vibration propagation member 42 uses the vibration produced by the plurality of membrane structures including one membrane structure 68 and the other membrane structure 69, each being defined by the top plate 43 and the vertical partitions 45.

Thus, the horizontal partitions 66 may also reduce the vibration propagation loss to be caused by the vertical partitions 63, thus improving the efficiency of propagation of the vibration into the propagation medium.

Furthermore, some or all of the spaces defined by the top plate 61, the vertical partitions 63, and one horizontal partition 66, the spaces defined by the horizontal partitions 66 facing each other and the vertical partitions 63 facing each other, and the spaces defined by another horizontal partition 66, the vertical partitions 63, and the bottom plate may be hermetically sealed spaces 67, thus providing a vibration propagation member 60 that may operate with good stability even in a high-temperature, high-humidity fluid. Furthermore, the internal space of the vibration propagation member 60, which is surrounded with the top plate 61, the sidewall 62, and the bottom plate 65, is divided by the vertical partition 63 and the horizontal partitions 66 into a larger number of hermetically sealed spaces. Thus, even if any space is submerged due to corrosion, for example, in the vibration propagation member 60 bonded to one surface of the vibration means 59, only some spaces are submerged for the vibration propagation member 60 as a whole, to cause the performance of the vibration propagation member 60 to change slowly. Consequently, a highly reliable vibration propagation member 60 may be provided.

Optionally, a through hole may be provided through some or all of the vertical partitions 63 and the horizontal partitions 66 and the spaces may be made continuous with the vibration propagation medium via the through hole(s). This allows, even if the vibration propagation medium is an ultrahigh pressure fluid, the spaces defined by the top plate 61, the vertical partitions 63, and the horizontal partition 66, the spaces defined by the horizontal partitions 66 facing each other and the vertical partitions 63 facing each other, the space defined by the horizontal partition 66, the vertical partitions 63, and the bottom plate, and the vibration propagation medium to be continuous with each other via the through holes. This prevents the vibration propagation member 60 itself from be deformed under pressure, thus providing a vibration propagation member 60 that operates with good stability. Furthermore, the vibration propagation member 60 does not use the vibration in the thickness direction, and therefore, may have its thickness reduced. That is to say, the thickness of the vibration propagation member 60 may be reduced.

Fourth Embodiment

Next, an implementation in which a vibration propagation member according to a fourth embodiment includes vertical partitions in multiple different shapes will be described with reference to FIG. 25.

[4-1. Vibration Propagation Member]

[1-1. Configuration for Vibration Propagation Member]

The internal structure of a vibration propagation member 75 will be described with reference to FIG. 25. FIG. 25 is a cross-sectional view illustrating an exemplary configuration for the vibration propagation member 75 according to the fourth embodiment.

Figure 25:
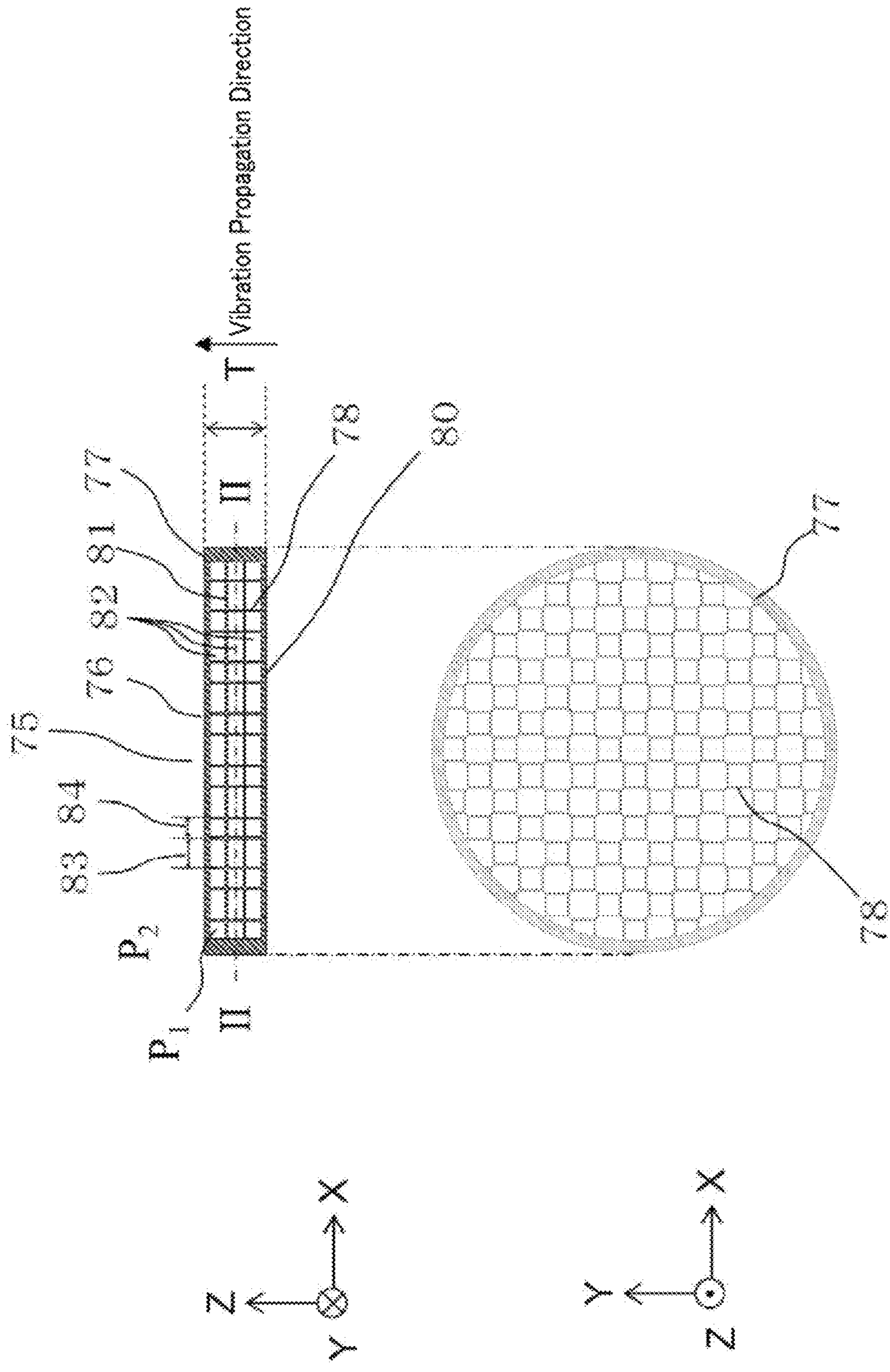
FIG. 25 illustrates a cross-sectional view of a vibration propagation member according to a fourth embodiment and a cross-sectional view of the vibration propagation member according to the fourth embodiment as taken along a line segment X.

Note that the upper portion of FIG. 25 is a cross-sectional view of the vibration propagation member 75 taken in the thickness direction (parallel to the Z-axis), i.e., a cross-sectional view taken along an X-Z plane. On the other hand, the lower portion of FIG. 25 is a cross-sectional view of the vibration propagation member 75 as taken along the plane II-II shown in the upper portion of FIG. 25, i.e., a cross-sectional view of the vibration propagation member 75 as taken in a direction perpendicular to the thickness direction (parallel to an X-Y plane), or a cross-sectional view thereof taken along the X-Y plane. In FIG. 25, the reference sign T is the thickness of the vibration propagation member 75 as indicated by the double-headed arrow (which is parallel to the Z-axis). Note that the cross section of the vibration propagation member 75 as taken in the direction perpendicular to the thickness direction is made up of, for example, quadrangular and octagonal elements as shown in the lower portion of FIG. 25. The membrane structures 83, 84, defined by the top plate 76 and the vertical partitions 78, each have a characteristic vibration depending on the thickness of the top plate 76 and the gap distance between the vertical partitions 78 facing each other. One membrane structure 83 and the other membrane structure 84 have different gap distances between the vertical partitions 78 facing each other and different cross-sectional shapes taken along a plane perpendicular to the thickness direction defined for the vibration propagation member 75 (i.e., taken parallel to an X-Y plane). In this embodiment, the vertical partitions have quadrangular and octagonal cross-sectional shapes. However, these are only exemplary shapes and should not be construed as limiting. That is to say, combinations of multiple different shapes formed by the vertical partitions 78 according to the present disclosure do not have to be such a combination of quadrangular and octagonal shapes but may be a combination of hexagonal and triangular shapes, a combination of dodecagonal and triangular shapes, or a combination of triangular, quadrangular, and hexagonal shapes as well.

[4-1-2. Advantages of Vibration Propagation Member]

As can be seen from the foregoing description, the vibration propagation member 75 according to this embodiment is configured to operate by being bonded to one surface of the vibration means. The vibration propagation member 75 includes a top plate 76, a bottom plate 80, a sidewall 77 of the vibration propagation member 75, the vertical partitions 78 arranged perpendicularly to the top plate 76 and the bottom plate 80, and horizontal partitions 81 arranged horizontally to the top plate 76 and the bottom plate 80. The vibration propagation member 75 has a structure for transmitting the vibrations produced by multiple membrane structures including one membrane structure 83 and the other membrane structure, each being defined by the top plate 76 and the vertical partitions 78. That is to say, the vibration propagation member 75 has a structure that uses the vibrations produced by the plurality of membrane structures. In addition, the vibration propagation member 75 has a structure including vertical partitions in multiple different shapes in a cross section taken perpendicularly to the vibration propagation direction.

Thus, the vibration propagation member 75 has a lot of structures to control, namely, not only the respective thicknesses of the vertical partitions 78 and the top plate 76, which are constituent elements of the vibration propagation member 75, and the gap distance between the vertical partitions but also the shapes of the vertical partitions in a cross section perpendicular to the vibration propagation direction, and may control the vibration induced by the membrane structures 83, 84 thus formed. In other words, the vibration propagation member 75 may control the vibrations induced by the membrane structures 83, 84. When used as a part of a vibration transceiver by bonding the vibration propagation member 75 to the vibration means 41, the vibration propagation member 75 may freely control the frequency of the vibration to transmit and receive and allows a high degree of freedom of design.

Furthermore, making some or all of the spaces defined by the top plate 76, the vertical partitions 78, and one horizontal partition 81, the spaces defined by the horizontal partitions 81 facing each other and the vertical partitions 78 facing each other, and the spaces defined by another horizontal partition 81, the vertical partitions 78, and the bottom plate 80 hermetically sealed spaces 82 allows the internal space of the vibration propagation member 75, which is surrounded with the top plate 76, the sidewall 77, and the bottom plate 80, to be divided by the vertical partitions 78 and the horizontal partitions 81 into a larger number of hermetically sealed spaces. Thus, even if any wall surface formed by the vibration propagation member 75 bonded to the one surface of the vibration means comes to have a through hole due to corrosion, for example, to have one space submerged, only some spaces are submerged for the vibration propagation member 60 as a whole, to cause the performance of the vibration propagation member 60 to change slowly. Consequently, a highly reliable vibration propagation member 60 may be provided. Furthermore, the vibration propagation member 60 does not use the vibration in the thickness direction, and therefore, may have its thickness reduced. That is to say, the thickness of the vibration propagation member 60 may be reduced.

Fifth Embodiment

Next, an implementation of a vibration propagation member having a top plate with multiple different thicknesses according to a fifth embodiment will be described with reference to FIGS. 26-27D.

[5-1. Vibration Propagation Member]

[1-1. Configuration and Operation of Vibration Propagation Member]

An internal structure of a vibration propagation member 85, in particular, a vibration propagation member including a top plate 86 with multiple different thicknesses, will be described with reference to FIG. 26.

Figure 26:
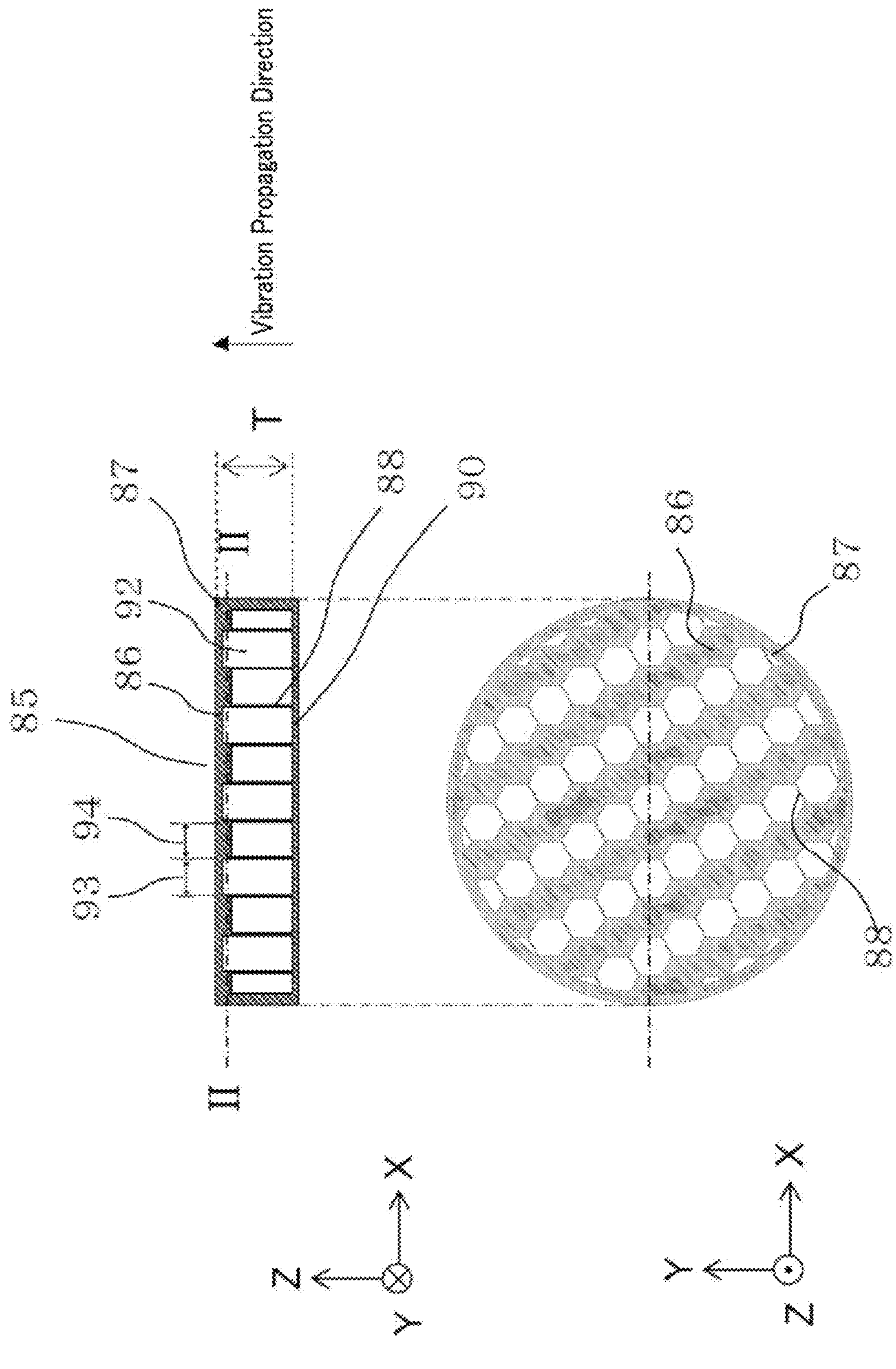
FIG. 26 illustrates a cross-sectional view of a vibration propagation member according to a fifth embodiment and a cross-sectional view of the vibration propagation member according to the fifth embodiment as taken along a line segment X.

FIG. 26 is a cross-sectional view illustrating an exemplary configuration for the vibration propagation member 85 according to the fifth embodiment.

Note that the upper portion of FIG. 26 is a cross-sectional view of the vibration propagation member 85 taken in the thickness direction (parallel to the Z-axis), i.e., a cross-sectional view taken along an X-Z plane. On the other hand, the lower portion of FIG. 26 is a cross-sectional view of the vibration propagation member 85 as taken along the plane II-II shown in the upper portion of FIG. 26, i.e., a cross-sectional view of the vibration propagation member 85 as taken in a direction perpendicular to the thickness direction (parallel to an X-Y plane), or a cross-sectional view thereof taken along the X-Y plane. In FIG. 26, the reference sign T is the thickness of the vibration propagation member 85 as indicated by the double-headed arrow (which is parallel to the Z-axis). Note that the cross section of the vibration propagation member 85 as taken in the direction perpendicular to the thickness direction may have, for example, a honeycomb pattern as shown in the lower portion of FIG. 26. The two types of membrane structures 93, 94, defined by the top plate 86 and the vertical partitions 88, each include a top plate 86 with a different thickness but include vertical partitions 78 with the same gap distance. The one membrane structure 83 and the other membrane structure 84 use the top plate 86 with such multiple different thicknesses. Thus, when the vibration propagation member 85 according to this embodiment is bonded onto one surface of the vibration means, two different characteristic vibrations are produced. That is to say, the one membrane structure 93 and the other membrane structure 94 have different resonant frequencies.

[5-1-2. Procedure of Manufacturing Vibration Propagation Member]

Next, a procedure of manufacturing the vibration propagation member 85 will be described with reference to FIGS. 27A-27D.

FIGS. 27A-27D are perspective views illustrating the procedure of manufacturing the vibration propagation member 85 according to the fifth embodiment. The manufacturing process of the vibration propagation member 60 proceeds from the process step shown in FIG. 27A via the process steps shown in FIGS. 27B and 27C to the process step shown in FIG. 27D.

Figures 27A, 27B, 27C, 27D:
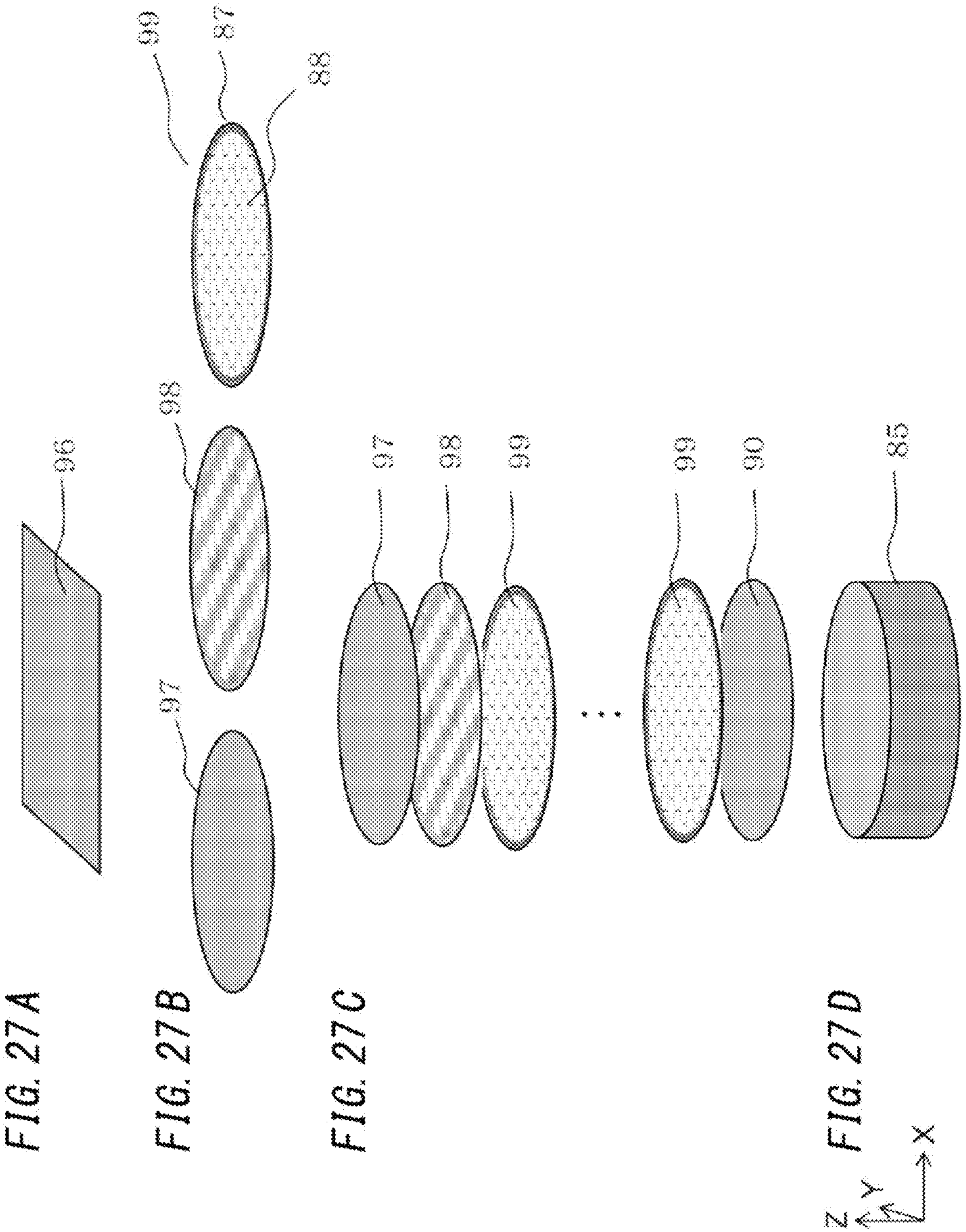
FIGS. 27A-27D are perspective views illustrating the procedure of manufacturing the vibration propagation member according to the fifth embodiment.

First, as shown in FIG. 27A, a plurality of metal plates 96, each of which is large enough to cut out a plurality of patterned structures therefrom, and a plurality of metal plates 96, each of which is large enough to cut out an individual patterned structure therefrom, are provided. FIG. 27A shows only one of these metal plates 96. Next, FIG. 27B shows a metal plate 97 which has been patterned into a circular shape to use the metal plate 96 as the top plate 61 and a bottom plate 65, a metal plate 98 which has been patterned to use the metal plate 98 as the relatively thick top plate 86 of the other membrane structure 94, and a metal plate 99 on which the sidewall 87 and vertical partitions 88 of the vibration propagation member 85 have been formed by patterning. These metal plates 97, 98, 99 may be formed either on an individual basis or simultaneously. The metal plate 96 may be patterned by, for example, punching the metal plate 96 by pressing, etching the metal plate 96 by photolithography, subjecting the metal plate 96 to laser cutting, or subjecting the metal plate 96 to electrical discharge machining using a discharge wire.

In this embodiment, the metal plate 97 patterned into the circular shape, the metal plate 98 patterned into the circular shape to define the other membrane structure, and the metal plate 99 on which the sidewall 87 and the vertical partitions 88 have been formed by patterning (hereinafter referred to as "patterned elements") are supposed to have been formed into a circular (disklike) external shape in top view (i.e., when viewed parallel to the Z-axis). However, this is only an example and should not be construed as limiting. Rather, the metal plate 96 patterned into the circular shape and the metal plate 99 having those patterned elements formed thereon according to the present disclosure do not have to have the circular (disklike) external shape but may have an elliptical or polygonal shape as well.

Next, as shown in FIG. 27C, the metal plate 97 patterned into the circular shape, the metal plate 98 patterned to define the other membrane structure, and the metal plate 99, on which the sidewall 87 and the vertical partitions 88 have been formed by patterning are sequentially stacked one on top of another while being aligned with each other. Specifically, first, a plurality of metal plates 99, on each of which the sidewall 87 and the vertical partitions 88 have been formed by patterning, are stacked one on top of another. Next, the metal plate 98 that has been patterned to define the other membrane structure is laid on top of the stack of the metal plates 99. Subsequently, the top plate 86 and the bottom plate 90 are respectively stacked on the uppermost surface and lowermost surface of the stack of these metal plates. Subsequently, these patterned metal plates are joined together, by diffusion joining, which is an exemplary direct joining technique, in a vacuum environment under heat and pressure to form an integral material. In the case of stainless steel, for example, the heating temperature during the diffusion joining process is about 1,000° C. while stainless steel has a melting point of about 1500° C. Thus, when made of stainless steel, those metal plates that have been patterned into the circular shape and stacked one on top of another may be joined together by heating the metal plates to this temperature in a vacuum under pressure with atoms on the junction interface allowed to diffuse and with the base metal not allowed to melt.

Note that the diffusion joining requires some degree of planarity. Thus, depending on the process step shown in FIG. 27C, a posterior process step of removing bur and deformation from the metal plate 97 that has been patterned into the circular shape, the metal plate 98 that has been patterned to define the other membrane structure, and the metal plates 99, each having the sidewall 87 and the vertical partitions 88 formed thereon by patterning, may need to be performed after the process step shown in FIG. 27B has been performed. Alternatively, a melt welding process for partially melting the base metal may also be used as another direct joining technique. In the case of stainless steel, the melt welding technique allows a plurality of metal plates to be joined together by heating the metal plates to around 1500° C. Still alternatively, according to another method for joining the metal plates, an epoxy resin or cyanoacrylate adhesive may also be used as a bonding material between the metal plates. Yet alternatively, if an inorganic material is selected as the bonding material, then brazing may also be used.

Performing this manufacturing procedure allows a vibration propagation member 85 according to the fifth embodiment, in which the respective patterned metal plates have been joined together by the joining method according to this embodiment, to be completed as shown in FIG. 27D. In this embodiment, the vibration propagation member 85 is eventually formed to have a circular columnar external shape. However, this is only an example and should not be construed as limiting. Rather, the vibration propagation member according to this embodiment does not have to have the circular columnar shape but may have an elliptic cylindrical shape or a polygonal prism shape as well.

[5-1-3. Advantages of Vibration Propagation Member]

As can be seen from the foregoing description, the vibration propagation member 85 according to this embodiment is configured to operate by being bonded to one surface of the vibration means. The vibration propagation member 85 includes the top plate 86, the bottom plate 90, the sidewall 87 of the vibration propagation member 85, and the vertical partitions 88 arranged perpendicularly to the top plate 86 and the bottom plate 90. The plurality of membrane structures, including the one membrane structure 93 and the other membrane structure 94, each being defined by the top plate 86 and the vertical partitions 88, at least have different top plate thicknesses. That is to say, the two different membrane structures are structures that use the top plate 86 with multiple different thicknesses.

Thus, the one membrane structure 93 and the other membrane structure 94 may be formed easily by adjusting the thickness of the top plate 86 as a constituent element of the vibration propagation member 85. In addition, the membrane structure of the top plate 86 may be changed easily, and the resonant frequency may be controlled easily, by adjusting the thickness of the top plate 86 (e.g., the number of the metal plates to stack in this example). Thus, the vibration propagation member 85 according to this embodiment also allows the vibration propagation waveform to be designed relatively freely as already described for the first embodiment. Furthermore, the vibration propagation member 85 does not use the vibration in the thickness direction, and therefore, may have its thickness reduced.

Sixth Embodiment

Next, an implementation of a vibration propagation member according to a sixth embodiment, of which the thickness varies from one membrane structure to another, will be described with reference to FIGS. 28-29D.

[6-1. Vibration Propagation Member]

[1-1. Configuration and Operation of Vibration Propagation Member]

Figure 28:
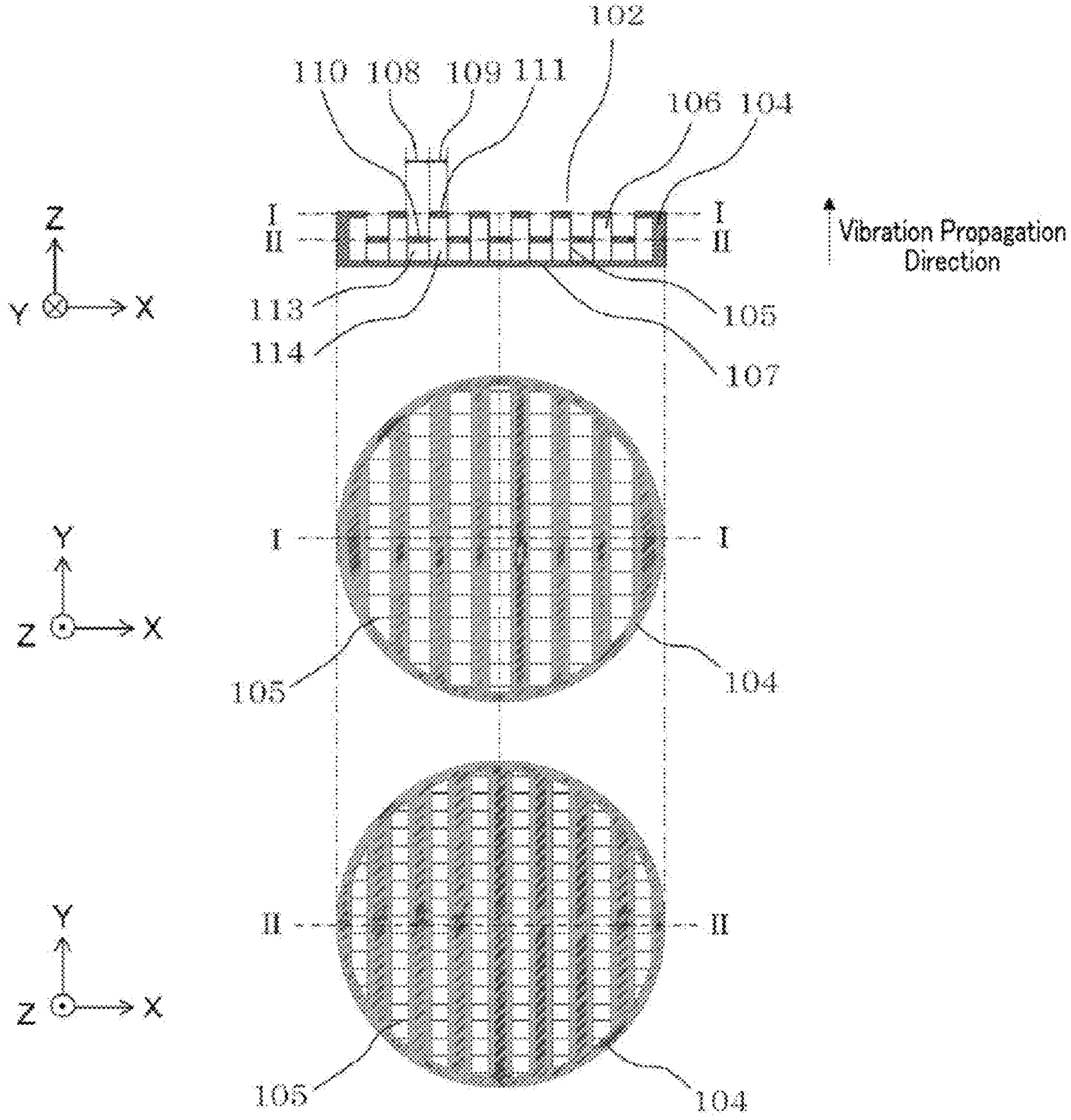
FIG. 28 illustrates a cross-sectional view of a vibration propagation member according to a sixth embodiment, a cross-sectional view of the vibration propagation member according to the sixth embodiment as taken along a line segment X, and another cross-sectional view of the vibration propagation member according to the sixth embodiment as taken along the line segment X.

FIG. 28 is a cross-sectional view illustrating an exemplary configuration for a vibration propagation member 102 according to the sixth embodiment.

Note that the upper portion of FIG. 28 is a cross-sectional view of the vibration propagation member 102 taken in the thickness direction (parallel to the Z-axis), i.e., a cross-sectional view taken along an X-Z plane. The middle portion of FIG. 28 is a cross-sectional view of the vibration propagation member 102 as taken along the plane I-I shown in the upper portion of FIG. 28. The lower portion of FIG. 28 is a cross-sectional view of the vibration propagation member 102 as taken along the plane II-II shown in the upper portion of FIG. 28. That is to say, each of the middle and lower portions of FIG. 28 is a cross-sectional view of the vibration propagation member 102 as taken in a direction perpendicular to the thickness direction (parallel to an X-Y plane), or a cross-sectional view thereof taken along the X-Y plane. In FIG. 28, the arrow indicates the vibration propagation direction of the vibration propagation member 102 (parallel to the Z-axis).

In the upper portion of FIG. 28, the vibration propagation member 102 includes a sidewall 104, vertical partitions 105, a bottom plate 107, and top plates 110, 111. The vibration propagation member 102 has, as its internal membrane structures, one membrane structure 108 and the other membrane structure 109. The one membrane structure 108 is defined by the vertical partitions 105 and the one top plate 110. The other membrane structure 109 is defined by the vertical partitions 105 and the other top plate 111. The one membrane structure 108 and the other membrane structure 109 have different gap distances between the vertical partitions and different gap distances from the bottom plate 107 to the top plate. First, the one membrane structure 108 and the other membrane structure 109 have different gap distances between the vertical partitions 105. Thus, as shown in FIG. 7 for the first embodiment, the one membrane structure 108 and the other membrane structure 109 have characteristic vibrations, and therefore, have resonant frequencies specific to their respective membrane structures with mutually different gap distances between the vertical partitions 105 facing each other. In other words, the one membrane structure 108 and the other membrane structure 109 have characteristic vibrations, have mutually different gap distances between the vertical partitions 105, and therefore, have resonant frequencies specific to their respective membrane structures. In addition, the one membrane structure 108 and the other membrane structure 109 have different gap distances from the bottom plate 107 to their respective top plates. Thus, when the vibration propagation member 102 according to this embodiment is used as a part of a vibration transceiver by bonding the vibration propagation member 102 to one surface of the vibration means, a difference is caused between the intensity of the sympathetic vibration induced by the vibration of the vibration means to the one membrane structure 108 and the intensity of the sympathetic vibration induced by the vibration of the vibration means to the other membrane structure 109.

That is to say, according to this embodiment, when the vibration propagation member 102 is bonded to the vibration means, the one membrane structure 108 may attenuate the vibration of the vibration means less significantly. In other words, when the vibration propagation member 102 is bonded to the vibration means, the vibration of the vibration means may be attenuated less significantly by the one membrane structure 108 than by the other membrane structure 109. In addition, the intensity of the sympathetic vibration produced by the one membrane structure 108 may be greater than the intensity of the sympathetic vibration produced by the other membrane structure 109. As can be seen from the foregoing description, the resonance intensity of the membrane structure may be controlled on an individual basis by adjusting the gap distance from the bottom plate 107 of each membrane structure to the top plate 110 (or 111), the thickness of the vertical partitions 105, and other parameters. Consequently, controlling the resonance intensity of the membrane structure on an individual basis allows the waveform of the vibration propagated by the propagation medium to be controlled and thereby allows the vibration propagation waveform to be designed freely.

In addition, in the one membrane structure 108, the space defined by the vertical partitions 105, the one top plate 110, and the bottom plate 107 is used as one membrane structure's hermetically sealed space 113. On the other hand, in the other membrane structure 109, the space defined by the vertical partitions 105, the other top plate 111, and the bottom plate 107 is used as the other membrane structure's hermetically sealed space 114. This may make the internal pressure (P3) of the one membrane structure's hermetically sealed space 113 and the internal pressure (P4) of the other membrane structure's hermetically sealed space 114 different from each other. Making the pressures of these hermetically sealed spaces different from each other allows the resonant frequencies of the respective membrane structures to be different from each other as well.

[6-1-2. Procedure of Manufacturing Vibration Propagation Member]

Next, a procedure of manufacturing the vibration propagation member 102 will be described with reference to FIGS. 29A-29D.

FIGS. 29A-29D are perspective views illustrating the procedure of manufacturing the vibration propagation member 102 according to the sixth embodiment. The manufacturing process of the vibration propagation member 102 proceeds from the process step shown in FIG. 29A via the process steps shown in FIGS. 29B and 29C to the process step shown in FIG. 20D.

Figure 29A:
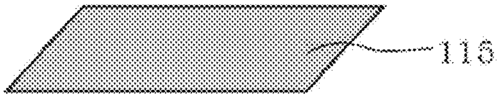
FIGS. 29A-29D are perspective views illustrating the procedure of manufacturing the vibration propagation member according to the sixth embodiment.
Figure 29B:
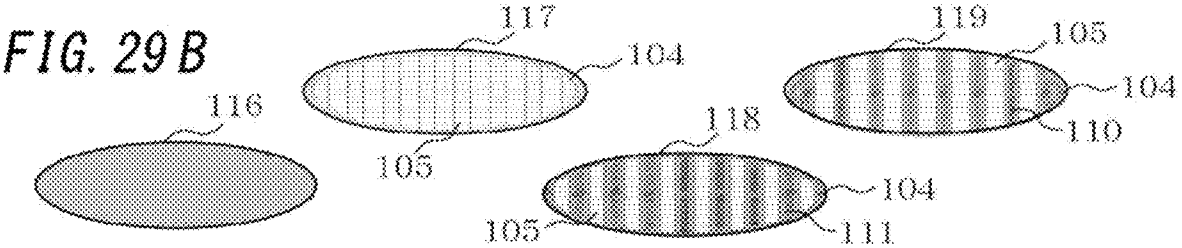

First, as shown in FIG. 29A, a plurality of metal plates 115, each of which is large enough to cut out a plurality of patterned structures therefrom, and a plurality of metal plates 115, each of which is large enough to cut out an individual patterned structure therefrom, are provided. FIG. 29A shows only one of these metal plates 115. Next, FIG. 29B shows a metal plate 116 which has been patterned into a circular shape to use the metal plate 115 as the bottom plate 107, a metal plate 117 on which the sidewall 104 and the vertical partitions 105 have been formed by patterning, a metal plate 118 on which the top plate 111, sidewall 104, and vertical partitions 105 of the other membrane structure have been formed by patterning, and a metal plate 119 on which the top plate 110, sidewall 104, and vertical partitions 105 of the one membrane structure have been formed by patterning. These metal plates 116-119 may be formed either on an individual basis or simultaneously. The metal plate 115 may be patterned by, for example, punching the metal plate 115 by pressing, etching the metal plate 115 by photolithography, subjecting the metal plate 115 to laser cutting, or subjecting the metal plate 115 to electrical discharge machining using a discharge wire. In this embodiment, each of the metal plate 116 which has been patterned into the circular shape to use the metal plate 115 as the bottom plate 107, the metal plate 117 on which the sidewall 104 and the vertical partitions 105 have been formed by patterning, the metal plate 118 on which the top plate 111, sidewall 104, and vertical partitions 105 of the other membrane structure have been formed by patterning, and the metal plate 119 on which the top plate 110, sidewall 104, and vertical partitions 105 of the one membrane structure have been formed by patterning are supposed to have been formed into a circular (disklike) external shape in top view (i.e., when viewed parallel to the Z-axis). However, this is only an example and should not be construed as limiting. Rather, none of the metal plate 116 which has been patterned into the circular shape to use the metal plate 115 as the bottom plate 107, the metal plate 117 on which the sidewall 104 and the vertical partitions 105 have been formed by patterning, the metal plate 118 on which the top plate 111, sidewall 104, and vertical partitions 105 of the other membrane structure have been formed by patterning, and the metal plate 119 on which the top plate 110, sidewall 104, and vertical partitions 105 of the one membrane structure have been formed by patterning do not have to have the circular (disklike) external shape but may have an elliptical or polygonal external shape as well.

Figure 29C:
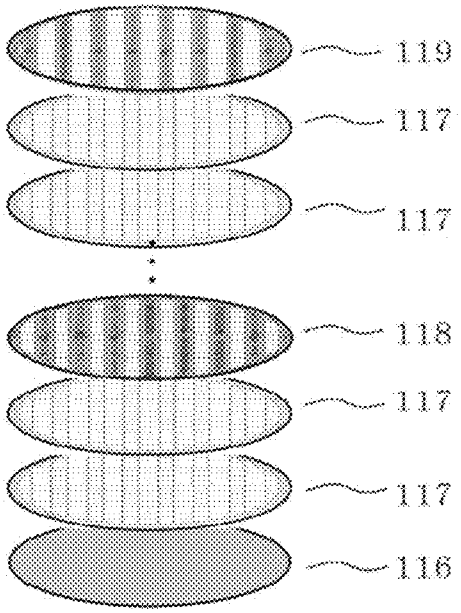

Next, as shown in FIG. 29C, the metal plate 116 that has been patterned into the circular shape to be used as the bottom plate 107, a plurality of metal plates 117 on each of which the sidewall and the vertical partitions have been formed by patterning, the metal plate 118 on which the top plate, sidewall, and vertical partitions of the other membrane structure have been formed by patterning, a plurality of metal plates 117 on each of which the sidewall and the vertical partitions have been formed by patterning, and the metal plate 119 on which the top plate, sidewall, and vertical partitions of the one membrane structure have been formed by patterning are stacked one on top of another while being aligned with each other. Subsequently, these patterned metal plates are joined together, by diffusion joining, which is an exemplary direct joining technique, in a vacuum environment under heat and pressure to form an integral material. In the case of stainless steel, for example, the heating temperature during the diffusion joining process is about 1,000° C. while stainless steel has a melting point of about 1500° C. Thus, when made of stainless steel, those metal plates that have been patterned into the circular shape and stacked one on top of another may be joined together by heating the metal plates to this temperature in a vacuum under pressure with atoms on the junction interface allowed to diffuse and with the base metal not allowed to melt.

Note that the diffusion joining requires some degree of planarity. Thus, depending on the process step shown in FIG. 29C, a posterior process step of removing bur and deformation from the metal plate 116 patterned into the circular shape, the metal plates 117 on each of which the sidewall 104 and the vertical partitions 105 have been formed by patterning, the metal plate 118 on which the top plate 111, sidewall 104, and vertical partitions 105 of the other membrane structure have been formed by patterning, and the metal plate 119 on which the top plate 110, sidewall 104, and vertical partitions 105 of the one membrane structure have been formed by patterning may need to be performed after the process step shown in FIG. 29B has been performed. Alternatively, a melt welding process for partially melting the base metal may also be used as another direct joining technique. In the case of stainless steel, the melt welding technique allows a plurality of metal plates to be joined together by heating the metal plates to around 1500° C. Still alternatively, according to another method for joining the metal plates, an epoxy resin or cyanoacrylate adhesive may also be used as a bonding material between the metal plates. Yet alternatively, if an inorganic material is selected as the bonding material, then brazing may also be used.

Figure 29D:
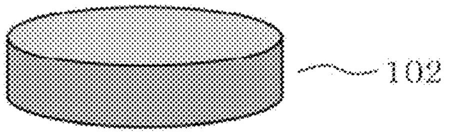

Performing this manufacturing procedure allows a vibration propagation member 102 according to the sixth embodiment, in which the respective patterned metal plates have been joined together by the joining method according to this embodiment, to be completed as shown in FIG. 29D. In this embodiment, the vibration propagation member 102 is eventually formed to have a circular columnar external shape. However, this is only an example and should not be construed as limiting. Rather, the vibration propagation member according to this embodiment does not have to have the circular columnar shape but may have an elliptic cylindrical shape or a polygonal prism shape as well.

[6-1-3. Advantages of Vibration Propagation Member]

As can be seen from the foregoing description, the vibration propagation member 102 according to this embodiment is configured to operate by being bonded to one surface of the vibration means. The vibration propagation member 102 includes the sidewall 104, the vertical partitions 105, the bottom plate 107, and the top plates 110, 111. The vibration propagation member 102 has, as its internal membrane structures, one membrane structure 108 and the other membrane structure 109. The one membrane structure 108 is defined by the vertical partitions 105 and the one top plate 110. The other membrane structure 109 is defined by the vertical partitions 105 and the other top plate 111. The one membrane structure 108 and the other membrane structure 109 have different gap distances between the vertical partitions and different gap distances from the bottom plate 107 to their respective top plates.

Thus, adjusting the thickness of the vertical partitions 105, which are constituent elements of the vibration propagation member 102, the gap distances between the vertical partitions 105, the thickness of the one membrane structure 108, the thickness of the other membrane structure 109, and the gap distances from the bottom plate 107 to the respective top plates 110 (111) of the two membrane structures allows the vibrations induced by the one membrane structure 108 and the other membrane structure 109 to be controlled. In addition, this also allows the resonant frequency of the vibration to be transmitted and received by a vibration transceiver, in which the vibration propagation member 102 is bonded to the vibration means, to be controlled freely, thus providing a vibration propagation member 102 that allows a high degree of freedom of design.

Moreover, when the vibration propagation member 102 is bonded to the vibration means, the one membrane structure 108 may attenuate the vibration of the vibration means less significantly. In other words, when the vibration propagation member 102 is bonded to the vibration means, the vibration of the vibration means may be attenuated less significantly by the one membrane structure 108 than by the other membrane structure 109. In addition, the intensity of the sympathetic vibration produced by the one membrane structure 108 may be greater than the intensity of the sympathetic vibration produced by the other membrane structure 109. As can be seen from the foregoing description, the resonance intensity of the membrane structure may be controlled on an individual basis by adjusting the gap distance from the bottom plate 107 of each membrane to the top plate 110 (or 111), the thickness of the vertical partitions 105, and other parameters. Consequently, controlling the resonance intensity of the membrane structure on an individual basis allows the waveform of the vibration propagated into the propagation medium to be controlled and thereby allows the vibration propagation waveform to be designed freely.

In addition, in the one membrane structure 108, the space defined by the vertical partitions 105, the one top plate 110, and the bottom plate 107 is used as one membrane structure's hermetically sealed space 113. On the other hand, in the other membrane structure 109, the space defined by the vertical partitions 105, the other top plate 111, and the bottom plate 107 is used as the other membrane structure's hermetically sealed space 114. This may make the internal pressure (P3) of the one membrane structure's hermetically sealed space 113 and the internal pressure (P4) of the other membrane structure's hermetically sealed space 114 different from each other. Making the pressures of these hermetically sealed spaces different from each other may make the resonant frequencies of the respective membrane structures different from each other as well. Furthermore, the vibration propagation member 102 does not use the vibration in the thickness direction, and therefore, may have its own thickness reduced.

Seventh Embodiment

Next, a vibration transceiver according to a seventh embodiment will be described with reference to FIGS. 30 and 31.

[7-1. Vibration Transceiver]

[1-1. Configuration for Vibration Transceiver]

Figure 30:
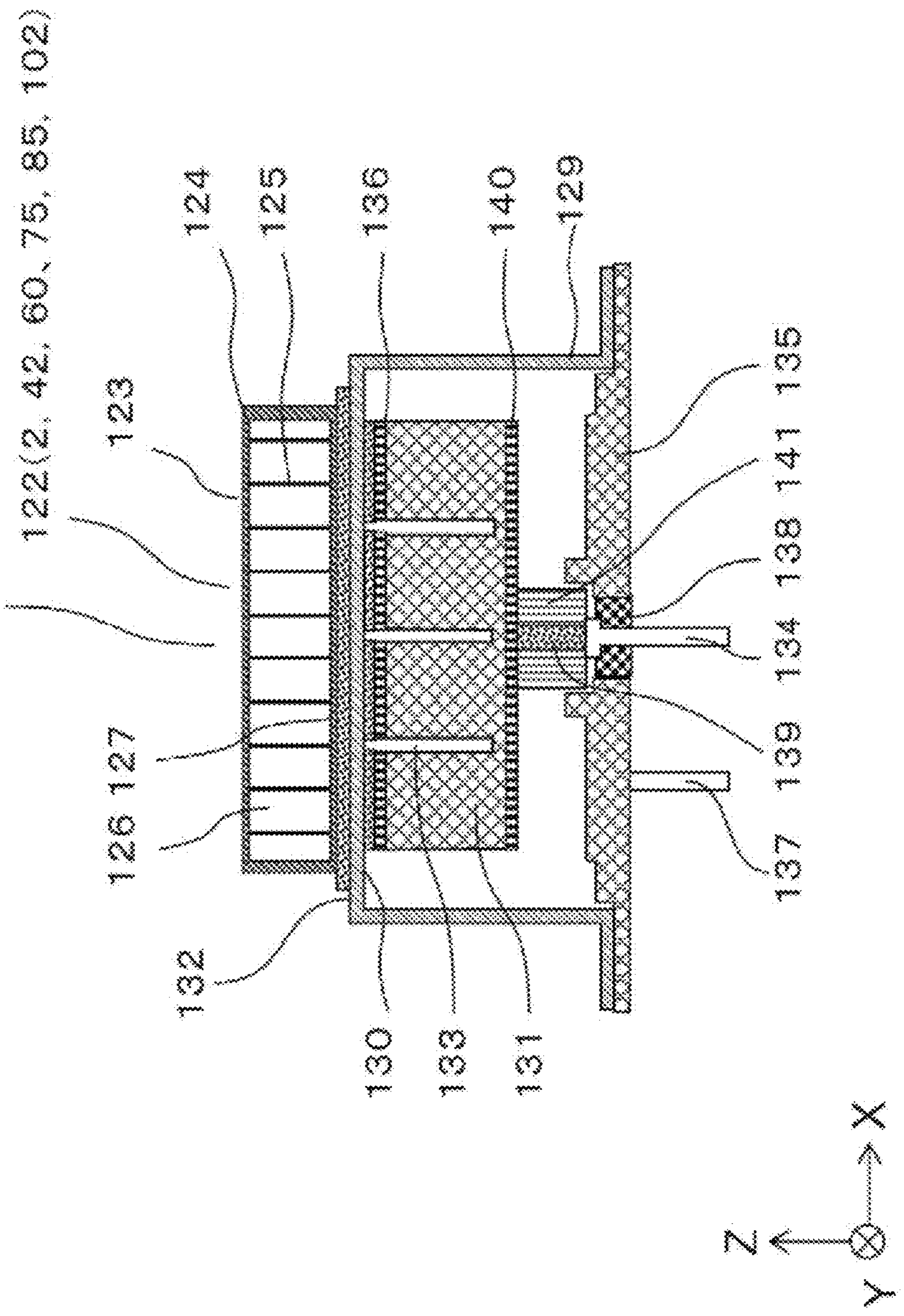
FIG. 30 is a cross-sectional view of a vibration transceiver according to a seventh embodiment.

FIG. 30 is a cross-sectional view illustrating an exemplary configuration for a vibration transceiver 121 according to the seventh embodiment. FIG. 30 illustrates a cross section of the vibration transceiver 121 as taken in the thickness direction (parallel to the Z-axis), i.e., a cross section thereof taken along an X-Z plane.

As shown in FIG. 30, the vibration transceiver 121 includes: a bottomed cylindrical metallic case 129; a vibration means 131 disposed on a top inner wall surface 130 of the bottomed cylindrical metallic case 129; and a vibration propagation member 122 disposed on a top outer wall surface 132 of the bottomed cylindrical metallic case 129. The vibration transceiver 121 includes, as the vibration propagation member 122 disposed on the top outer wall surface 132, any one of the vibration propagation member 2 described for the first embodiment, the vibration propagation member 42 described for the second embodiment, the vibration propagation member 60 described for the third embodiment, the vibration propagation member 75 described for the fourth embodiment, the vibration propagation member 85 described for the fifth embodiment, or the vibration propagation member 102 described for the sixth embodiment. In addition, the vibration transceiver 121 further includes terminals 134, 137, a tag block 135, an insulating sealing member 138, a conductive rubber's conductive portion 139, and a conductive rubber's insulating portion 141.

The top inner wall surface 130 is the inner top surface (i.e., the surface facing the negative Z-axis direction) of the bottomed cylindrical metallic case 129. The top outer wall surface 132 is the outer top surface (i.e., the surface facing the positive Z-axis direction) of the bottomed cylindrical metallic case 129.

The vibration means 131 has grooves 133 which are arranged parallel to the vibration propagation direction of the vibration means 131. The grooves 133 of the vibration means 131 are arranged parallel to the vertical partitions 125 of the vibration propagation member 122.

The terminal 137 is made of a metallic material and electrically connected to one electrode 136 of the vibration means 131 via the tag block 135 and the bottomed cylindrical metallic case 129. The terminal 134 is electrically insulated from the terminal 137 via the insulating sealing member 138 and is electrically connected to the other electrode 140 of the vibration means 131 via the conductive rubber's conductive portion 139. The conductive rubber's conductive portion 139 has a generally circular cylindrical shape and includes the conductive rubber's insulating portion 141 on the outer periphery thereof. The conductive rubber's conductive portion 139, the tag block 135, and the terminal 134 are electrically insulated from each other. The conductive rubber's conductive portion 139 and the conductive rubber's insulating portion 141 are pressed upward (i.e., in the positive Z-axis direction) by the tag block 135. Note that in the following description, the vibration propagation member 122 is supposed to be bonded to the top outer wall surface 132 of the bottomed cylindrical metallic case 129.

[7-1-2. Procedure of Manufacturing Vibration Transceiver]

Next, a procedure of manufacturing the vibration transceiver 121 will be described with reference to FIG. 31.

Figure 31:
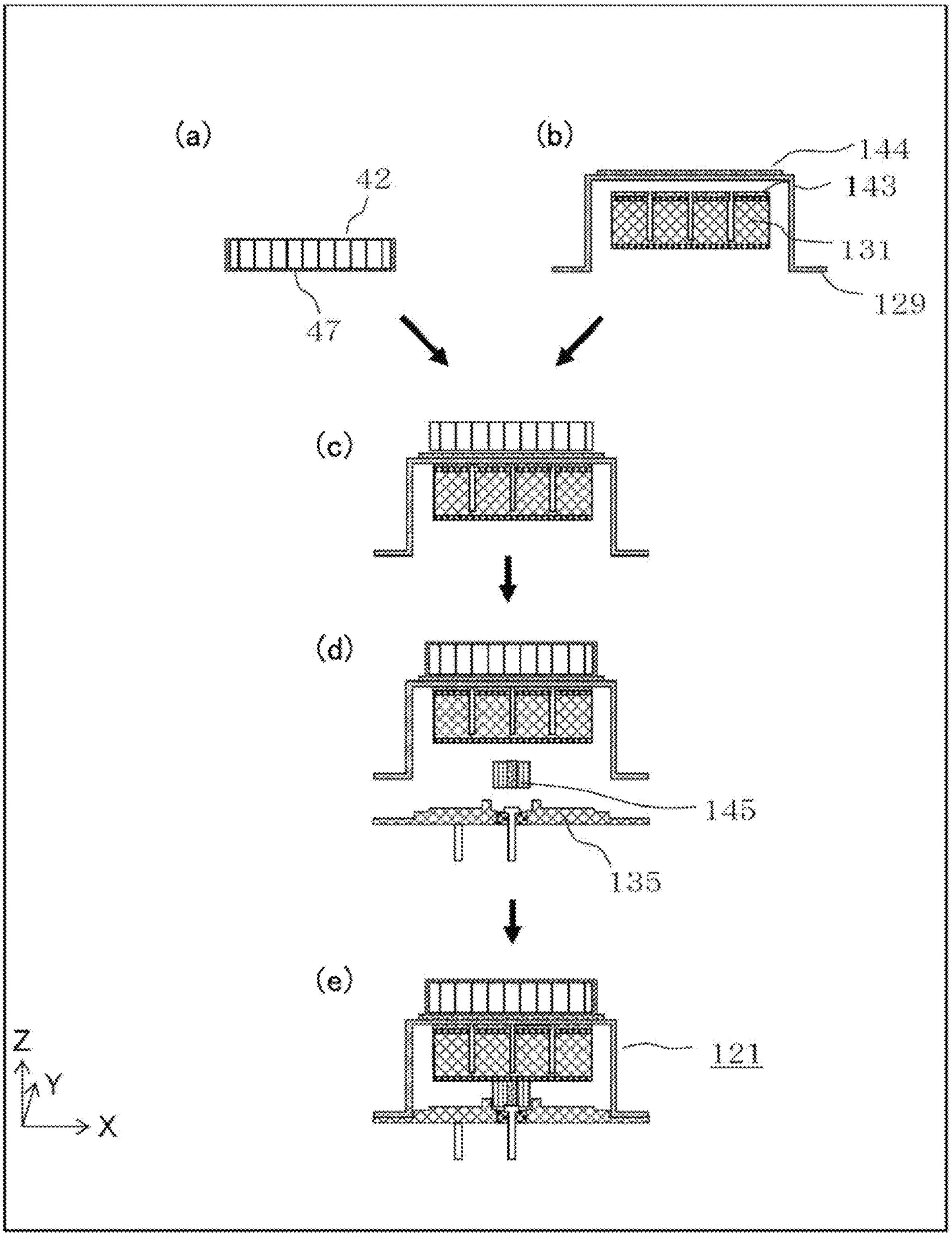
FIG. 31 is a set of cross-sectional views illustrating the procedure of manufacturing the vibration transceiver according to the seventh embodiment.

FIG. 31 is a set of cross-sectional views illustrating the procedure of manufacturing the vibration transceiver 121 according to the fourth embodiment.

First, as shown in portion (a) of FIG. 31, the vibration propagation member 42 already described for the second embodiment is provided. In parallel, as shown in portion (b) of FIG. 31, a thermosetting adhesive for use as a bonding material 143 is applied onto the upper surface (i.e., the surface facing the positive Z-axis direction) of the vibration means 131 and the same bonding material 144 is also applied onto the top outer wall surface 132 of the bottomed cylindrical metallic case 129. Next, as shown in portion (c) of FIG. 31, the bottomed cylindrical metallic case 129 is laid on top of the vibration means 131 to bond the upper surface (i.e., the surface facing the positive Z-axis direction) of the vibration means 131 and the top inner wall surface 130 of the bottomed cylindrical metallic case 129 together via the bonding material 143 interposed between them. In addition, the vibration propagation member 122 is also laid on top of the bottomed cylindrical metallic case 129 to bond the top outer wall surface 132 of the bottomed cylindrical metallic case 129 and (the surface facing the negative Z-axis direction of) the bottom plate 47 of the vibration propagation member 122 together via the bonding material 144 interposed between them. In this case, the vibration means 131, the bottomed cylindrical metallic case 129, and the vibration propagation member 122 are heated with a pressure of about 1 $kg/cm^2$ to about 10 $kg/cm^2$ applied thereto, thereby curing the thermosetting adhesive. This allows the vibration propagation member 122 and the vibration means 131 to be adhered to the bottomed cylindrical metallic case 129.

Next, as shown in portion (d) of FIG. 31, the tag block 135, into which conductive rubber 145 is inserted, is fitted into an aperture edge of the bonded assembly of the vibration propagation member 122, the bottomed cylindrical metallic case 129, and the vibration means 131 that have been heated and cured and bonded together through these process steps from under the bonded assembly, thereby welding the flange of the bottomed cylindrical metallic case 129 and the peripheral edge portion of the tag block 135 together. During this welding process step, an inert gas such as an argon gas, a nitrogen gas, or a helium gas is introduced into the hermetically sealed space surrounded with the tag block 135 and the bottomed cylindrical metallic case 129. This may reduce deterioration of the electrodes of the vibration means 131 and deterioration of the bonded portion between the vibration means 131 and the bottomed cylindrical metallic case 129.

A material for the bottomed cylindrical metallic case 129 may be any suitable material with electrical conductivity such as a metal. The material for the bottomed cylindrical metallic case 129 may be selected from the group consisting of, for example, iron, brass, copper, aluminum, stainless steel, and alloys thereof, or a plated one of any of these metals.

The thermosetting adhesive for use as the bonding materials 143, 144 may be any thermosetting resin without limitation. Examples of the thermosetting resin include epoxy resins, phenolic resins, polyester resins, and melamine resins. As the case may be, even a thermoplastic resin may also be used as the adhesive as long as the glass transition temperature thereof is equal to or higher than 70° C., which is set as the upper limit of the operating temperature of the vibration transceiver 121.

In this manner, the vibration transceiver 121 is completed as shown in portion (e) of FIG. 31.

[7-1-3. Advantages of Vibration Transceiver]

As can be seen from the foregoing description, the vibration transceiver 121 according to this embodiment includes: the bottomed cylindrical metallic case 129; the vibration means 131 disposed on the top inner wall surface 130 of the bottomed cylindrical metallic case 129; and the vibration propagation member according to any one of the first, second, and third embodiments described above, which is disposed as the vibration propagation member 122 on the top outer wall surface 132 of the bottomed cylindrical metallic case 129. Thus, vibration transceiver 121 according to this embodiment may control the resonant frequency induced by the membrane structure defined by the respective thicknesses of the vertical partitions and the top plate, which are constituent elements of the vibration propagation member, the gap distance between the vertical partitions, and other parameters. The vibration transceiver 121 in which the vibration propagation member 122 is bonded to the vibration means 131 may freely control the frequency of the vibration to transmit and receive. Consequently, a vibration propagation member 122 that allows a high degree of freedom of design may be provided.

In addition, making the space defined by the internal structure of the vibration transceiver a hermetically sealed space allows the vibration transceiver to directly measure the concentration of even a corrosive fluid or a high-temperature, high-humidity fluid as a fluid under measurement.

Optionally, the above-described configurations for the respective embodiments and their implementations may be adopted as appropriate in combination.

(Recapitulation)

As can be seen from the foregoing description, a vibration propagation member (2, 85, 102, 122) according to a first aspect is configured to operate by being bonded to one surface of a vibration means (1, 131). The vibration propagation member (2, 85, 102, 122) includes: a top plate (3, 86, 110, 111, 123); a sidewall (4, 87, 104, 124); and at least one vertical partition (5, 88, 105, 125) disposed perpendicularly to the top plate (3, 86, 110, 111, 123). The vibration propagation member (2, 85, 102, 122) uses vibration produced by a plurality of membrane structures (7, 93, 94, 108, 109) defined by the top plate (3, 86, 110, 111, 123) and the at least one vertical partition (5, 88, 105, 125). As used herein, the phrase "perpendicularly to the top plate" refers to not only a situation where the angle defined by the vertical partition with respect to the top plate is exactly the right angle (90 degrees) but also a situation where the difference between the angle and the right angle falls within a tolerance range (e.g., 90 degrees±10 degrees).

A vibration propagation member (2, 85, 102, 122) according to a second aspect, which may be implemented in conjunction with the first aspect, has a plurality of spaces defined by the top plate (3, 86, 110, 111, 123), the at least one vertical partition (5, 88, 105, 125), and the vibration means (1, 131). At least one of the plurality of spaces is a hermetically sealed space (6, 92, 106, 126).

A vibration propagation member (42, 85, 102, 122) according to a third aspect is configured to operate by being bonded to one surface of a vibration means (41, 131). The vibration propagation member (42, 85, 102, 122) includes: a top plate (43, 86, 110, 111, 123); a bottom plate (47, 90, 107, 127); a sidewall (44, 87, 104, 124); and at least one vertical partition (45, 88, 105, 125) disposed perpendicularly to the top plate (43, 86, 110, 111, 123) and the bottom plate (47, 90, 107, 127). The vibration propagation member (42, 85, 102, 122) uses vibration produced by a plurality of membrane structures (48, 49, 93, 94, 108, 109) defined by the top plate (43, 86, 110, 111, 123) and the at least one vertical partition (45, 88, 105, 125). As used herein, the phrase "perpendicularly to the top plate and the bottom plate" refers to not only a situation where the angle defined by the vertical partition with respect to the top plate and the bottom plate is exactly the right angle (90 degrees) but also a situation where the difference between the angle and the right angle falls within a tolerance range (e.g., 90 degrees±10 degrees).

A vibration propagation member (42, 85, 102, 122) according to a fourth aspect, which may be implemented in conjunction with the third aspect, has a plurality of spaces defined by the top plate (43, 86, 110, 111, 123), the bottom plate (47, 90, 107, 127), and the at least one vertical partition (45, 88, 105, 125). At least one of the plurality of spaces is a hermetically sealed space (46, 92, 106, 126).

A vibration propagation member (60, 75, 85, 102, 122) according to a fifth aspect is configured to operate by being bonded to one surface of a vibration means (59, 131). The vibration propagation member (60, 75, 85, 102, 122) includes: a top plate (61, 76, 86, 110, 111, 123); a bottom plate (65, 80, 90, 107, 127); a sidewall (62, 77, 87, 104, 124) of the vibration propagation member (60, 75, 85, 102, 122); at least one vertical partition (63, 78, 88, 105, 125) disposed perpendicularly to the top plate (61, 76, 86, 110, 111, 123) and the bottom plate (65, 80, 90, 107, 127); and at least one horizontal partition (66, 81) arranged horizontally to the top plate (61, 76, 86, 110, 111, 123) and the bottom plate (65, 80, 90, 107, 127). The vibration propagation member (60, 75, 85, 102, 122) uses vibration produced by a plurality of membrane structures (68, 69, 83, 84, 93, 94, 108, 109) defined by the top plate (61, 76, 86, 110, 111, 123) and the at least one vertical partition (63, 78, 88, 105, 125). As used herein, the phrase "perpendicularly to the top plate and the bottom plate" refers to not only a situation where the angle defined by the vertical partition with respect to the top plate and the bottom plate is exactly the right angle (90 degrees) but also a situation where the difference between the angle and the right angle falls within a tolerance range (e.g., 90 degrees±10 degrees). Also, as used herein, the phrase "horizontally to the top plate and the bottom plate" refers to not only a situation where the angle defined by the horizontal partition with respect to the top plate and the bottom plate is exactly zero degrees (i.e., the horizontal partition does not intersect with the top plate or the bottom plate) but also a situation where the difference between the angle and zero degrees falls within a tolerance range (e.g., the angle formed with respect to the top plate and the bottom plate is 0 degrees±10 degrees).

A vibration propagation member (60, 75, 85, 102, 122) according to a sixth aspect, which may be implemented in conjunction with the fifth aspect, has a plurality of spaces defined by the top plate (61, 76, 86, 110, 111, 123), the at least one vertical partition (63, 78, 88, 105, 125), and any one surface of the at least one horizontal partition (66, 81). At least one of the plurality of spaces is a hermetically sealed space (67, 82, 92, 106, 126).

In a vibration propagation member (2, 42, 60, 75, 85, 102, 122) according to a seventh aspect, which may be implemented in conjunction with any one of the first to sixth aspects, the at least one vertical partition (5, 45, 63, 78, 88, 105, 125) includes a plurality of vertical partitions (5, 45, 63, 78, 88, 105, 125). The plurality of membrane structures (7, 48, 49, 68, 69, 83, 84, 93, 94, 108, 109) are defined by multiple different gap distances between the plurality of vertical partitions (5, 45, 63, 78, 88, 105, 125).

In a vibration propagation member (2, 42, 60, 75, 85, 102, 122) according to an eighth aspect, which may be implemented in conjunction with any one of the first to sixth aspects, the at least one vertical partition includes a plurality of vertical partitions. The plurality of membrane structures (7, 48, 49, 68, 69, 83, 84, 93, 94, 108, 109) are defined by the plurality of vertical partitions having multiple different shapes in a cross section taken perpendicularly to a vibration propagation direction.

In a vibration propagation member (85) according to a ninth aspect, which may be implemented in conjunction with any one of the first to sixth aspects, the plurality of membrane structures (93, 94) each include a top plate (86) having a different thickness.

In a vibration propagation member (102) according to a tenth aspect, which may be implemented in conjunction with any one of the first to sixth aspects, at least two membrane structures (108, 109) out of the plurality of membrane structures (108, 109) have mutually different internal pressures (P3, P4).

In a vibration propagation member (2, 42, 60, 75, 85, 102) according to an eleventh aspect, which may be implemented in conjunction with any one of the first to sixth aspects, the plurality of membrane structures (7, 48, 49, 68, 69, 83, 84, 93, 94, 108, 109) has a plurality of hermetically sealed spaces (46) filled with different fillers inside.

In a vibration propagation member (102) according to a twelfth aspect, which may be implemented in conjunction with any one of the first to sixth aspects, at least two membrane structures (108, 109) out of the plurality of membrane structures (108, 109) have mutually different thicknesses as measured in a vibration propagation direction of the vibration propagation member (102).

In a vibration propagation member (2, 42, 60, 75, 85, 102) according to a thirteenth aspect, which may be implemented in conjunction with any one of the first to twelfth aspects, the at least one vertical partition (5, 45, 63, 78, 88, 105) includes a plurality of vertical partitions (5, 45, 63, 78, 88, 105). The plurality of vertical partitions (5, 45, 63, 78, 88, 105) includes some vertical partitions (5, 45, 63, 78, 88, 105) that are out of contact with the sidewall (4, 44, 62, 77, 87, 104).

In a vibration propagation member (2, 42, 60, 75, 85, 102) according to a fourteenth aspect, which may be implemented in conjunction with any one of the first to twelfth aspects, the at least one vertical partition (5, 45, 63, 78, 88, 105) has a wall thickness (such as wall thicknesses T1, T2, T3, T4) that varies in a vibration propagation direction.

In a vibration propagation member (42) according to a fifteenth aspect, which may be implemented in conjunction with the fourteenth aspect, the wall thickness (T1, T2) of the at least one vertical partition (45) varies, and changes gradually, in the vibration propagation direction.

In a vibration propagation member (42) according to a sixteenth aspect, which may be implemented in conjunction with the fourteenth aspect, the wall thickness (T3, T4) of the at least one vertical partition (45) varies, changes gradually, and alternately increases and decreases repeatedly, in the vibration propagation direction.

In a vibration propagation member (42) according to a seventeenth aspect, which may be implemented in conjunction with any one of the first to sixteenth aspects, the at least one vertical partition (45) has a wall thickness defined by multiple layers that are stacked one on top of another, and arranged to shift from each other, in a thickness direction.

In a vibration propagation member (85) according to an eighteenth aspect, which may be implemented in conjunction with any one of the first to seventeenth aspects, the vibration propagation member (85) includes a plurality of plate members stacked one on top of another and directly joined together. Each of the plurality of plate members has a plurality of patterned elements formed thereon out of an identical material.

In a vibration propagation member (102) according to a nineteenth aspect, which may be implemented in conjunction with any one of the first to seventeenth aspects, the vibration propagation member (102) includes a plurality of plate members stacked one on top of another and bonded together via a bonding material. Each of the plurality of plate members has a plurality of patterned elements formed thereon.

A vibration transceiver (14, 121) according to a twentieth aspect includes: a vibration means (1, 41, 59); and the vibration propagation member (2, 42, 60, 75, 85, 102, 122) according to any one of the first to nineteenth aspects bonded to one surface of the vibration means (1, 41).

A vibration transceiver (121) according to a twenty-first aspect includes: a bottomed cylindrical metallic case (129); the vibration propagation member (2, 42, 60, 75, 85, 102, 122) according to any one of the first to nineteenth aspects bonded onto a top outer wall surface (132) of the bottomed cylindrical metallic case (129); and a vibration means (131) disposed on a top inner wall surface (130) of the bottomed cylindrical metallic case (129).

In a vibration transceiver (14, 121) according to a twenty-second aspect, which may be implemented in conjunction with the twentieth or twenty-first aspect, the vibration means (1, 41, 59, 131) is configured as a piezoelectric member. The piezoelectric member has a groove (133) extending parallel to a vibration propagation direction of the piezoelectric member. The groove (133) of the piezoelectric member and the at least one vertical partition (5, 45, 63, 78, 88, 105, 125) of the vibration propagation member (2, 42, 60, 75, 85, 102, 122) are parallel to each other. As used herein, the expression "the groove of the piezoelectric member and the at least one vertical partition of the vibration propagation member are parallel" refers to not only a situation where the groove of the piezoelectric member and the vertical partition of the vibration propagation member do not intersect with each other but also a situation where the angle formed between the groove of the piezoelectric member and the vertical partition of the vibration propagation member falls within a tolerance range (e.g., when the angle formed between the groove of the piezoelectric member and the vertical partition of the vibration propagation member is 0 degrees±10 degrees).

A manufacturing method according to a twenty-third aspect is a method for manufacturing the vibration propagation member (2, 42, 60, 75, 85, 102) according to any one of the first to nineteenth aspects by performing, in this order, the steps of: forming patterned elements on each of a plurality of metal plates; stacking, one on top of another, the plurality of metal plates, each having the patterned elements formed thereon; and directly joining the plurality of metal plates together by applying, at a high temperature, load to the plurality of metal plates that have been stacked.

A flowmeter (23) according to a twenty-fourth aspect includes: a flow channel (25) configured to let a fluid under measurement pass through; a pair of the vibration transceivers (such as ultrasonic transceivers 26, 27) according to any one of the twentieth to twenty-second aspects arranged to face the flow channel (25); a timer (28); and a calculating means (29). The timer (28) is configured to measure a time of appearance of a signal transmitted by any one of the pair of the vibration transceivers. The calculating means (29) is configured to calculate a flow rate based on the time of appearance measured by the timer (28).

A velocity meter according to a twenty-fifth aspect includes: a flow channel (25) configured to let a fluid under measurement pass through; a pair of the vibration transceivers (such as ultrasonic transceivers 26, 27) according to any one of the twentieth to twenty-second aspects arranged to face the flow channel (25); a timer (28); and a calculating means (29). The timer (28) is configured to measure a time of appearance of a signal transmitted by any one of the pair of the vibration transceivers. The calculating means (29) is configured to calculate a flow velocity based on the time of appearance measured by the timer (28).

A concentration meter (30) according to a twenty-sixth aspect includes: a housing (31); a pair of the vibration transceivers (such as ultrasonic transceivers 33, 34) according to any one of the twentieth to twenty-second aspects arranged inside the housing (31) to face each other with a predetermined distance left between the pair of the vibration transceivers; a temperature sensor (35) disposed inside the housing (31); a timer (36); and a calculating means (37). The housing (31) has a vent hole (32) configured to let a mixed gas as a fluid under measurement pass through. The timer (36) is configured to measure a time of appearance of a signal transmitted by any one of the pair of the vibration transceivers. The calculating means (37) is configured to calculate a propagation velocity and an average molecular weight and gas concentration of the mixed gas based on the time of appearance measured by the timer (36).

INDUSTRIAL APPLICABILITY

The present disclosure is applicable to an ultrasonic flowmeter, velocity meter, and concentration meter for use to measure the flow rate, flow velocity, and concentration of a gas. Specifically, the present disclosure is applicable to, for example, a flowmeter for home use, an anesthetic gas concentration meter for medical use, and a hydrogen concentration meter for use in fuel cells.

REFERENCE SIGNS LIST

1, 1*a*, 1*b* Vibration Means
2, 2*a*, 2*b* Vibration Propagation Member
3 Top Plate
4 Sidewall
5 Vertical Partition
6 Hermetically Sealed Space
7 Membrane Structure
8 Membrane Structure
9 Membrane Structure
10 Metal Plate
11 Metal Plate
12 Metal Plate
14, 14*a*, 14*b* Vibration Transceiver
15 Electrode
16 Electrode
17 Bonding Material
18 Lead Wire
19 Lead Wire
23 Flowmeter
24 Velocity Meter
25 Flow Channel
26 Ultrasonic Transceiver
27 Ultrasonic Transceiver
28 Timer
29 Calculating Means
30 Concentration Meter
31 Housing
32 Vent Hole
33 Ultrasonic Transceiver
34 Ultrasonic Transceiver
35 Temperature Sensor
36 Timer
37 Calculating Means
41 Vibration Means
42, 42*a*, 42*b*, 42*c*, 42*d*, 42*e*, 42*f* Vibration Propagation Member
43 Top Plate
44 Sidewall
45 Vertical Partition
46 Hermetically Sealed Space
47 Bottom Plate
48 Membrane Structure
49 Membrane Structure
50 Metal Plate
51 Metal Plate
52 Metal Plate
55 Bent Portion

57 Vertical Partition
58 Vertical Partition
59 Vibration Means
60 Vibration Propagation Member
61 Top Plate
62 Sidewall
63 Vertical Partition
65 Bottom Plate
66 Horizontal Partition
67 Hermetically Sealed Space
68 Membrane Structure
69 Membrane Structure
70 Metal Plate
71 Metal Plate
72 Metal Plate
75 Vibration Propagation Member
76 Top Plate
77 Sidewall
78 Vertical Partition
80 Bottom Plate
81 Horizontal Partition
82 Hermetically Sealed Space
83 Membrane Structure
84 Membrane Structure
85 Vibration Propagation Member
86 Top Plate
87 Sidewall
88 Vertical Partition
90 Bottom Plate
92 Hermetically Sealed Space
93 Membrane Structure
94 Membrane Structure
96 Metal Plate
97 Metal Plate
98 Metal Plate
99 Metal Plate
102 Vibration Propagation Member
104 Sidewall
105 Vertical Partition
106 Hermetically Sealed Space
107 Bottom Plate
108 Membrane Structure
109 Membrane Structure
110 Top Plate
111 Top Plate
113 Membrane Structure's Hermetically Sealed Space
114 Membrane Structure's Hermetically Sealed Space
115 Metal Plate
116 Metal Plate
117 Metal Plate
118 Metal Plate
119 Metal Plate
121 Vibration Transceiver
122 Vibration Propagation Member
123 Top Plate
124 Sidewall
125 Vertical Partition
126 Hermetically Sealed Space
127 Bottom Plate
129 Bottomed Cylindrical Metallic Case
130 Top Inner Wall Surface
131 Vibration Means
132 Top Outer Wall Surface
133 Groove
134 Terminal
135 Tag Block
136 Electrode
137 Terminal
138 Insulating Sealing Member
139 Conductive Rubber's Conductive Portion
140 Electrode
141 Conductive Rubber's Insulating Portion
143 Bonding Material
144 Bonding Material
145 Conductive Rubber

The invention claimed is:

1. A vibration propagation member for being bonded to a surface of a vibrator, the vibration propagation member comprising:
- a top plate;
- a sidewall; and
- at least one vertical partition which is perpendicular to the top plate,
- wherein:
- the vibration propagation member is configured to use vibration produced by a plurality of membrane structures defined by the top plate and the at least one vertical partition; and
- the at least one vertical partition has a wall thickness that varies in a vibration propagation direction.

2. The vibration propagation member of claim 1, wherein;
- the vibration propagation member has a plurality of spaces configured to be defined by the top plate, the at least one vertical partition, and the vibrator; and
- at least one of the plurality of spaces is a hermetically sealed space.

3. The vibration propagation member of claim 1, further comprising:
- a bottom plate,
- wherein the at least one vertical partition is perpendicular to the top plate and the bottom plate.

4. The vibration propagation member of claim 3, wherein;
- the vibration propagation member has a plurality of spaces defined by the top plate, the bottom plate, and the at least one vertical partition; and
- at least one of the plurality of spaces is a hermetically sealed space.

5. The vibration propagation member of claim 1, further comprising:
- a bottom plate; and
- at least one horizontal partition which is horizontal with respect to the top plate and the bottom plate,
- wherein the at least one vertical partition is perpendicular to the top plate and the bottom plate.

6. The vibration propagation member of claim 5, wherein:
- the vibration propagation member has a plurality of spaces defined by the top plate, the at least one vertical partition, and a surface of the at least one horizontal partition; and
- at least one of the plurality of spaces is a hermetically sealed space.

7. The vibration propagation member of claim 1, wherein:
- the at least one vertical partition includes a plurality of vertical partitions; and
- the plurality of membrane structures are defined by multiple different gap distances between the plurality of vertical partitions.

8. The vibration propagation member of claim 1, wherein:
- the at least one vertical partition includes a plurality of vertical partitions; and
- the plurality of membrane structures are defined by the plurality of vertical partitions having multiple different shapes in a cross section perpendicular to the vibration propagation direction.

9. The vibration propagation member of claim 1, wherein;

the top plate has a first thickness corresponding to a first membrane structure of the plurality of membrane structures;

the top plate has a second thickness corresponding to a second membrane structure of the plurality of membrane structures; and the first thickness is different than the second thickness.

10. The vibration propagation member of claim 1, wherein:

the top plate includes at least two plates corresponding to at least two membrane structures of the plurality of membrane structures; and the at least two membrane structures have mutually different thicknesses as measured in the vibration propagation direction.

11. The vibration propagation member of claim 1, wherein:

the at least one vertical partition includes a plurality of vertical partitions; and at least two vertical partitions of the plurality of vertical partitions are out of contact with the sidewall.

12. The vibration propagation member of claim 1, wherein a wall thickness of the at least one vertical partition varies in the vibration propagation direction.

13. The vibration propagation member of claim 1, wherein a wall thickness of the at least one vertical partition alternately increases and decreases repeatedly in the vibration propagation direction.

14. The vibration propagation member of claim 1, wherein the at least one vertical partition has a wall thickness defined by multiple layers that are stacked on top of each other, and arranged to shift from each other, in a thickness direction.

15. The vibration propagation member of claim 1, wherein the vibration propagation member includes a plurality of plate members stacked on top of each other and directly joined together, each of the plurality of plate members having a plurality of patterned elements formed thereon out of an identical material.

16. The vibration propagation member of claim 1, wherein the vibration propagation member includes a plurality of plate members stacked on top of each other and bonded together via a bonding material, each of the plurality of plate members having a plurality of patterned elements formed thereon.

17. A vibration transceiver comprising:

a vibrator; and the vibration propagation member of claim 1, wherein the vibration propagation member is bonded to the surface of the vibrator.

18. The vibration transceiver of claim 17, wherein:

the vibrator is a piezoelectric member;

the piezoelectric member has a groove extending parallel to a vibration propagation direction of the piezoelectric member; and the groove of the piezoelectric member and the at least one vertical partition of the vibration propagation member are parallel to each other.

19. A flowmeter comprising:

a flow channel configured to let a fluid under measurement pass through;

a pair of the vibration transceivers of claim 17, the pair of the vibration transceivers being arranged to face the flow channel;

a timer configured to measure a time of appearance of a signal transmitted by any-one of the pair of the vibration transceivers; and a calculator configured to calculate a flow rate based on the time of appearance measured by the timer.

20. A velocity meter comprising:

a flow channel configured to let a fluid under measurement pass through;

a pair of the vibration transceivers of claim 17, the pair of the vibration transceivers being arranged to face the flow channel;

a timer configured to measure a time of appearance of a signal transmitted by any-one of the pair of the vibration transceivers; and a calculator configured to calculate a flow velocity based on the time of appearance measured by the timer.

21. A concentration meter comprising:

a housing having a vent hole configured to let a mixed gas as a fluid under measurement pass through;

a pair of the vibration transceivers of claim 17, the pair of the vibration transceivers being arranged inside the housing to face each other with a distance between the pair of the vibration transceivers;

a temperature sensor inside the housing;

a timer configured to measure a time of appearance of a signal transmitted by one of the pair of the vibration transceivers; and a calculator configured to calculate a propagation velocity of the mixed gas, an average molecular weight of the mixed gas and a gas concentration of the mixed gas based on the time of appearance measured by the timer.

22. A vibration transceiver comprising:

a bottomed cylindrical metallic case;

the vibration propagation member of claim 1; and a vibrator, wherein:

the vibration propagation member is bonded onto a top outer wall surface of the bottomed cylindrical metallic case; and the vibrator is on a top inner wall surface of the bottomed cylindrical metallic case.

23. A method for manufacturing the vibration propagation member of claim 1, the method comprising:

forming patterned elements on each of a plurality of metal plates;

stacking the plurality of metal plates on top of each other, each of the plurality of metal plates having the patterned elements formed thereon; and directly joining the plurality of metal plates together by applying, at a heating temperature, load to the plurality of metal plates that have been stacked.

24. A vibration propagation member for being bonded to a surface of a vibrator, the vibration propagation member comprising:

a top plate;

a sidewall; and at least one vertical partition which is perpendicular to the top plate, wherein:

the vibration propagation member is configured to use vibration produced by a plurality of membrane structures defined by the top plate and the at least one vertical partition;

the top plate includes at least two plates corresponding to at least two membrane structures of the plurality of membrane structures; and the at least two membrane structures have mutually different thicknesses as measured in a vibration propagation direction.

25. A vibration propagation member for being bonded to a surface of a vibrator, the vibration propagation member comprising:

a top plate;

a sidewall; and at least one vertical partition which is perpendicular to the top plate, wherein:

the vibration propagation member is configured to use vibration produced by a plurality of membrane structures defined by the top plate and the at least one vertical partition; and the at least one vertical partition has a wall thickness defined by multiple layers that are stacked on top of each other, and arranged to shift from each other, in a thickness direction.

* * * * *